United States Patent
Ahn et al.

(10) Patent No.: US 11,582,676 B2
(45) Date of Patent: Feb. 14, 2023

(54) METHOD FOR RELAY TERMINAL TO TRANSMIT AND RECEIVE SIGNALS IN WIRELESS COMMUNICATION SYSTEM, AND DEVICE FOR SAME

(71) Applicant: LG ELECTRONICS INC., Seoul (KR)

(72) Inventors: Joonkui Ahn, Seoul (KR); Seonwook Kim, Seoul (KR); Changhwan Park, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/273,686

(22) PCT Filed: Sep. 6, 2019

(86) PCT No.: PCT/KR2019/011587
§ 371 (c)(1),
(2) Date: Mar. 4, 2021

(87) PCT Pub. No.: WO2020/050696
PCT Pub. Date: Mar. 12, 2020

(65) Prior Publication Data
US 2022/0116850 A1     Apr. 14, 2022

(30) Foreign Application Priority Data
Sep. 7, 2018   (KR) .................. 10-2018-0107232

(51) Int. Cl.
*H04W 40/22*   (2009.01)
*H04W 88/04*   (2009.01)
*H04W 72/12*   (2009.01)

(52) U.S. Cl.
CPC ....... *H04W 40/22* (2013.01); *H04W 72/1205* (2013.01); *H04W 88/04* (2013.01)

(58) Field of Classification Search
CPC . H04W 40/22; H04W 72/1205; H04W 88/04; H04W 72/04
See application file for complete search history.

(56) References Cited

U.S. PATENT DOCUMENTS

2012/0170510 A1\*   7/2012   Kim .................. H04L 5/0053
                                                         370/315
2012/0307717 A1   12/2012   Worrall et al.
(Continued)

FOREIGN PATENT DOCUMENTS

KR   10-2010-0047114   5/2010
KR   10-2012-0049845   5/2012
(Continued)

OTHER PUBLICATIONS

PCT International Application No. PCT/KR2019/011587, International Search Report dated Jan. 30, 2020, 6 pages.

*Primary Examiner* — Liton Miah
(74) *Attorney, Agent, or Firm* — Lee Hong Degerman Kang & Waimey

(57) ABSTRACT

A method for a relay terminal to transmit and receive signals in a wireless communication system according to an embodiment of the present invention includes: a step for transmitting and receiving signals to and from an upper layer node through a backhaul link in a first interval; and a step for transmitting and receiving signals to and from at least one lower layer node through an access link in a second interval, wherein the first interval includes an interval in which signals can be transmitted to and received from the upper layer node and only a first specific signal can be transmitted to and received from the at least one lower layer node, and the second interval includes an interval in which signals can (Continued)

be transmitted to and received from the at least one lower layer node and only a second specific signal can be transmitted to and received from the upper layer node.

19 Claims, 24 Drawing Sheets

(56) References Cited

U.S. PATENT DOCUMENTS

| | | | |
|---|---|---|---|
| 2016/0381666 A1* | 12/2016 | Kim ................ | H04W 72/0446 |
| | | | 370/329 |
| 2017/0317740 A1* | 11/2017 | Basu Mallick .... | H04B 7/15557 |
| 2019/0320361 A1* | 10/2019 | Uchiyama ............. | H04W 88/04 |
| 2020/0280879 A1* | 9/2020 | Liu ......................... | H04L 67/54 |
| 2021/0045130 A1* | 2/2021 | Tang ...................... | H04J 11/005 |
| 2021/0058219 A1* | 2/2021 | Kimura ................... | H04L 5/14 |
| 2021/0058884 A1* | 2/2021 | Liu ....................... | H04W 56/00 |
| 2021/0127389 A1* | 4/2021 | Liu ....................... | H04L 5/0087 |
| 2021/0168656 A1* | 6/2021 | Li ......................... | H04B 7/2606 |
| 2021/0235428 A1* | 7/2021 | Zhang .................... | H04B 7/086 |

FOREIGN PATENT DOCUMENTS

| | | |
|---|---|---|
| KR | 10-2014-0007940 | 1/2014 |
| KR | 10-2014-0016318 | 2/2014 |

* cited by examiner

[FIG. 1]
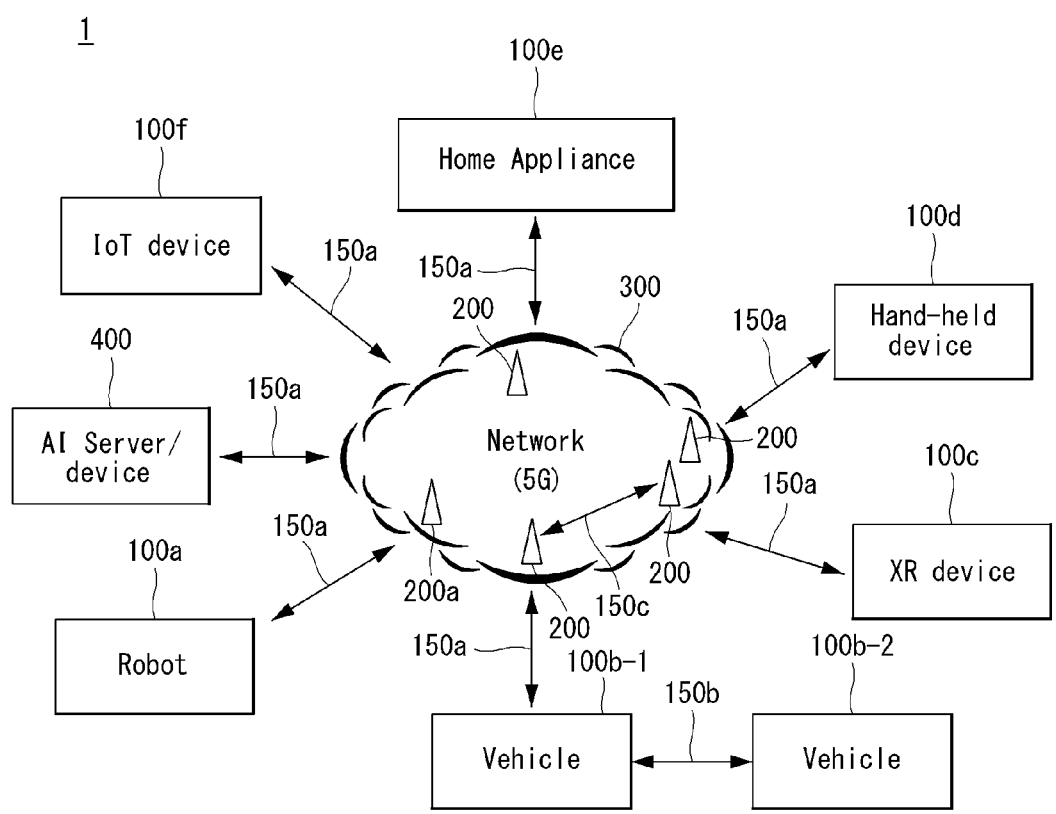

[FIG. 2]
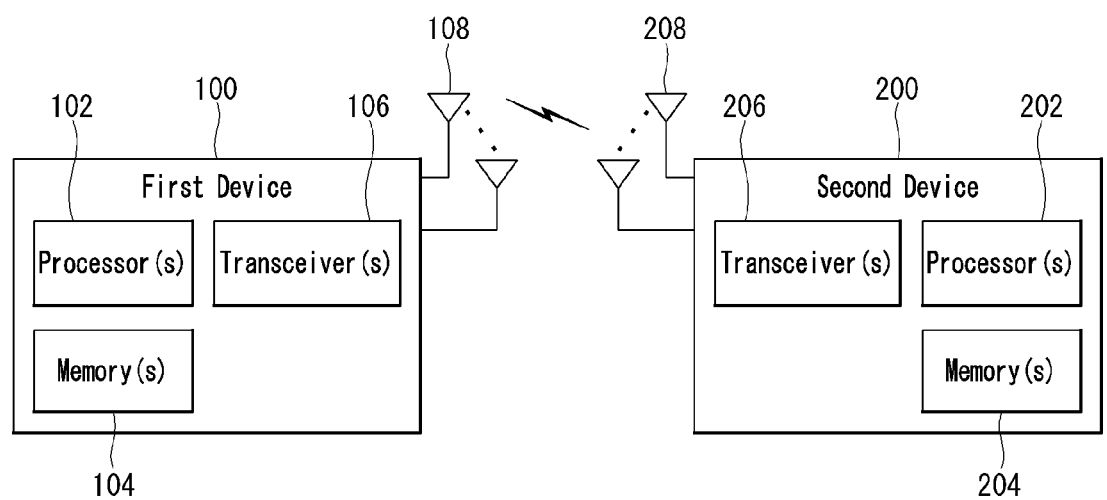

[FIG. 3]
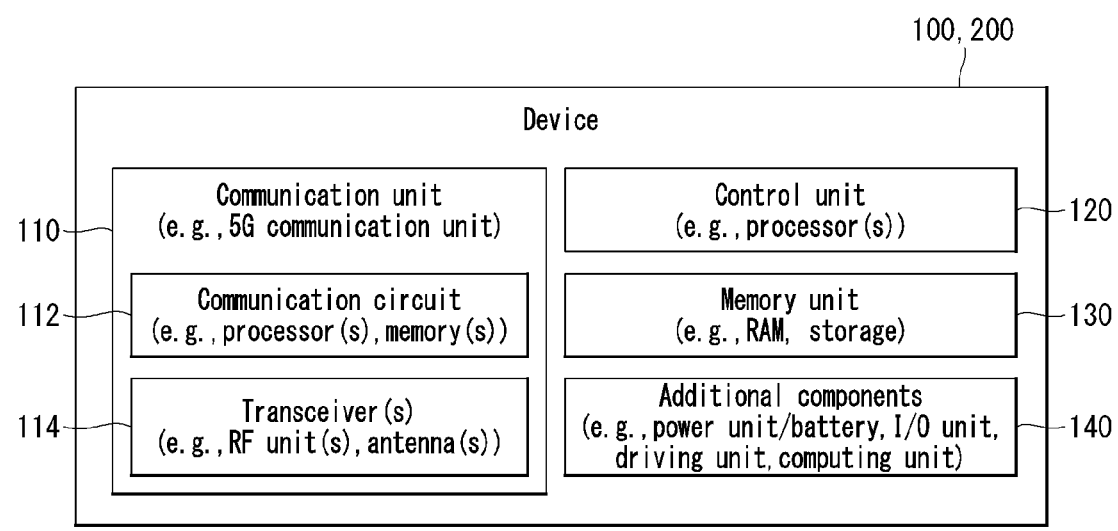

[FIG. 4]
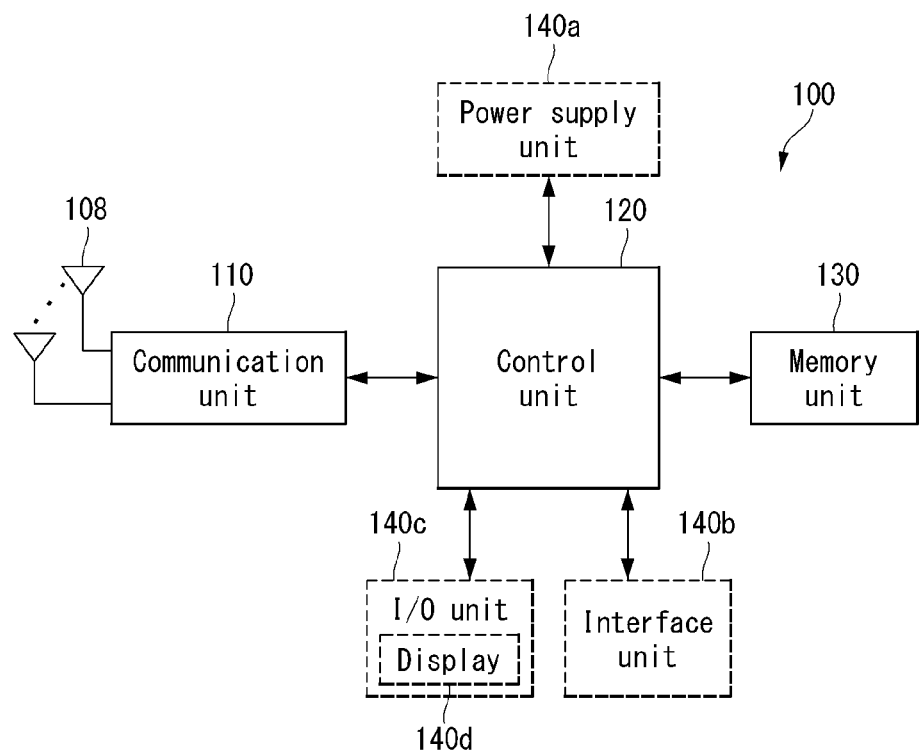

[FIG. 5]
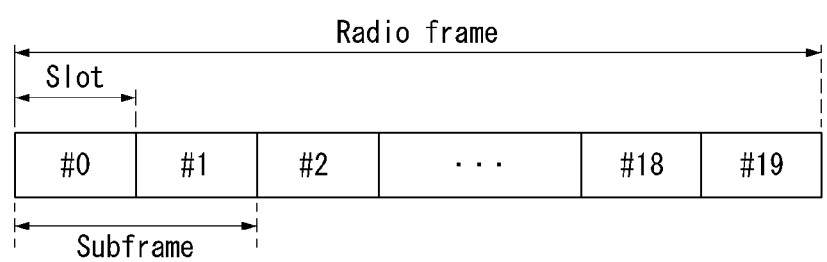

[FIG. 6]
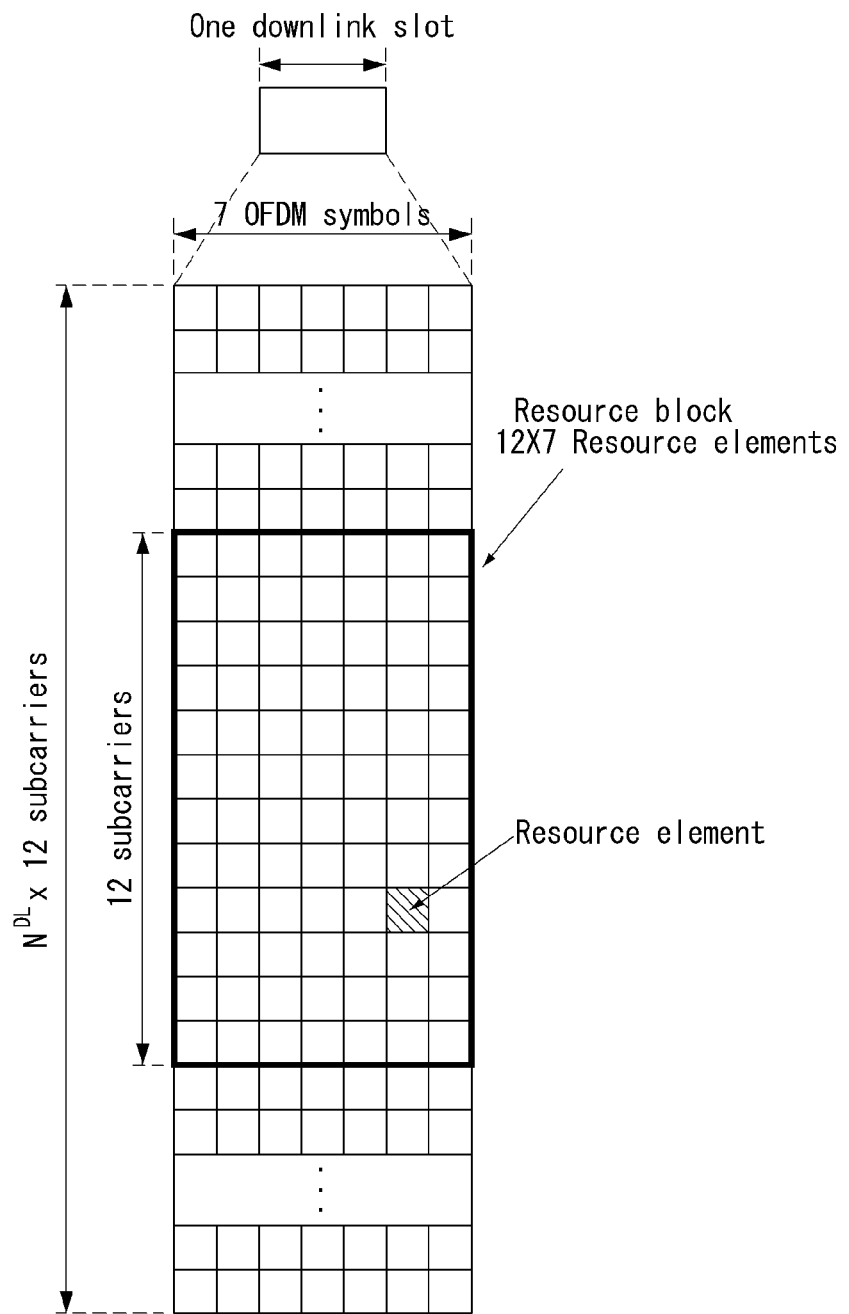

[FIG. 7]
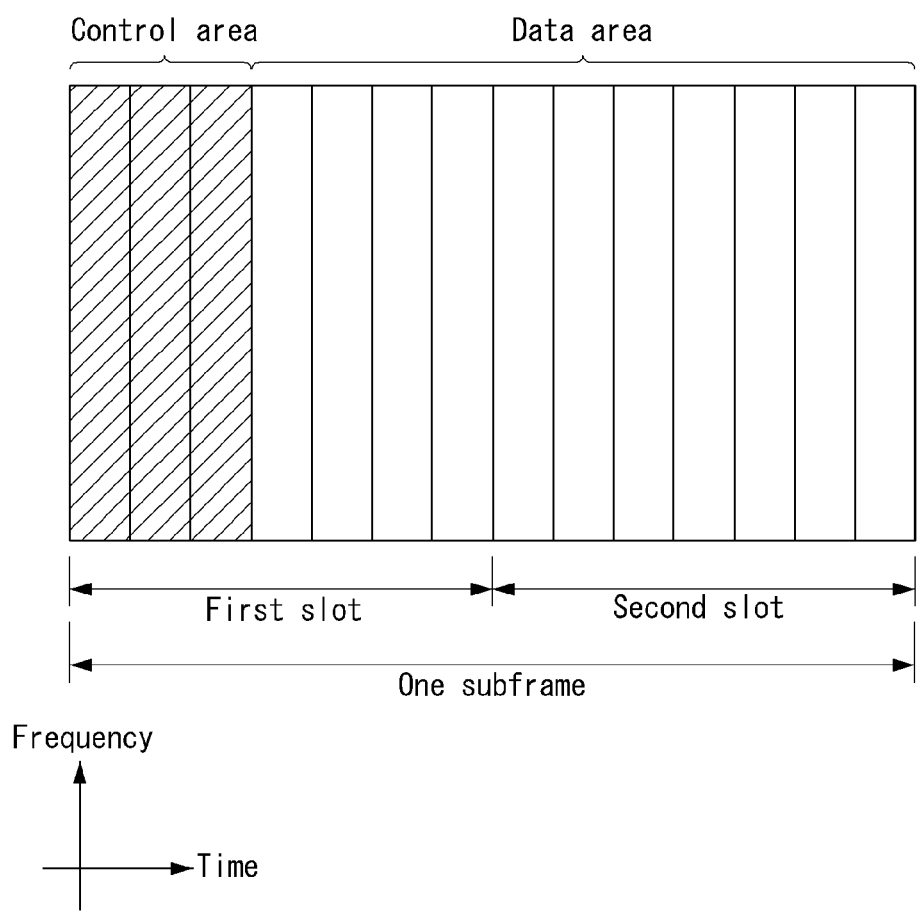

[FIG. 8]
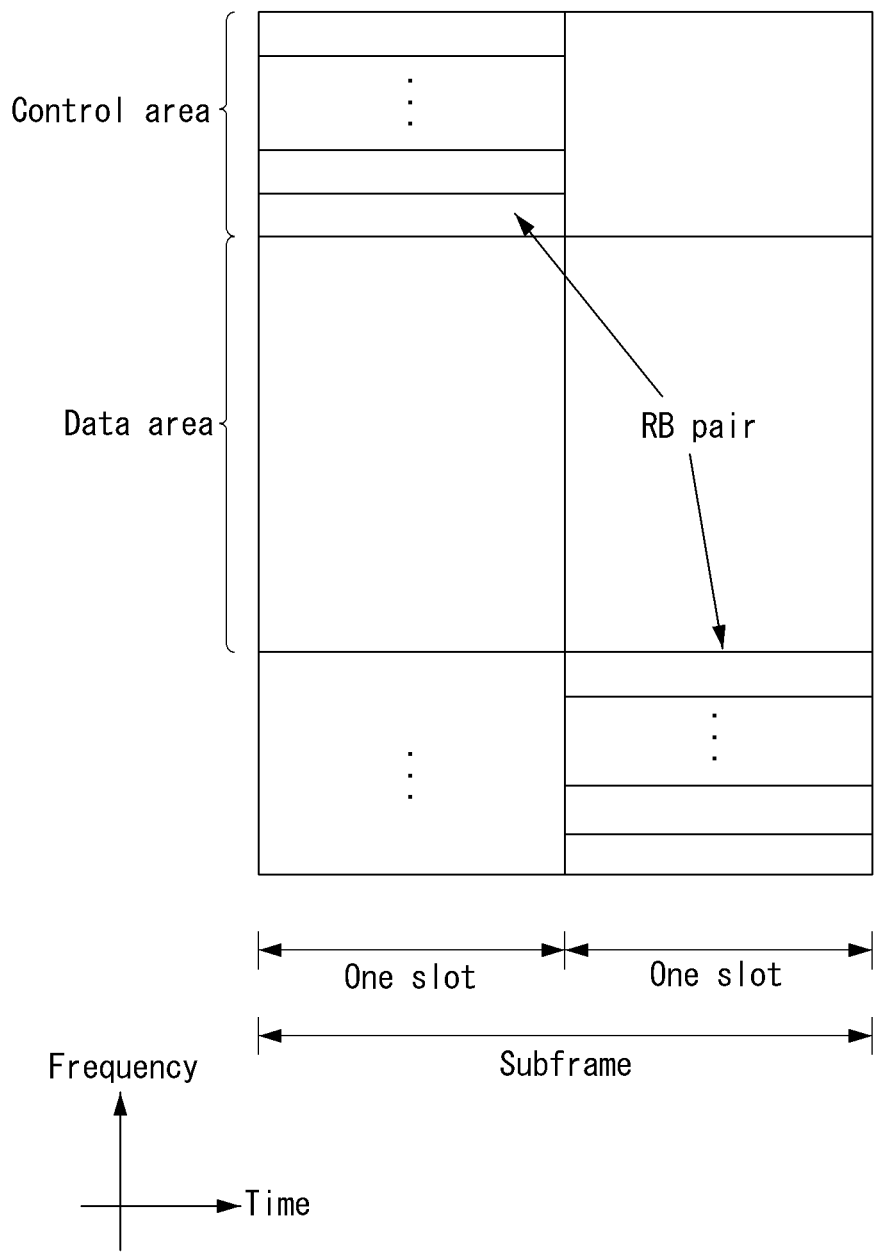

[FIG. 9]
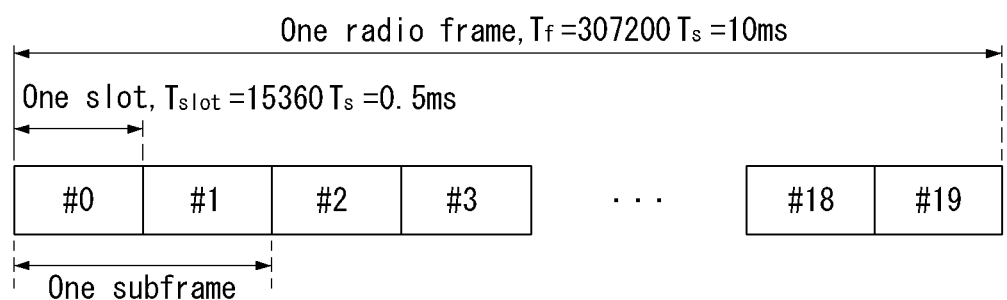

[FIG. 10]
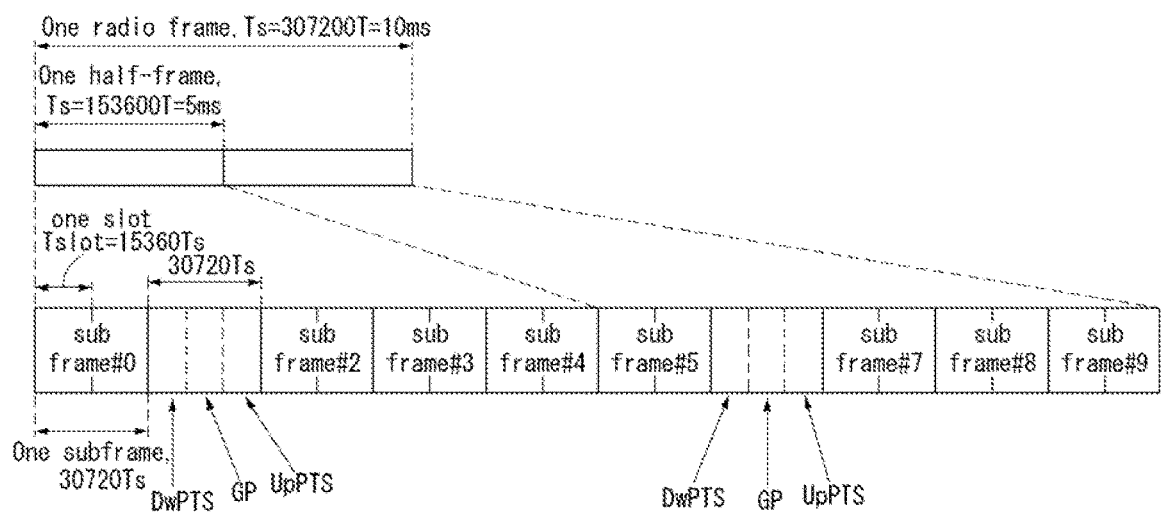

[FIG. 11]
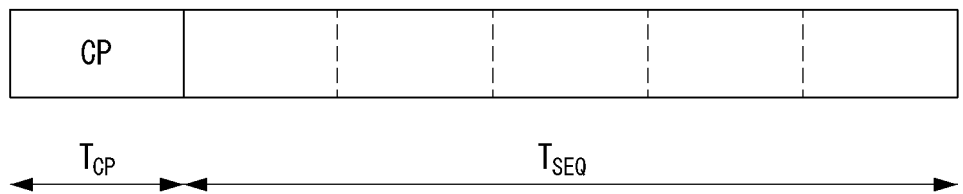

[FIG. 12]
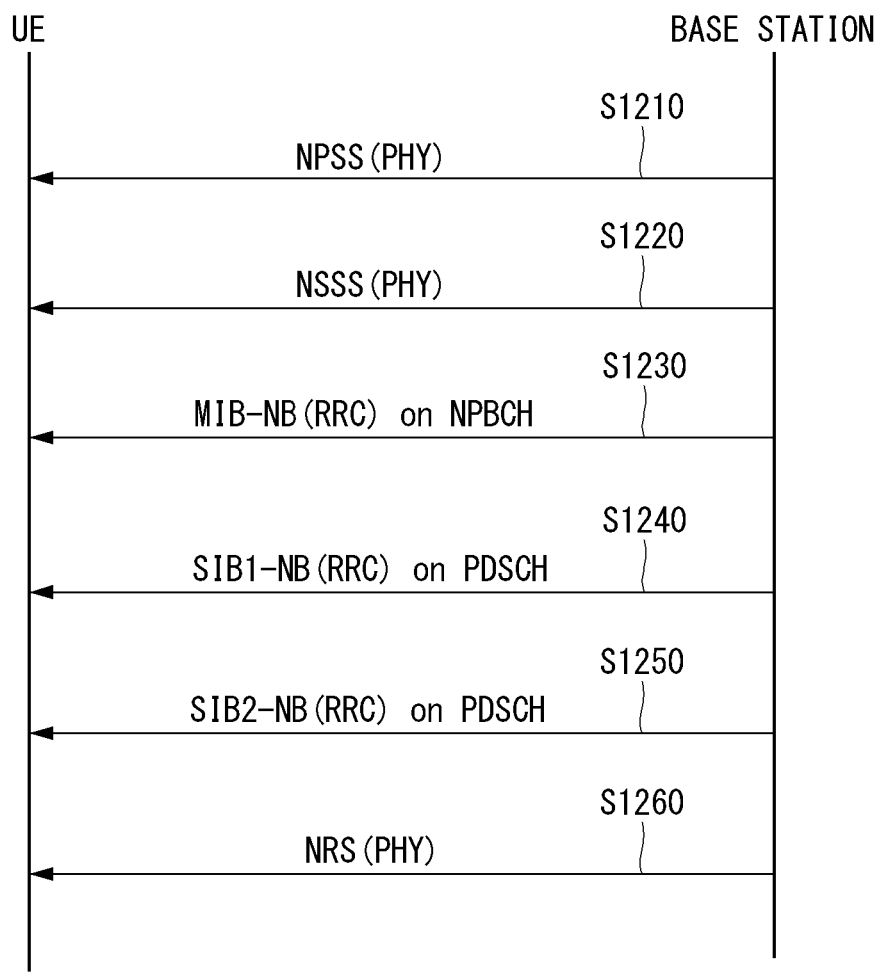

[FIG. 13]
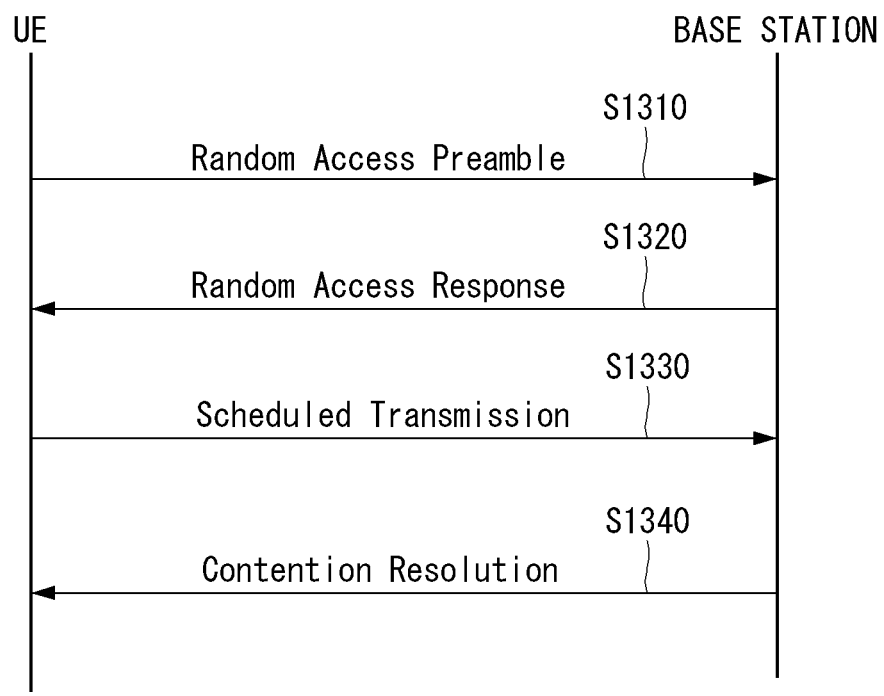

[FIG. 14]
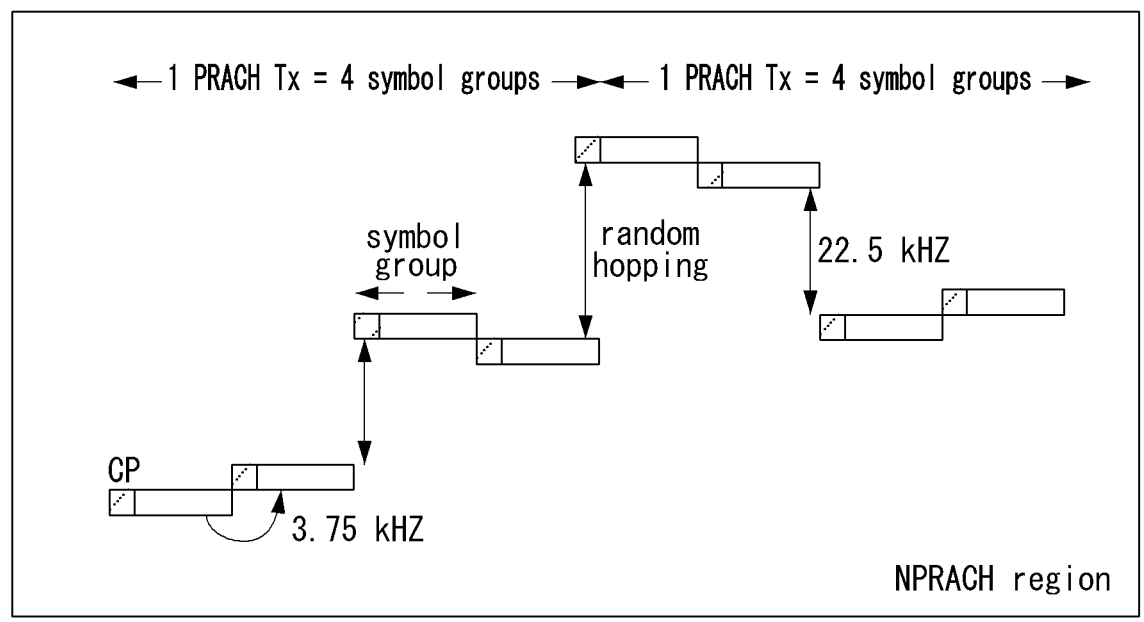
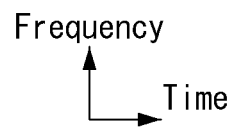

[FIG. 15]
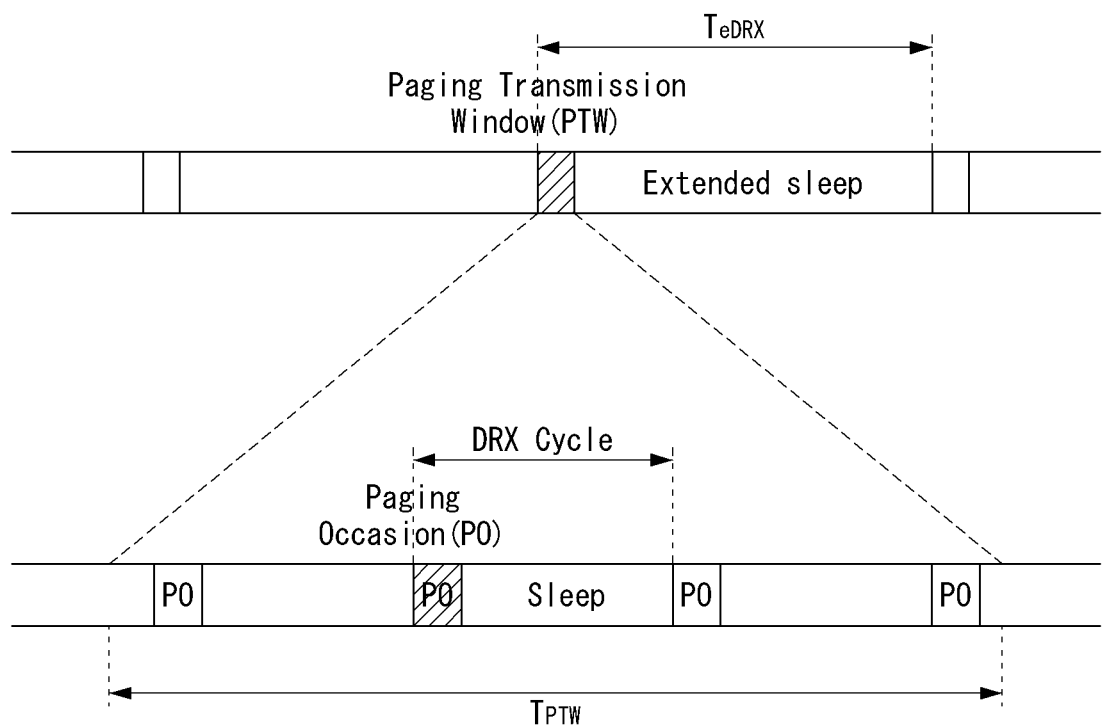

[FIG. 16]
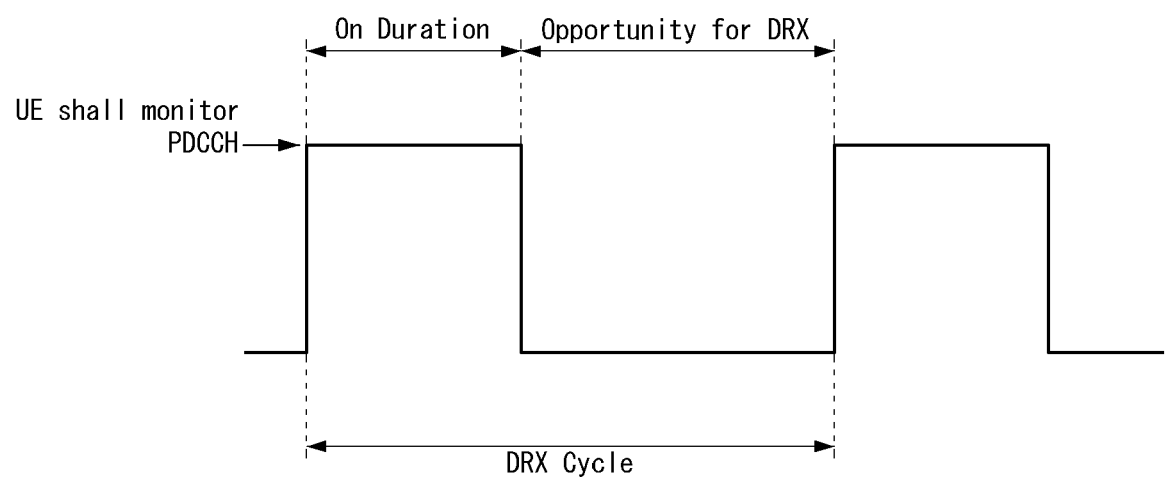

[FIG. 17]
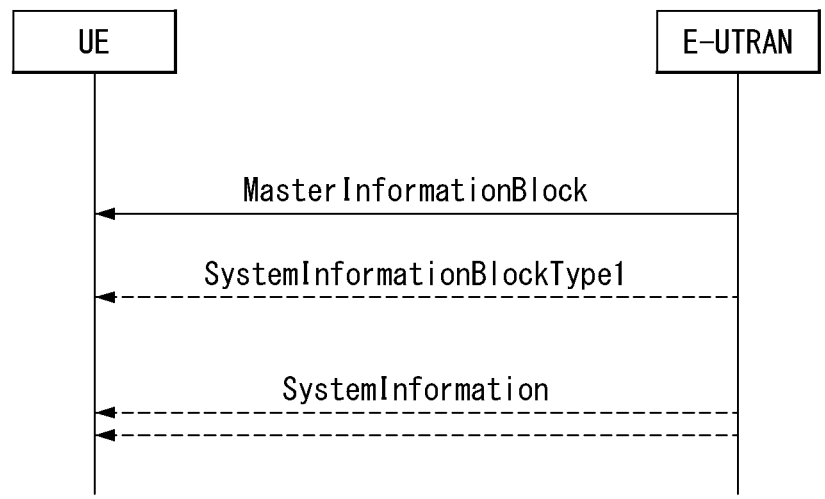

[FIG. 18]
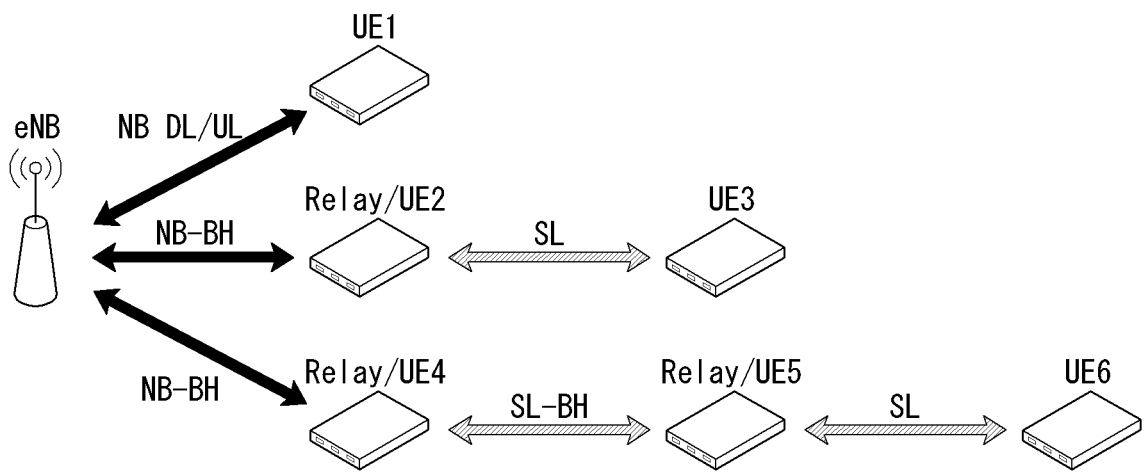

[FIG. 19]
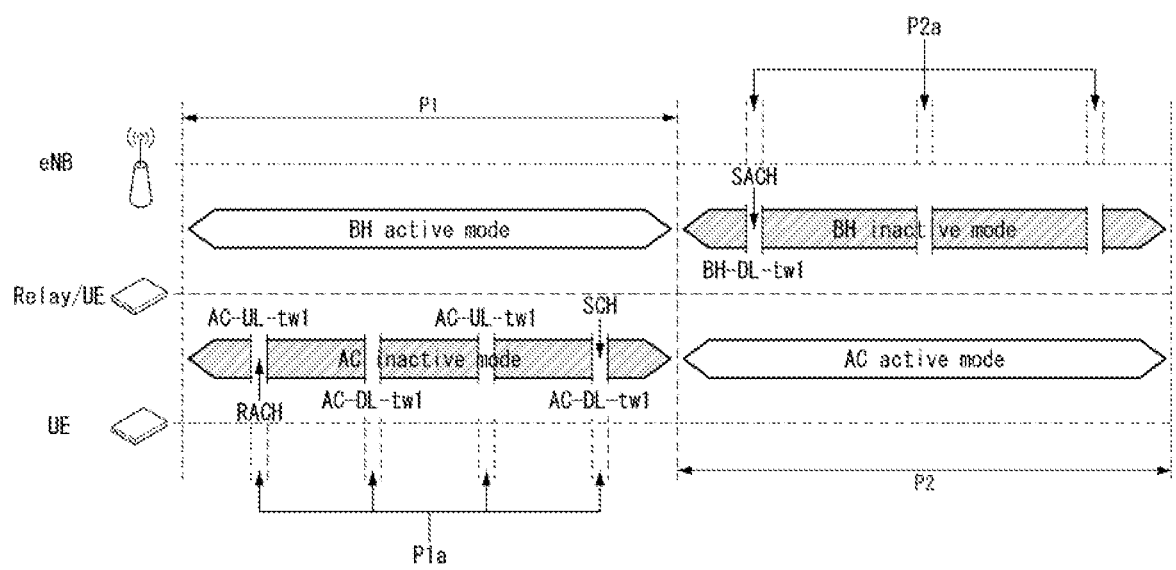

[FIG. 20]
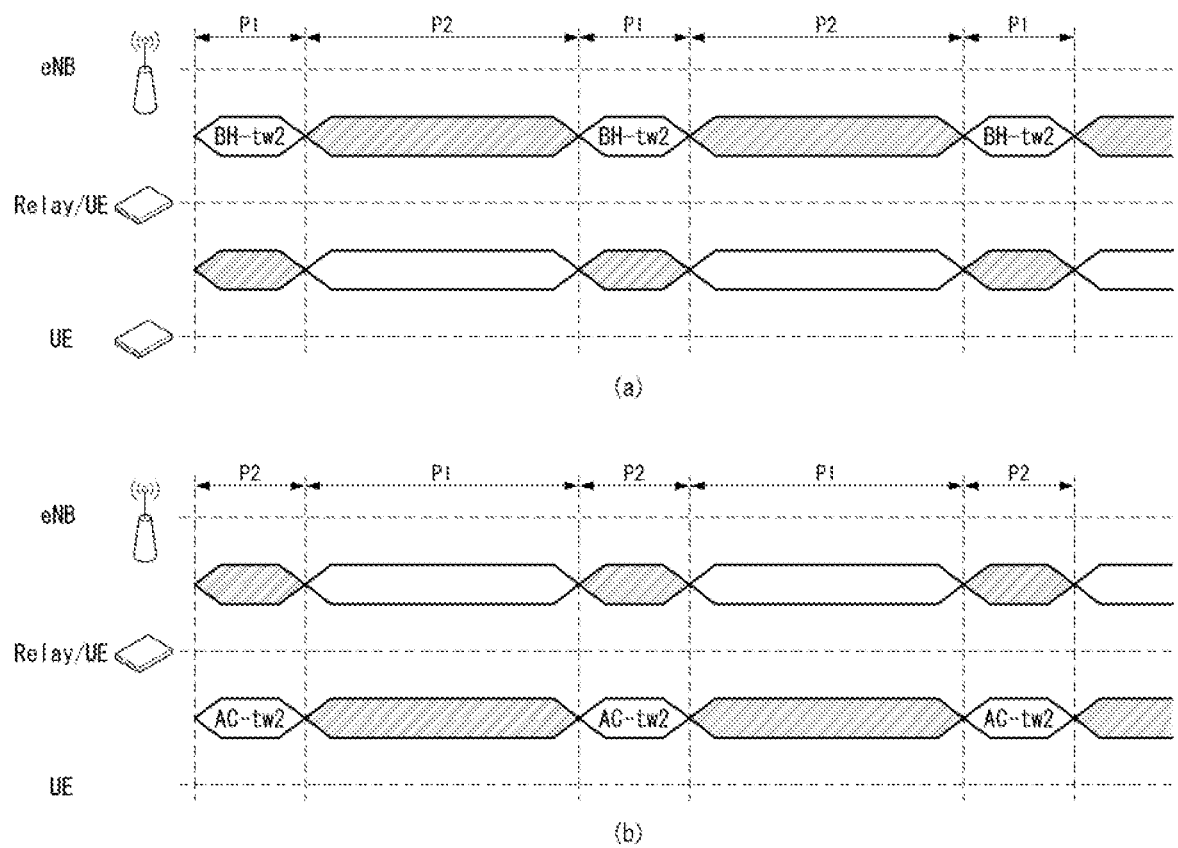

[FIG. 21]
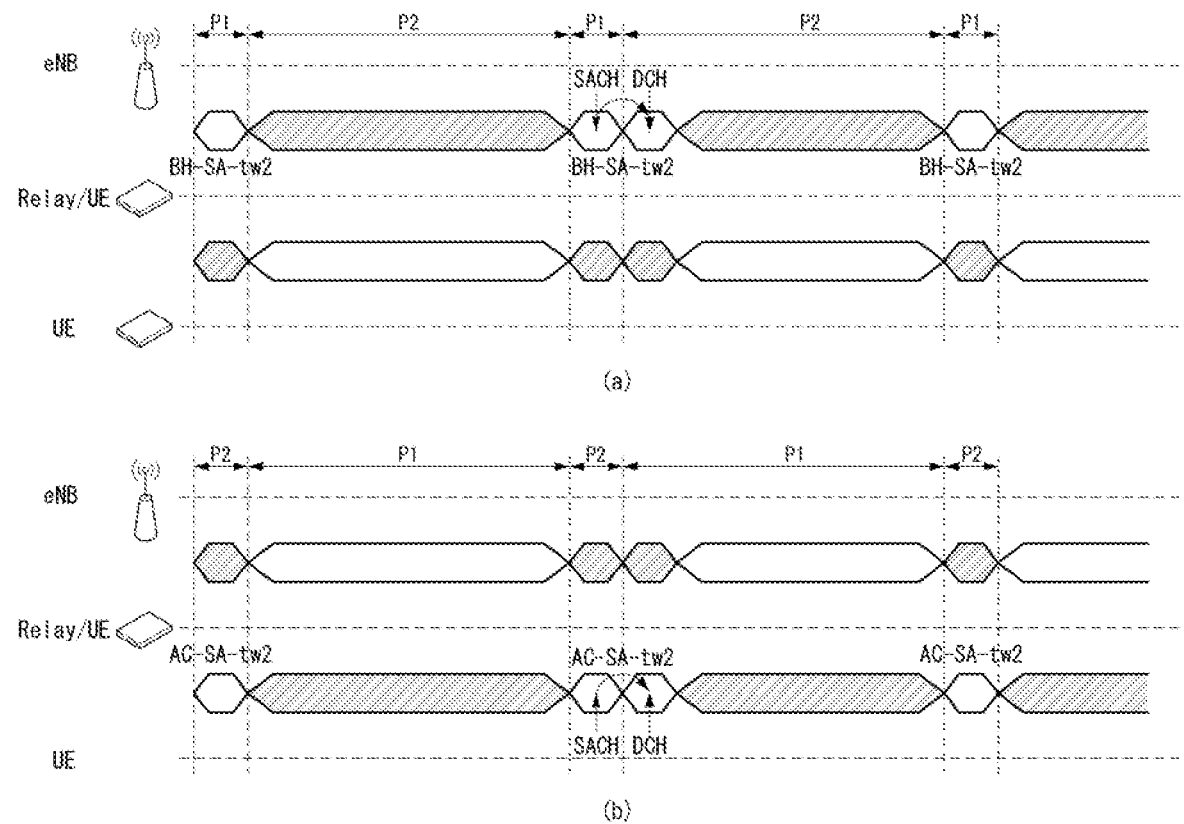

[FIG. 22]
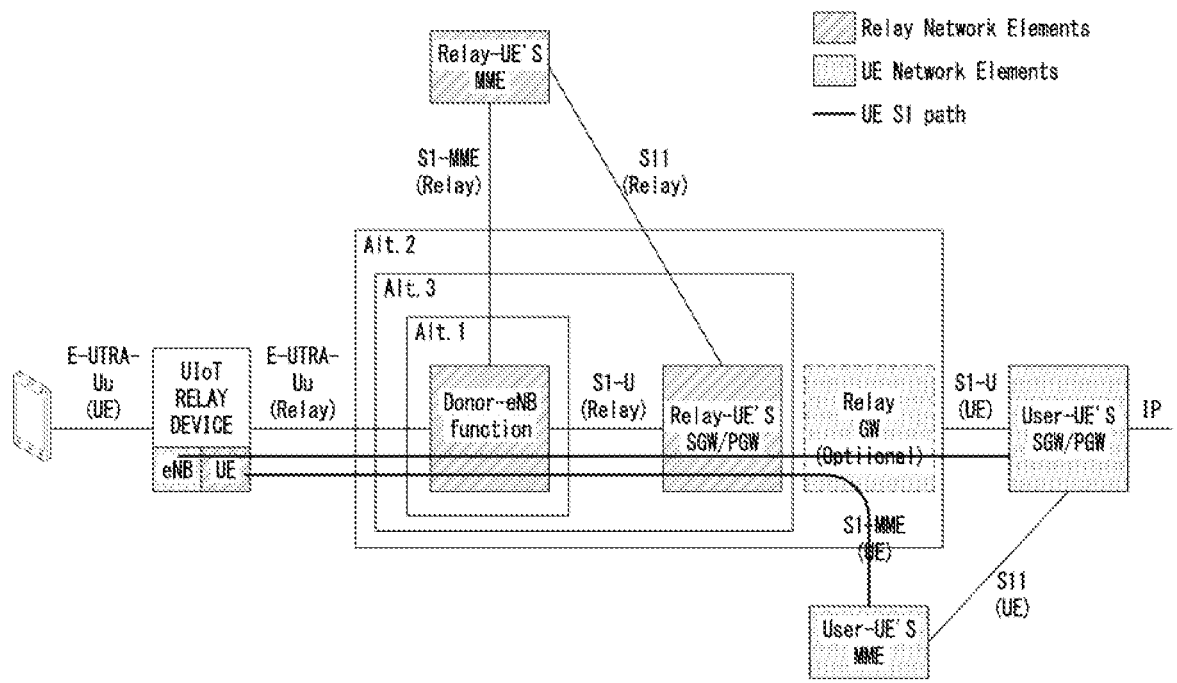

[FIG. 23]
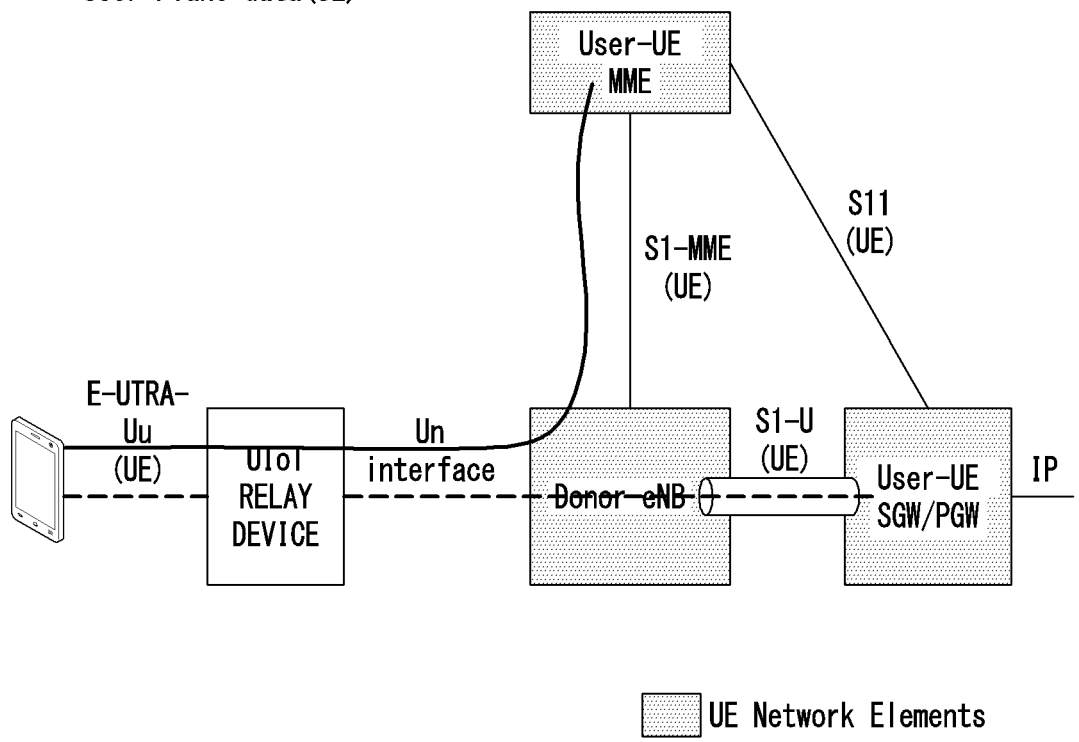

[FIG. 24]
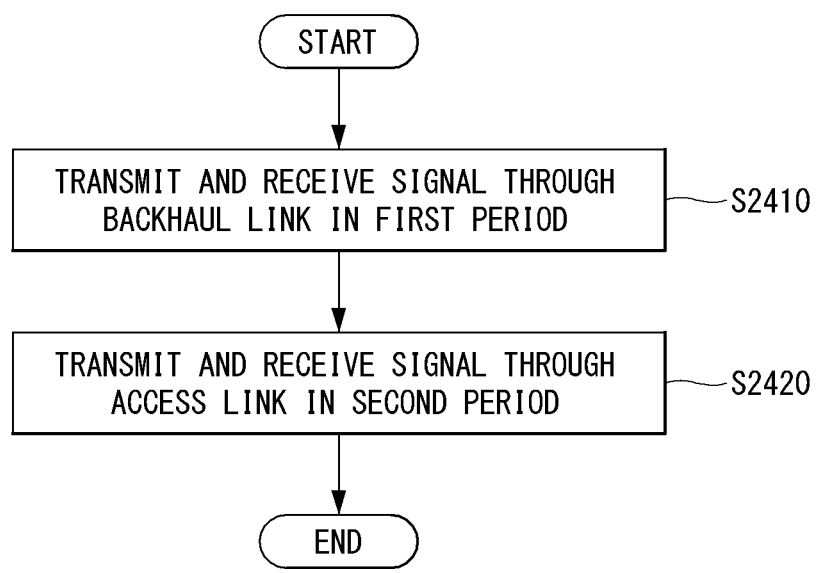

METHOD FOR RELAY TERMINAL TO TRANSMIT AND RECEIVE SIGNALS IN WIRELESS COMMUNICATION SYSTEM, AND DEVICE FOR SAME

CROSS-REFERENCE TO RELATED APPLICATIONS

This application is the National Stage filing under 35 U.S.C. 371 of International Application No. PCT/KR2019/011587, filed on Sep. 6, 2019, which claims the benefit of earlier filing date and right of priority to Korean Application No. 10-2018-0107232, filed on Sep. 7, 2018, the contents of which are all hereby incorporated by reference herein their entirety.

TECHNICAL FIELD

The present disclosure provides a method of transmitting and receiving, by a relay terminal, signals in a wireless communication system, and a device therefor.

BACKGROUND ART

Mobile communication systems were developed to ensure user activity and provide voice service. However, mobile communication systems have extended their range to data service as well as voice, and currently the explosive increase in traffic is causing a lack of resources and there is a users' demand for faster services, which is creating a need for advanced mobile communication systems.

The requirements for next-generation mobile communication systems largely include coping with explosive data traffic, very high data rates per user, coping with a surprisingly large number of connected devices, very low end-to-end latency, and support for high energy efficiency. To this end, research is ongoing on a variety of technologies such as dual connectivity, massive MIMO (massive multiple input multiple output), in-band full duplex, NOMA (non-orthogonal multiple access), support for super wideband, and device networking.

DISCLOSURE

Technical Problem

An embodiment of the present disclosure provides a method of transmitting and receiving, by a relay terminal, signals, and a device therefor.

Furthermore, an embodiment of the present disclosure provides effectively performing switching of a period for signal transmission and reception of respective links (a backhaul link and an access link).

Furthermore, an embodiment of the present disclosure provides considering complexity of implementing a relay terminal in performing signal transmission and reception of the relay terminal.

Furthermore, an embodiment of the present disclosure provides considering resource utilization in performing signal transmission and reception for each link.

Technical objects to be achieved by the present disclosure are not limited to the aforementioned technical objects, and other technical objects not described above may be evidently understood by a person having ordinary skill in the art to which the present disclosure pertains from the following description.

Technical Solution

According to an embodiment of the present disclosure, a method of transmitting and receiving, by a relay terminal, a signal in a wireless communication system includes: transmitting and receiving signals to and from an upper node through a backhaul link in a first period; and transmitting and receiving signals to and from at least one lower node through an access link in a second period, in which the first period includes a period in which signals may be transmitted to and received from the upper node and only a first specific signal may be transmitted to and received from the at least one lower node, and the second period includes a period in which signals may be transmitted to and received from the at least one lower node and only a second specific signal may be transmitted to and received from the upper node.

The relay terminal operates in different modes in the first period and the second period, respectively, and the mode is an active mode or an inactive mode.

The active mode is a mode in which signals may be transmitted and received, and the inactive mode is a mode in which signals may not be transmitted and received.

At least one of the backhaul link or the access link is a side link (SL).

The first specific signal is a signal related to a random access channel (RACH) or a synchronization channel (SCH), and the second specific signal is a signal related to a scheduling assignment channel (SACH).

At least one of a specific area of the first period or a specific area of the second period is assigned semi-statically.

The upper node is a base station or another relay terminal.

The first period is switched to the second period when receiving, from the upper node, data to be transmitted to the at least one lower node is completed or when the first specific signal is received from the at least one lower node, and the second period is switched to the first period when receiving data, from the at least one lower node, to be transmitted to the upper node is completed or when the second specific signal is received from the upper node.

The first specific signal related to switching to the second period is a random access preamble, and the second specific signal related to switching to the first period is a backhaul scheduling channel (BH-SACH) for scheduling a paging.

Any one period of the first period or the second period is assigned semi-statically, when the first period is assigned semi-statically, the signals are transmitted and received only through the backhaul link in the corresponding period, and when the second period is assigned semi-statically, the signals are transmitted and received only through the access link in the corresponding period.

When the first period is assigned semi-statically, the backhaul scheduling assignment channel (BH-SACH) is received from the upper node in the first period and a backhaul scheduled data channel (BH-DCH) scheduled by the BH-SACH is received from the upper node in the second period.

In the second period, any one of reception of the BH-DCH, and transmission and reception of the signals through the access link has a priority.

In the second period, when the reception of the BH-DCH has the priority, information for a period for receiving the BH-DCH is transmitted to the at least one lower node, and when the transmission and reception of the signals through the access link have the priority, information for a period in which the BH-DCH may not be received is transmitted to the upper node.

When the second period is assigned semi-statically, an access scheduling assignment channel (AC-SACH) is received from the at least one lower node in the second period and an access scheduled data channel (AC-DCH) scheduled by the AC-SACH is received from the at least one lower node in the first period.

In the first period, any one of the reception of the AC-DCH, and the transmission and reception of the signals through the backhaul link has a priority.

In the first period, when the reception of the AC-DCH has the priority, information for a period for receiving the AC-DCH is transmitted to the upper node, and when the transmission and reception of the signals through the backhaul link have the priority, information for a period in which the AC-DCH may not be received is transmitted to the at least one lower node.

According to another embodiment of the present disclosure, a relay terminal transmitting and receiving signals in a wireless communication system includes: a transceiver transmitting and receiving a radio signal; a memory; and a processor connected to the transceiver and the memory, in which the processor is configured to transmit and receive signals to and from an upper node through a backhaul link in a first period, and transmit and receive signals to and from at least one lower node through an access link in a second period. The first period includes a period in which signals may be transmitted to and received from the upper node and only a first specific signal may be transmitted to and received from the at least one lower node, and the second period includes a period in which signals may be transmitted to and received from the at least one lower node and only a second specific signal may be transmitted to and received from the upper node.

At least one of the backhaul link or the access link is a side link (SL).

The first specific signal is a signal related to a random access channel (RACH) or a synchronization channel (SCH), and the second specific signal is a signal related to a scheduling assignment channel (SACH).

Advantageous Effects

In a wireless communication system according to an embodiment of the present disclosure, a method of transmitting and receiving, by a relay terminal, signals, and a device thereof separates periods (first and second periods) for signal transmission and reception for each link (a backhaul link or an access link). According to the present disclosure, since transmission and reception of a specific signal related to synchronization maintenance of each link (the backhaul link or the access link) is performed in specific regions of different periods (second and first periods), a relay service can be stably provided while preventing a collision between signal transmission and reception operations of each link.

Furthermore, according to the present disclosure, when reception of data to be transmitted from an upper node to a lower node is completed or the second specific signal is received, the first period is switched to the second period. Furthermore, when reception of data to be transmitted from the lower node to the upper node is completed or the first specific signal is received, the second period is switched to the first period. Therefore, in the present disclosure, since the period is adaptively switched the first or second period according to a signal transmission and reception situation for each link, the quality of a relay service is improved.

Furthermore, any one period of the first period or the second period is assigned semi-statically. Since signals are transmitted and received only through the backhaul link or the access link in the corresponding period, an operation of the relay terminal is simplified. Accordingly, according to the present disclosure, complexity of relay terminal implementation can be reduced.

Furthermore, in the present disclosure, since only transmission and reception of SACH (BH-SACH or AC-SACH) is configured to be performed the semi-statically assigned period (the first period or the second period), resource utilization can be increased by minimizing the semi-statically period.

Furthermore, in the present disclosure, transmission and reception of DCH (BH-DCH or AC-DCH) scheduled by the SACH are performed according to a priority in different periods (the second period or the first period). Accordingly, in the present disclosure, a collision which may occur as transmission and reception of DCH scheduled in the semi-statically assigned period (the first or second period) are performed in different periods (the second or first period) can be prevented and ambiguity of the relay terminal operation can be removed.

Effects which may be obtained by the present disclosure are not limited to the aforementioned effects, and other technical effects not described above may be evidently understood by a person having ordinary skill in the art to which the present disclosure pertains from the following description.

DESCRIPTION OF DRAWINGS

The accompany drawings, which are included to provide a further understanding of the present disclosure and are incorporated on and constitute a part of this specification illustrate embodiments of the present disclosure and together with the description serve to explain the principles of the present disclosure.

FIG. 1 illustrates a communication system 1 applied to the present disclosure.

FIG. 2 illustrates a wireless device applicable to the present disclosure.

FIG. 3 illustrates another example of a wireless device applied to the present disclosure.

FIG. 4 illustrates a hand-held device applied to the present disclosure.

FIG. 5 is a diagram illustrating an example of an LTE radio frame structure.

FIG. 6 is a diagram illustrating an example of a resource grid for a downlink slot.

FIG. 7 illustrates an example of a structure of a downlink subframe.

FIG. 8 illustrates an example of a structure of an uplink subframe.

FIG. 9 illustrates an example of frame structure type 1.

FIG. 10 illustrates another example of frame structure type 2.

FIG. 11 illustrates an example of a random access symbol group.

FIG. 12 is a flowchart for describing an initial access process in relation to a wireless system supporting a narrowband Internet of things system.

FIG. 13 is a flowchart for describing a random access process in relation to a wireless system supporting a narrowband Internet of things system.

FIG. 14 is a diagram for describing a narrowband physical random access channel (NPRACH) region in relation to a wireless system supporting a narrowband Internet of things system.

FIG. 15 illustrates an example of a DRX scheme in an idle state and/or an inactive state.

FIG. 16 illustrates one example of a DRX cycle.

FIG. 17 illustrates a general system for a system information acquisition procedure.

FIG. 18 illustrates a relay network configuration to which the present disclosure is applied.

FIG. 19 is a diagram for describing a period for signal transmission and reception by a relay terminal is switched according to an embodiment of the present disclosure.

FIG. 20 is a diagram for describing a period semi-statically configured for a backhaul link or an access link according to an embodiment of the present disclosure.

FIG. 21 is a diagram for describing of a scheduled DCH in relation to the interval semi-statically configured for the backhaul link or the access link according to an embodiment of the present disclosure.

FIGS. 22 and 23 illustrate a relay scenario which may occur in an LTE network in a situation in which the present disclosure is applied.

FIG. 24 is a flowchart for describing a method of transmitting and receiving, by a relay terminal, signals in a wireless communication system according to an embodiment of the present disclosure.

MODE FOR DISCLOSURE

Hereinafter, preferred embodiments of the present disclosure will be described in detail with reference to the accompanying drawings. The detailed description, which will be given below with reference to the accompanying drawings, is intended to explain exemplary embodiments of the present disclosure and is not intended to represent the only embodiments in which the present disclosure may be practiced. The following detailed description includes specific details in order to provide a thorough understanding of the present disclosure. However, those skilled in the art appreciate that the present disclosure may be practiced without these specific details.

In some instances, well-known structures and devices may be omitted or shown in a block diagram form centering on the core functions of the structures and devices in order to avoid obscuring the concepts of the present disclosure.

In the present disclosure, a base station has a meaning as a terminal node of a network that directly communicates with a terminal. In the present disclosure, a specific operation described as being performed by the base station may be performed by an upper node of the base station in some cases. That is, it is apparent that various operations performed for communication with the terminal in the network constituted by multiple network nodes including the base station may be performed by the base station or network nodes other than the base station. A 'base station (BS)' may be replaced with terms including a fixed station, a Node B, an evolved-NodeB (eNB), a base transceiver system (BTS), an access point (AP), a next generation NB, and the like. Further, a 'terminal' may be fixed or mobile and may be replaced with terms including a user equipment (UE), a mobile station (MS), a user terminal (UT), a mobile subscriber station (MSS), a subscriber station (SS), an Advanced Mobile Station (WT), a Wireless Terminal (WT), a Machine-Type Communication (MTC) device, a Machine-to-Machine (M2M) device, and a Device-to-Device (D2D) device, and the like.

Hereinafter, downlink (DL) means communication from a base station to a terminal and uplink (UL) means communication from the terminal to the base station. In the downlink, a transmitter may be part of the base station, and a receiver may be part of the terminal. In the uplink, the transmitter may be part of the terminal and the receiver may be part of the base station.

Specific terms used in the following description are provided to help the understanding of the present disclosure, and the use of the specific terms may be changed to other forms without departing from the technical spirit of the present disclosure.

The following technology may be used for various multiple access schemes which include code division multiple access (CDMA), frequency division multiple access (FDMA), time division multiple access (TDMA), orthogonal frequency division multiple access (OFDMA), single carrier frequency division multiple access (SC-FDMA), non-orthogonal multiple access (NOMA), and the like. The CDMA may be implemented as radio technology such as universal terrestrial radio access (UTRA) or CDMA2000. The TDMA may be implemented as radio technology such as global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802, Evolved UTRA (E-UTRA), or the like. The UTRA is part of Universal Mobile Telecommunications System (UMTS). 3rd Generation Partnership Project (3GPP) Long Term Evolution (LTE) as a part of Evolved UMTS (E-UMTS) using the E-UTRA adopts OFDMA in downlink and adopts SC-FDMA in uplink. LTE-Advanced (A) is evolution of LTE.

Embodiments of the present disclosure may be supported by standard documents disclosed in at least one of wireless access systems IEEE 802, 3GPP, and 3GPP2. That is, steps or portions of the embodiments of the present disclosure which are not described in order to clearly illustrate the technical spirit of the present disclosure may be supported by the documents. Further, all terms disclosed in the present disclosure may be described by the standard document.

For clarity of description, 3GPP LTE/LTE-A is mainly described, but the technical features of the present disclosure are not limited thereto.

Example of Wireless Communication System Applied to Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 1 illustrates a communication system 1 applied to the present disclosure.

Referring to FIG. 1, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the Wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Device Applied to Present Disclosure

FIG. 2 illustrates wireless devices applicable to the present disclosure.

Referring to FIG. 2, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. W1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing apart or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Example of Application of Wireless Device Applied to the Present Disclosure

FIG. 3 illustrates another example of a wireless device applied to the present disclosure.

The wireless device may be implemented in various forms according to a use-case/service (refer to FIG. 1). Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 2. For example, the transceiver(s) 114 may include the one or more transceivers 106 and 206 and/or the one or more antennas 108 and 208 of FIG. 2. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. W1), the vehicles (100b-1 and 100b-2 of FIG. W1), the XR device (100c of FIG. W1), the hand-held device (100d of FIG. W1), the home appliance (100e of FIG. W1), the IoT device (100f of FIG. W1), a digital broadcast terminal, a hologram device, a public safety device, an MTC device, a medicine device, a fintech device (or a finance device), a security device, a climate/environment device, the AI server/device (400 of FIG. W1), the BSs (200 of FIG. W1), a network node, etc. The wireless device may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

FIG. 4 illustrates a hand-held device applied to the present disclosure.

The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 4, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 3, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

LTE System in General

FIG. 5 is a diagram showing an example of an LTE radio frame structure.

In FIG. 5, a radio frame includes 10 subframes. A subframe includes two slots in time domain. A time for transmitting one subframe is defined as a transmission time interval (TTI). For example, one subframe may have a length of 1 millisecond (ms), and one slot may have a length of 0.5 ms. One slot includes a plurality of orthogonal frequency division multiplexing (OFDM) symbols in time domain. Since the 3GPP LTE uses the OFDMA in the downlink, the OFDM symbol is for representing one symbol period. The OFDM symbol may also be referred to as an SC-FDMA symbol or a symbol period. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

FIG. 6 is a diagram showing an example of a resource grid for a downlink slot.

In FIG. 6, a downlink slot includes a plurality of OFDM symbols in time domain. It is described herein that one downlink slot includes 7 OFDM symbols, and one resource block (RB) includes 12 subcarriers in frequency domain as an example. However, the present disclosure is not limited thereto. Each element on the resource grid is referred to as a resource element (RE). One RB includes 12×7 REs. The number NDL of RBs included in the downlink slot depends on a downlink transmit bandwidth. The structure of an uplink slot may be same as that of the downlink slot.

FIG. 7 shows an example of a downlink subframe structure.

In FIG. 7, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of downlink control channels used in the 3GPP LTE includes a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/not-acknowledgment (NACK) signal. Control information transmitted through the PDCCH is referred to as downlink control information (DCI). The DCI includes uplink or downlink scheduling information or includes an uplink transmit (Tx) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined according to a correlation between the number of CCEs and the coding rate provided by the CCEs. The BS determines a PDCCH format according to a DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for system information (more specifically, a system information block (SIB) to be described below), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

FIG. 8 shows an example of an uplink subframe structure.

In FIG. 8, an uplink subframe can be divided in a frequency domain into a control region and a data region. The control region is allocated with a physical uplink control channel (PUCCH) for carrying uplink control information. The data region is allocated with a physical uplink shared channel (PUSCH) for carrying user data. To maintain a single carrier property, one UE does not simultaneously transmit the PUCCH and the PUSCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary.

Hereinafter, an LTE frame structure is described more specifically.

Throughout LTE specification, unless otherwise noted, the size of various fields in the time domain is expressed as a number of time units $T_s=1/(15,000\times2,048)$ seconds.

Downlink and uplink transmissions are organized into radio frames with $T_f=307200\times T_s=10$ ms duration. Two radio frame structures are supported:
Type 1: applicable to FDD
Type 2: applicable to TDD
Frame Structure Type 1

Frame structure type 1 is applicable to both full duplex and half duplex FDD. Each radio frame is $T_f=307200\cdot T_s=10$ ms long and consists of 20 slots of length $T_{slot}=15360 \cdot T_s=0.5$ ms, numbered from 0 to 19. A subframe is defined as two consecutive slots where subframe i consists of slots 2i and 2i+1.

For FDD, 10 subframes are available for downlink transmission and 10 subframes are available for uplink transmissions in each 10 ms interval.

Uplink and downlink transmissions are separated in the frequency domain. In half-duplex FDD operation, the UE cannot transmit and receive at the same time while there are no such restrictions in full-duplex FDD.

FIG. 9 shows an example of a frame structure type 1.
Frame Structure Type 2

Frame structure type 2 is applicable to TDD. Each radio frame of length $T_f=307200\times T_s=10$ ms consists of two half-frames of length 15360 $T_s=0.5$ ms each. Each half-frame consists of five subframes of length $30720\cdot T_s=1$ ms. The supported uplink-downlink configurations are listed in Table 2 where, for each subframe in a radio frame, "D" denotes the subframe is reserved for downlink transmissions, "U" denotes the subframe is reserved for uplink transmissions and "S" denotes a special subframe with the three fields DwPTS, GP and UpPTS. The length of DwPTS and UpPTS is given by Table 1 subject to the total length of DwPTS, GP and UpPTS being equal to $30720\cdot T_s=1$ ms. Each subframe i is defined as two slots, 2i and 2i+1 of length $T_{slot}=15360\cdot T_s=0.5$ ms in each subframe.

Uplink-downlink configurations with both 5 ms and 10 ms downlink-to-uplink switch-point periodicity are supported. In case of 5 ms downlink-to-uplink switch-point periodicity, the special subframe exists in both half-frames. In case of 10 ms downlink-to-uplink switch-point periodicity, the special subframe exists in the first half-frame only. Subframes 0 and 5 and DwPTS are always reserved for downlink transmission. UpPTS and the subframe immediately following the special subframe are always reserved for uplink transmission.

FIG. 10 is a diagram showing another example of a frame structure type 2.

Table 1 shows an example of the configuration of a special subframe.

TABLE 1

| Special subframe configuration | normal cyclic prefix in downlink | | | extended cyclic prefix in downlink | | |
| --- | --- | --- | --- | --- | --- | --- |
| | | UpPTS | | | UpPTS | |
| | DwPTS | normal cyclic prefix in uplink | extended cyclic prefix in uplink | DwPTS | normal cyclic prefix in uplink | extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Table 2 shows an example of an uplink-downlink configuration

TABLE 2

| Uplink-Downlink configuration | Downlink-to-Uplink Switch-point periodicity | Subframe number | | | | | | | | | |
| --- | --- | --- | --- | --- | --- | --- | --- | --- | --- | --- | --- |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Narrowband-Internet of Things (NB-IoT)

A narrowband-Internet of things (NB-IoT) is a standard for supporting low complexity, low cost devices, and has been defined to perform only a relatively simple operation compared to the existing LTE devices. The NB-IoT follows the basic structure of LTE, but operates based on the following defined contents. If the NB-IoT reuses a channel or signal of LTE, it may follow the standard defined in the existing LTE.

Narrowband Primary Synchronization Signal (NPSS)

The sequence $d_l(n)$ used for the narrowband primary synchronization signal is generated from a frequency-domain Zadoff-Chu sequence according to Equation 1:

$$d_l(n) = S(l) \cdot e^{-j\frac{\pi u n(n+1)}{11}}, \quad n = 0, 1, \ldots, 10 \quad \text{[Equation 1]}$$

where the Zadoff-Chu root sequence index u=5 and S(l) for different symbol indices l is given by Table 3.

Table 3 shows an example of S(l).

TABLE 3

| Cyclic prefix length | S(3), ..., S(13) | | | | | | | | | | |
| --- | --- | --- | --- | --- | --- | --- | --- | --- | --- | --- | --- |
| Normal | 1 | 1 | 1 | 1 | −1 | −1 | 1 | 1 | 1 | −1 | 1 |

The same antenna port shall be used for all symbols of the narrowband primary synchronization signal within a subframe.

UE shall not assume that the narrowband primary synchronization signal is transmitted on the same antenna port as any of the downlink reference signals. The UE shall not assume that the transmissions of the narrowband primary synchronization signal in a given subframe use the same antenna port, or ports, as the narrowband primary synchronization signal in any other subframe.

The sequences $d_l(n)$ shall be mapped to resource elements (k, l) in increasing order of first the index k=0, 1, ..., $N_{sc}^{RB}-2$ and then the index l=3, 4, ..., $2N_{symb}^{DL}-1$ in subframe 5 in every radio frame. For resource elements (k, l) overlapping with resource elements where cell-specific reference signals are transmitted, the corresponding sequence element d(n) is not used for the NPSS but counted in the mapping process.

Narrowband Secondary Synchronization Signal (NSSS)

The sequence d(n) used for the narrowband secondary synchronization signal is generated from a frequency-domain Zadoff-Chu sequence according to Equation 2:

$$d(n) = b_q(n) \cdot e^{-j2\pi \Theta_f n} \cdot e^{-j\frac{\pi u n'(n'+1)}{131}} \quad \text{[Equation 2]}$$

Where $n = 0, 1, \ldots, 131$ $n' = n \bmod 131$ $m = n \bmod 128$ $u = N_{ID}^{Ncell} \bmod 126 + 3$ $q = \left\lfloor \frac{N_{ID}^{Ncell}}{126} \right\rfloor$ The binary sequence $b_q(n)$ is given by Table 4. The cyclic shift $\Theta_f$ in frame number $n_f$ is given by $\Theta_f = 33/132 \, (n_f/2) \bmod 4$ Table 4 shows an example of $b_q(n)$.

TABLE 4

| q | $b_q(0), \ldots, b_q(127)$ |
| --- | --- |
| 0 | [1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1] |

TABLE 4-continued

| q | $b_q(0), \ldots, b_q(127)$ |
|---|---|
| 1 | [1 -1 -1 1 -1 1 1 -1 -1 1 1 -1 1 -1 -1 1 1 -1 1 1 -1 1 -1 -1 -1<br>1 1 -1 -1 1 -1 1 1 1 -1 -1 1 -1 1 -1 1 1 1 -1 -1 1 1 1 -1 1 -1 -1<br>1 -1 1 1 1 -1 1 -1 -1 1 1 1 -1 -1 1 -1 1 1 1 -1 1 -1 -1 1 1 -1 1<br>1 -1 -1 1 1 1 -1 1 -1 -1 1 -1 1 1 1 -1 1 -1 -1 1 1 1 -1 -1 1 -1 -1<br>1 1 -1 1 1 1 -1 -1 1 -1 1 1 1 -1 -1 1 1 1 -1 1 -1 -1 1 1 -1 1 1 -1<br>1 -1 -1 1 1 1 -1 1 -1 -1 1 1 1 -1]|
| 2 | [1 -1 -1 1 -1 1 1 1 -1 -1 1 1 1 -1 1 -1 -1 1 1 1 -1 -1 1 1 -1 -1<br>1 1 -1 -1 1 -1 1 1 1 -1 -1 1 1 1 -1 1 -1 -1 1 1 1 -1 -1 1 1 -1 1<br>1 -1 1 1 -1 -1 1 -1 1 1 1 -1 -1 1 1 1 -1 1 -1 -1 1 1 1 -1 1 -1 1<br>1 -1 -1 1 1 1 -1 1 -1 -1 1 -1 1 1 1 -1 1 -1 -1 1 1 1 -1 -1 1 -1 -1<br>1 1 -1 -1 1 1 -1 -1 1 -1 1 1 1 -1 1 -1 -1 1 1 1 -1 -1 1 -1 -1 1 -1<br>1 1 -1 -1 1 1 -1 1 -1 -1 1 1]|
| 3 | [1 -1 -1 1 -1 1 1 1 -1 -1 1 1 1 -1 1 -1 -1 1 1 -1 1 1 -1 1 -1 -1<br>1 1 -1 -1 1 -1 1 1 1 -1 -1 1 1 -1 1 -1 -1 1 1 1 -1 -1 1 1 -1 1 1<br>1 -1 -1 1 -1 1 1 1 -1 -1 1 1 1 -1 1 -1 -1 1 1 -1 1 1 -1 -1 1 -1 -1<br>1 1 -1 -1 1 -1 1 1 1 -1 -1 1 -1 1 1 1 -1 -1 1 1 1 -1 1 -1 -1 1 -1<br>1 1 -1 -1 1 -1 1 1 1 -1 -1 1 1 -1 -1 1 -1 -1 1 1 1 -1<br>1 -1 -1 1 1 1 -1 -1 1 1 -1 1 1 -1]|

The same antenna port shall be used for all symbols of the narrowband secondary synchronization signal within a subframe.

The UE shall not assume that the narrowband secondary synchronization signal is transmitted on the same antenna port as any of the downlink reference signals. The UE shall not assume that the transmissions of the narrowband secondary synchronization signal in a given subframe use the same antenna port, or ports, as the narrowband secondary synchronization signal in any other subframe.

The sequence d(n) shall be mapped to resource elements (k,l) in sequence starting with d(0) in increasing order of first the index k over the 12 assigned subcarriers and then the index l over the last $N_{symb}^{NSSS}$ symbols allocated in radio frames fulfilling $n_f$ mod 2=0, where $N_{symb}^{NSSS}$ is given by Table 5.

Table 5 shows an example of the number of NSSS symbols.

TABLE 5

| Cyclic prefix length | $N_{symb}^{NSSS}$ |
|---|---|
| Normal | 11 |

For resource elements (k, l) overlapping with resource elements where cell-specific reference signals are transmitted, the corresponding sequence element d(n) is not used for the NSSS but counted in the mapping process.

Scrambling

Scrambling shall be done according to Clause 6.6.1 of 3GPP TS 36.211 with $M_{bit}$ denoting the number of bits to be transmitted on the NPBCH. $M_{bit}$ equals 1600 for normal cyclic prefix. The scrambling sequence shall be initialized with $c_{init}=N_{ID}^{Ncell}$ in radio frames that satisfy $n_f$ mod 64=0.

Modulation

Modulation shall be done according to Clause 6.6.2 of TS36.211 using the modulation scheme in Table 30.

Table 6 shows an example of a modulation scheme for NPBCH.

TABLE 6

| Physical channel | Modulation schemes |
|---|---|
| NPBCH | QPSK |

Layer Mapping and Precoding

Layer mapping and precoding shall be done according to Clause 6.6.3 of 3GPP TS 36.211 with P∈{1,2}. The UE shall assume antenna ports $R_{2000}$ and $R_{2001}$ are used for the transmission of the narrowband physical broadcast channel.

Mapping to Resource Elements

The block of complex-valued symbols $y^{(p)}(0), \ldots, y^{(p)}(M_{symb}-1)$ for each antenna port is transmitted in subframe 0 during 64 consecutive radio frames starting in each radio frame fulfilling $n_f$ mod 64=0 and shall be mapped in sequence starting with $y^{(0)}$ to resource elements (k, l). The mapping to resource elements (k, l) not reserved for transmission of reference signals shall be in increasing order of first the index k, then the index l. After mapping to a subframe, the subframe shall be repeated in subframe 0 in the 7 following radio frames, before continuing the mapping of $y^{(p)}(\cdot)$ to subframe 0 in the following radio frame. The first three OFDM symbols in a subframe shall not be used in the mapping process.

For the purpose of the mapping, the UE shall assume cell-specific reference signals for antenna ports 0-3 and narrowband reference signals for antenna ports 2000 and 2001 being present irrespective of the actual configuration. The frequency shift of the cell-specific reference signals shall be calculated by replacing $N_{ID}^{cell}$ with $N_{ID}^{cell}$ in the calculation of $v_{shift}$ in clause 6.10.1.2.

Next, information related to MIB-NB and SIBN1-NB will be described more specifically.

MasterInformationBlock-NB

The MasterInformationBlock-NB includes the system information transmitted on BCH.

Signalling radio bearer: N/A
RLC-SAP: TM
Logical channel: BCCH
Direction: E-UTRAN to UE Table 7 shows an example of a MasterInformationBlock-NB format.

TABLE 7

| -- ASN1START | |
|---|---|
| MasterInformationBlock-NB ::= SEQUENCE { | |
|     systemFrameNumber-MSB-r13 | BIT STRING (SIZE (4)), |
|     hyperSFN-LSB-r13 | BIT STRING (SIZE (2)), |
|     schedulingInfoSIB1-r13 | INTEGER (0..15), |
|     systemInfoValueTag-r13 | INTEGER (0..31), |
|     ab-Enabled-r13 | BOOLEAN, |
|     operationModeInfo-r13 | CHOICE { |
|         inband-SamePCI-r13 | Inband-SamePCI-NB-r13, |
|         inband-Different PCI-r13 | Inband-Different PCI-NB-r13, |
|         guardband-r13 | Guardband-NB-r13, |
|         standalone-r13 | Standalone-NB-r13 |
|     }, | |
|     spare | BIT STRING (SIZE |

TABLE 7-continued

```
(11))
}
ChannelRasterOffset-NB-r13 ::= ENUMERATED {khz-7dot5, khz-2dot5, khz2dot5,
khz7dot5}
Guardband-NB-r13 ::=              SEQUENCE {
    rasterOffset-r13                  ChannelRasterOffset-NB-r13,
    spare                             BIT STRING (SIZE
(3))
}
Inband-SamePCI-NB-r13 ::=     SEQUENCE {
    eutra-CRS-SequenceInfo-r13        INTEGER (0..31)
}
Inband-Different PCI-NB-r13 ::=   SEQUENCE {
    eutra-NumCRS-Ports-r13            ENUMERATED {same, four},
    rasterOffset-r13                  ChannelRasterOffset-NB-r13,
    spare                             BIT STRING (SIZE
(2))
}
Standalone-NB-r13 ::=             SEQUENCE {
    spare                             BIT STRING (SIZE
(5))
}
-- ASN1STOP
```

Table 8 shows the description of the MasterInformationBlock-NB field.

TABLE 8

MasterInformationBlock-NB field descriptions ab-Enabled
Value TRUE indicates that access barring is enabled and that the UE shall acquire SystemInformationBlockType14-NB before initiating RRC connection establishment or resume.
eutra-CRS-SequenceInfo
Information of the carrier containing NPSS/NSSS/NPBCH.
Each value is associated with an E-UTRA PRB index as an offset from the middle of the LTE system sorted out by channel raster offset.
See TS 36.211[21] and TS 36.213 [23].
eutra-NumCRS-Ports
Number of E-UTRA CRS antenna ports, either the same number of ports as NRS or 4 antenna ports. See TS 36.211 [21] and TS 36.212 [22], and TS 36.213 [23].
hyperSFN-LSB
Indicates the 2 least significant bits of hyper SFN. The remaining bits are present in SystemInformationBlockType1-NB.
operationModeInfo
Deployment scenario (in-band/guard-band/standalone) and related information. See TS 36.211 [21] and TS 36.213 [23].
Inband-SamePCI indicates an in-band deployment and that the NB-IoT and LTE cell share the same physical cell id and have the same number of NRS and CRS ports.
Inband-DifferentPCI indicates an in-band deployment and that the NB-IoT and LTE cell have different physical cell id.

TABLE 8-continued

MasterInformationBlock-NB field descriptions guardband indicates a guard-band deployment.
standalone indicates a standalone deployment.
rasterOffset
NB-IoT offset from LTE channel raster. Unit in kHz in set {−7.5, −2.5, 2.5, 7.5} See TS 36.211[21] and TS 36.213 [23].
schedulingInfoSIB1
This field contains an index to a table specified in TS 36.213 [23, Table 16.4.1.3-3] that defines SystemInformationBlockType1-NB scheduling information.
systemFrameNumber-MSB
Defines the 4 most significant bits of the SFN. As indicated in TS 36.211 [21], the 6 least significant bits of the SFN are acquired implicitly by decoding the NPBCH.
systemInfoValueTag
Common for all SIBs other than MIB-NB, SIB14-NB and SIB16-NB.

SystemInformationBlockType1-NB

The SystemInformationBlockType1-NB message contains information relevant when evaluating if a UE is allowed to access a cell and defines the scheduling of other system information.

Signalling radio bearer: N/A
RLC-SAP: TM
Logical channel: BCCH
Direction: E-UTRAN to UE Table 9 shows an example of the SystemInformationBlockType1 (SIB1)-NB message.

TABLE 9

```
-- ASN1START
SystemInformationBlockType1-NB ::=    SEQUENCE {
    hyperSFN-MSB-r13                              BIT STRING (SIZE
(8)),
    cellAccessRelatedInfo-r13             SEQUENCE {
        plmn-IdentityList-r13                     PLMN-IdentityList-
NB-r13,
        trackingAreaCode-r13                      TrackingAreaCode,
        cellIdentity-r13                          CellIdentity,
        cellBarred-r13
        ENUMERATED {barred, notBarred},
        intraFreqReselection-r13                  ENUMERATED    {allowed,
notAllowed}
    },
    cellSelectionInfo-r13                 SEQUENCE {
        q-RxLevMin-r13                                Q-
```

TABLE 9-continued

```
RxLevMin,
        q-QualMin-r13                                  Q-QualMin-r9
    },
    p-Max-r13                                          P-Max
        OPTIONAL,                       -- Need OP
    freqBandIndicator-r13                              FreqBandIndicator-NB-r13
    freqBandInfo-r13                                   NS-PmaxList-NB-r13
        OPTIONAL,       -- Need OR
    multiBandInfoList-r13                              MultiBandInfoList-NB-r13
        OPTIONAL,       -- Need OR
    downlinkBitmap-r13                                 DL-Bitmap-NB-r13
        OPTIONAL,                       -- Need OP,
    eutraControlRegionSize-r13                         ENUMERATED {n1, n2, n3}
        OPTIONAL,       --Cond inband
    nrs-CRS-PowerOffset-r13                            ENUMERATED           {dB-6,
dB-4dot77, dB-3,
                dB-1dot77, dB0,         dB1,
                dB1dot23,   dB2,        dB3,
                dB4,        dB4dot23,   dB5,
                dB6,        dB7,        dB8,
                dB9}        OPTIONAL,                  -- Cond inband-SamePCI
    schedulingInfoList-r13                             SchedulingInfoList-NB-r13,
    si-WindowLength-r13                                ENUMERATED
{ms160, ms320, ms480,        ms640,
                 ms960, ms1280, ms1600, spare1},
    si-RadioFrameOffset-r13                            INTEGER (1..15)
        OPTIONAL, -- Need OP
    systemInfoValueTagList-r13                         SystemInfoValueTagList-NB-r13
        OPTIONAL,-- Need OR
    lateNonCriticalExtension                           OCTET STRING
        OPTIONAL,
    nonCriticalExtension                               SEQUENCE { }
        OPTIONAL
}
PLMN-IdentityList-NB-r13 ::=            SEQUENCE (SIZE (1..maxPLMN-r11)) OF
    PLMN-IdentityInfo-NB-r13
PLMN-IdentityInfo-NB-r13 ::=            SEQUENCE {
    plmn-Identity-r13                                  PLMN-Identity,
    cellReservedForOperatorUse-r13                     ENUMERATED        {reserved,
notReserved},
    attachWithoutPDN-Connectivity-r13                  ENUMERATED {true}   OPTIONAL
    -- Need OP
}
SchedulingInfoList-NB-r13 ::=           SEQUENCE (SIZE (1..maxSI-Message-NB-r13)) OF
    SchedulingInfo-NB-r13
SchedulingInfo-NB-r13::=                SEQUENCE {
    si-Periodicity-r13                                 ENUMERATED {rf64, rf128, rf256,
rf512,
            rf1024, rf2048, rf4096, spare},
    si-RepetitionPattern-r13                           ENUMERATED          {every2ndRF,
every4thRF,
                every8thRF, every16thRF},
    sib-MappingInfo-r13                                SIB-MappingInfo-NB-r13,
    si-TB-r13                           ENUMERATED {b56, b120, b208, b256, b328,
b440, b552, b680}
}
SystemInfoValueTagList-NB-r13 ::=       SEQUENCE (SIZE (1.. maxSI-Message-NB-
r13)) OF
        SystemInfoValueTagSI-r13
SIB-MappingInfo-NB-r13 ::=              SEQUENCE (SIZE (0..maxSIB-1)) OF
    SIB-Type-NB-r13
SIB-Type-NB-r13 ::=                     ENUMERATED {
    sibType3-NB-r13, sibType4-NB-r13, sibType5-NB-r13,
    sibType14-NB-r13, sibType16-NB-r13, spare3, spare2, spare1}
-- ASN1STOP
```

Table 10 shows the description of the SystemInformationBlockType1-NB field.

TABLE 10

SystemInformationBlockType1-NB field descriptions attachWithoutPDN-Connectivity
If present, the field indicates that attach without PDN connectivity as specified in TS 24.301 [35] is supported for this PLMN.

TABLE 10-continued

SystemInformationBlockType1-NB field descriptions cellBarred
Barred means the cell is barred, as defined in TS 36.304 [4].
cellIdentity
Indicates the cell identity.
cellReservedForOperatorUse
As defined in TS 36.304 [4].

TABLE 10-continued

SystemInformationBlockType1-NB field descriptions cellSelectionInfo
Cell selection information as specified in TS 36.304 [4].
downlinkBitmapNB-IoT downlink subframe configuration for downlink transmission.
If the bitmap is not present, the UE shall assume that all subframes are valid (except for subframes carrying NPSS/NSSS/NPBCH/SIB1-NB) as specified in TS 36.213[23].
eutraControlRegionSize
Indicates the control region size of the E-UTRA cell for the in-band operation mode. Unit is in number of OFDM symbols.
freqBandIndicator
A list of as defined in TS 36.101 [42, table 6.2.4-1] for the frequency band in freqBandIndicator.
freqBandInfo
A list of additionalPmax and additionalSpectrumEmission values as defined in TS 36.101 [42, table 6.2.4-1] for the frequency band in freqBandIndicator.
hyperSFN-MSB
Indicates the 8 most significat bits of hyper-SFN. Together with hyperSFN-LSB in MIB-NB, the complete hyper-SFN is built up. hyper-SFN is incremented by one when the SFN wraps around.
intraFreqReselection
Used to control cell reselection to intra-frequency cells when the highest ranked cell is barred, or treated as barred by the UE, as specified in TS 36.304 [4].
multiBandInfoList
A list of additional frequency band indicators, additionalPmax and additionalSpectrumEmission values, as defined in TS 36.101 [42, table 5.5-1]. If the UE supports the frequency band in the freqBandIndicator IE it shall apply that frequency band. Otherwise, the UE shall apply the first listed band which it supports in the multiBandInfoList IE.
nrs-CRS-PowerOffset
NRS power offset between NRS and E-UTRA CRS. Unit in dB. Default value of 0.
plmn-IdentityList
List of PLMN identities. The first listed PLMN-Identity is the primary PLMN.
p-Max
Value applicable for the cell. If absent the UE applies the maximum power according to the UE capability.
q-QualMin
Parameter "$Q_{qualmin}$" in TS 36.304 [4].
q-RxLevMin
Parameter $Q_{rxlevmin}$ in TS 36.304 [4]. Actual value $Q_{rxlevmin}$ = IE value * 2 [dB].
schedulingInfoList
Indicates additional scheduling information of SI messages.
si-Periodicity
Periodicity of the SI-message in radio frames, such that rf256 denotes 256 radio frames, rf512 denotes 512 radio frames, and so on.
si-RadioFrameOffset
Offset in number of radio frames to calculate the start of the SI window. If the field is absent, no offset is applied.
si-RepetitionPattern
Indicates the starting radio frames within the SI window used for SI message transmission. Value every2ndRF corresponds to every second radio frame, value every4thRF corresponds to every fourth radio frame and so on starting from the first radio frame of the SI window used for SI transmission.
si-TB
This field indicates the transport block size in number of bits used to broadcast the SI message.
si-WindowLength
Common SI scheduling window for all SIs. Unit in milliseconds, where ms160 denotes 160 milliseconds, ms320 denotes 320 milliseconds and so on.
sib-MappingInfo
List of the SIBs mapped to this SystemInformation message. There is no mapping information of SIB2; it is always present in the first SystemInformation message listed in the schedulingInfoList list.
systemInfoValueTagList
Indicates SI message specific value tags. It includes the same number of entries, and listed in the same order, as in SchedulingInfoList.
systemInfoValueTagSI
SI message specific value tag as specified in Clause 5.2.1.3. Common for all SIBs within the SI message other than SIB14.
trackingAreaCode
A trackingAreaCode that is common for all the PLMNs listed.

TABLE 11

| Conditional presence | Explanation |
| --- | --- |
| inband | The field is mandatory present if IE operationModeInfo in MIB-NB is set to inband-SamePCI or inband-DifferentPCI. Otherwise the field is not present. |
| inband-SamePCI | The field is mandatory present, if IE operationModeInfo in MIB-NB is set to inband-SamePCI. Otherwise the field is not present. |

The following narrowband physical channels are defined.
Narrowband physical uplink shared channel (NPUSCH)
Narrowband physical random access channel (NPRACH)
The following uplink narrowband physical signals are defined.
Narrowband demodulation reference signal
The uplink bandwidth in terms of subcarriers $N_{sc}^{UL}$, and the slot duration $T_{slot}$ are given in Table 12.
Table 12 shows an example of NB-IoT parameters.

TABLE 12

| Subcarrier spacing | $N_{sc}^{UL}$ | $T_{slot}$ |
| --- | --- | --- |
| Δf = 3.75 kHz | 48 | 61440 · $T_s$ |
| Δf = 15 kHz | 12 | 15360 · $T_s$ |

A single antenna port p=0 is used for all uplink transmissions.
Resource Unit
Resource units are used to describe the mapping of the NPUSCH to resource elements. A resource unit is defined as $N_{symb}^{UL} N_{slots}^{UL}$ consecutive SC-FDMA symbols in the time domain and $N_{sc}^{RU}$ consecutive subcarriers in the frequency domain, where $N_{sc}^{RU}$ and $N_{symb}^{UL}$ are given by Table 13.
Table 13 shows an example of supported combinations of $N_{sc}^{RU}$, $N_{slots}^{UL}$ and $N_{symb}^{UL}$.

TABLE 13

| NPUSCH format | Δf | $N_{sc}^{RU}$ | $N_{slots}^{UL}$ | $N_{symb}^{UL}$ |
| --- | --- | --- | --- | --- |
| 1 | 3.75 kHz | 1 | 16 | 7 |
|  | 15 kHz | 1 | 16 |  |
|  |  | 3 | 8 |  |
|  |  | 6 | 4 |  |
|  |  | 12 | 2 |  |
| 2 | 3.75 kHz | 1 | 4 |  |
|  | 15 kHz | 1 | 4 |  |

Narrowband Uplink Shared Channel (NPUSCH)
The narrowband physical uplink shared channel supports two formats:
NPUSCH format 1, used to carry the UL-SCH
NPUSCH format 2, used to carry uplink control information
Scrambling shall be done according to clause 5.3.1 of TS36.211. The scrambling sequence generator shall be initialized with $c_{ini}=n_{RNTI} \cdot 2^{14}+n_f \mod 2 \cdot 2^{13}+\lfloor n_s/2 \rfloor+N_{ID}^{Ncell}$, where $n_s$ is the first slot of the transmission of the codeword. In case of NPUSCH repetitions, the scrambling sequence shall be reinitialized according to the above formula after every $M_{idendical}^{NPUSCH}$ transmission of the codeword with $n_s$ and $n_f$ set to the first slot and the frame, respectively, used for the transmission of the repetition. The quantity $M_{idendical}^{NPUSCH}$ is given by clause 10.1.3.6 in TS36.211.

Table 14 specifies the modulation mappings applicable for the narrowband physical uplink shared channel.

TABLE 14

| NPUSCH format | $N_{sc}^{RU}$ | Modulation scheme |
|---|---|---|
| 1 | 1 | BPSK, QPSK |
|  | >1 | QPSK |
| 2 | 1 | BPSK |

NPUSCH can be mapped to one or more than one resource units, $N_{RU}$, as given by clause 16.5.1.2 of 3GPP TS 36.213, each of which shall be transmitted $M_{rep}^{NPUSCH}$ times.

The block of complex-valued symbols $z(0), \ldots, z(M_{rep}^{PUSCH}-1)$ shall be multiplied with the amplitude scaling factor $\beta_{NPUSCH}$ in order to conform to the transmit power $P_{NPUSCH}$ specified in 3GPP TS 36.213, and mapped in sequence starting with $z(0)$ to subcarriers assigned for transmission of NPUSCH. The mapping to resource elements (k, l) corresponding to the subcarriers assigned for transmission and not used for transmission of reference signals, shall be in increasing order of first the index k, then the index l, starting with the first slot in the assigned resource unit.

After mapping to $N_{slots}$ slots, the $N_{slots}$ slots shall be repeated $M_{idendical}^{NPUSCH}-1$ additional times, before continuing the mapping of $z(\cdot)$ to the following slot, where $$M_{idendical}^{NPUSCH} = \begin{cases} \min([M_{rep}^{NPUSCH}/2], 4) & N_{sc}^{RU} > 1 \\ 1 & N_{sc}^{RU} = 1 \end{cases}$$ [Equation 3]

$$N_{slots} = \begin{cases} 1 & \Delta f = 3.75 \text{ kHz} \\ 2 & \Delta f = 15 \text{ kHz} \end{cases}$$

If a mapping to $N_{slots}$ slots or a repetition of the mapping contains a resource element which overlaps with any configured NPRACH resource according to NPRACH-ConfigSIB-NB, the NPUSCH transmission in overlapped $N_{slots}$ slots is postponed until the next $N_{slots}$ slots not overlapping with any configured NPRACH resource.

The mapping of $z(0), \ldots, z(M_{rep}^{NPUSCH}-1)$ is then repeated until $M_{rep}^{NPUSCH}N_{RU}N_{slots}^{UL}$ slots have been transmitted. After transmissions and/or postponements due to NPRACH of $256 \cdot 30720 T_s$ time units, a gap of $40 \cdot 30720 T_s$ time units shall be inserted where the NPUSCH transmission is postponed. The portion of a postponement due to NPRACH which coincides with a gap is counted as part of the gap.

When higher layer parameter npusch-AllSymbols is set to false, resource elements in SC-FDMA symbols overlapping with a symbol configured with SRS according to srs-SubframeConfig shall be counted in the NPUSCH mapping but not used for transmission of the NPUSCH. When higher layer parameter npusch-AllSymbols is set to true, all symbols are transmitted.

Uplink Control Information on NPUSCH without UL-SCH Data

The one bit information of HARQ-ACK $o_0^{ACK}$ is coded according to Table 15 Error! Reference source not found, where for a positive acknowledgement $o_0^{ACK}=1$ and for a negative acknowledgement $o_0^{ACK}=0$ Table 15 shows an example of HARQ-ACK code words.

TABLE 15

| HARQ-ACK $<o_0^{ACK}>$ | HARQ-ACK $<b_0, b_1, b_2, \ldots, b_{15}>$ |
|---|---|
| 0 | <0, 0, 0, 0, 0, 0, 0, 0, 0, 0, 0, 0, 0, 0, 0, 0> |
| 1 | <1, 1, 1, 1, 1, 1, 1, 1, 1, 1, 1, 1, 1, 1, 1, 1> |

Power Control

The UE transmit power $P_{NPUSCH,c}*(i)$ for NPUSCH transmission in NB-IoT UL slot i for the serving cell c is given by Equations 4 and 5.

If the number of repetitions of the allocated NPUSCH RUs is greater than 2, $$P_{NPUSCH,c}(i)=P_{CMAX,c}(i) [\text{dBm}]$$ [Equation 4]

otherwise, $$P_{NPUSCH,c}(i) = \min \begin{Bmatrix} P_{CMAX,c}(i), \\ 10\log_{10}(M_{NPUSCH,c}(i)) + P_{O\_NPUSCH,c}(j) + \alpha_c(j) \cdot PL_c \end{Bmatrix}$$ [Equation 5]

$$[dbm]$$

where, $P_{CMAX,c}(i)$ is the configured UE transmit power defined in 3GPP TS36.101 in NB-IoT UL slot i for serving cell c.

$M_{NPUSCH,c}$ is $\{\frac{1}{4}\}$ for 3.75 kHz subcarrier spacing and $\{1, 3, 6, 12\}$ for 15 kHz subcarrier spacing $P_{O\_NPUSCH}(j)$ is a parameter composed of the sum of a component $P_{O\_NOMINAL\_NPUSCH,c}(j)$ provided from higher layers and a component $P_{O\_UE\_NPUSH,c}(j)$ provided by higher layers for j=1 and for serving cell c where j∈{1,2}. For NPUSCH (re)transmissions corresponding to a dynamic scheduled grant then j=1 and for NPUSCH (re)transmissions corresponding to the random access response grant then j=2.

$P_{O\_UE\_NPUSCH,c}(2)=0$ and $P_{O\_NORMINAL\_NPUSCHc}(2)=P_{O\_PRE}+\Delta_{PREAMBLE\_Msg3}$, where the parameter preambleInitialReceivedTargetPower $P_{O\_PRE}$ and $\Delta_{PREAMBLE\_Msg3}$ are signalled from higher layers for serving cell c.

For j=1, for NPUSCH format 2, $\alpha_c(j)=1$; for NPUSCH format 1, $\alpha_c(j)$ is provided by higher layers for serving cell c. For j=2, $\alpha_c(j)=1$.

$PL_c$ is the downlink path loss estimate calculated in the UE for serving cell c in dB and $PL_c$=nrs-Power+nrs-PowerOffsetNonAnchor−higher layer filtered NRSRP, where nrs-Power is provided by higher layers and Subclause 16.2.2 in 3GPP 36.213, and nrs-powerOffsetNonAnchor is set to zero if it is not provided by higher layers and NRSRP is defined in 3GPP TS 36.214 for serving cell c and the higher layer filter configuration is defined in 3GPP TS 36.331 for serving cell c.

If the UE transmits NPUSCH in NB-IoT UL slot i for serving cell c, power headroom is computed using Equation 6.

$$PH_c(i)=P_{CMAX,c}(i)-\{P_{O\_NPUSCH,c}(1)+\alpha_c(1) \cdot PL_c\} [\text{db}]$$ [Equation 6]

UE Procedure for Transmitting Format 1 NPUSCH

A UE shall upon detection on a given serving cell of a NPDCCH with DCI format N0 ending in NB-IoT DL subframe n intended for the UE, perform, at the end of n+$k_0$ DL subframe, a corresponding NPUSCH transmission using NPUSCH format 1 in N consecutive NB-IoT UL slots $n_i$ with i=0, 1, . . . , N−1 according to the NPDCCH information where subframe n is the last subframe in which the NPDCCH is transmitted and is determined from the starting subframe of NPDCCH transmission and the DCI subframe repetition number field in the corresponding DCI; and $N=N_{Rep}N_{RU}N_{slots}^{UL}$, where the value of $N_{Rep}$ is determined by the repetition number field in the corresponding DCI, the value of $N_{RU}$ is determined by the resource assignment field in the corresponding DCI, and the value of $N_{slots}^{UL}$ is the number of NB-IoT UL slots of the resource unit corresponding to the allocated number of subcarriers in the corresponding DCI, $n_0$ is the first NB-IoT UL slot starting after the end of subframe n+$k_0$ value of $k_0$ is determined by the scheduling delay field ($I_{Delay}$) in the corresponding DCI according to Table 16.

Table 16 shows an example of $k_0$ for the DCI format N0.

TABLE 16

| $I_{Delay}$ | $k_0$ |
|---|---|
| 0 | 8 |
| 1 | 16 |
| 2 | 32 |
| 3 | 64 |

The resource allocation information in uplink DCI format N0 for NPUSCH transmission indicates to a scheduled UE.

- a set of contiguously allocated subcarriers ($n_{sc}$) of a resource unit determined by the Subcarrier indication field in the corresponding DCI,
- a number of resource units ($N_{RU}$) determined by the resource assignment field in the corresponding DCI according to Table 18,
- a repetition number ($N_{Rep}$) determined by the repetition number field in the corresponding DCI according to Table 19.

The subcarrier spacing Δf of NPUSCH transmission is determined by the uplink subcarrier spacing field in the Narrowband Random Access Response Grant according to Subclause 16.3.3 in 3GPP TS36.213.

For NPUSCH transmission with subcarrier spacing Δf=3.75 kHz, $n_{sc}=I_{sc}$ where $I_{sc}$ is the subcarrier indication field in the DCI.

For NPUSCH transmission with subcarrier spacing Δf=15 kHz, the subcarrier indication field ($I_{sc}$) in the DCI determines the set of contiguously allocated subcarriers ($n_{sc}$) according to according to Table 17.

Table 17 shows an example of allocated subcarriers for NPUSCH with Δf=5 kHz.

TABLE 17

| Subcarrier indication field ($I_{sc}$) | Set of Allocated subcarriers ($n_{sc}$) |
|---|---|
| 0-11 | $I_{sc}$ |
| 12-15 | $3(I_{sc} - 12) + \{0, 1, 2\}$ |

TABLE 17-continued

| Subcarrier indication field ($I_{sc}$) | Set of Allocated subcarriers ($n_{sc}$) |
|---|---|
| 16-17 | $6(I_{sc} - 16) + \{0, 1, 2, 3, 4, 5\}$ |
| 18 | $\{0, 1, 2, 3, 4, 5, 6, 7, 8, 9, 10, 11\}$ |
| 19-63 | Reserved |

Table 18 shows an example of the number of resource units for NPUSCH.

TABLE 9

| $I_{RU}$ | $N_{RU}$ |
|---|---|
| 0 | 1 |
| 1 | 2 |
| 2 | 3 |
| 3 | 4 |
| 4 | 5 |
| 5 | 6 |
| 6 | 8 |
| 7 | 10 |

Table 19 shows an example of the number of repetitions for NPUSCH.

TABLE 19

| $I_{Rep}$ | $N_{Rep}$ |
|---|---|
| 0 | 1 |
| 1 | 2 |
| 2 | 4 |
| 3 | 8 |
| 4 | 16 |
| 5 | 32 |
| 6 | 64 |
| 7 | 128 |

Demodulation Reference Signal (DMRS)

The reference signal sequence $\bar{r}_u(n)$ for $N_{sc}^{RU}=1$ is defined by Equation 7.

$$\bar{r}_u(n) = \frac{1}{\sqrt{2}}(1+j)(1-2c(n))w(n \bmod 16), \qquad [\text{Equation 7}]$$

$$0 \leq n < M_{rep}^{NPUSCH} N_{RU} N_{slots}^{UL}$$

where the binary sequence c(n) is defined by clause 7.2 of TS36.211 and shall be initialized with $c_{init}$=35 at the start of the NPUSCH transmission. The quantity w(n) is given by Error! Reference source not found. where u=$N_{ID}^{Ncell}$ mod 16 for NPUSCH format 2, and f or NPUSCH format 1 if group hopping is not enabled, and by clause 10.1.4.1.3 of 3GPP TS36.211 if group hopping is enabled for NPUSCH format 1.

Table 20 shows an example of w(n).

TABLE 20

| u | w(0), . . . , w(15) | | | | | | | | | | | | | | | |
|---|---|---|---|---|---|---|---|---|---|---|---|---|---|---|---|---|
| 0 | 1 | 1 | 1 | 1 | 1 | 1 | 1 | 1 | 1 | 1 | 1 | 1 | 1 | 1 | 1 | 1 |
| 1 | 1 | -1 | 1 | -1 | 1 | -1 | 1 | -1 | 1 | -1 | 1 | -1 | 1 | -1 | 1 | -1 |
| 2 | 1 | 1 | -1 | -1 | 1 | 1 | -1 | -1 | 1 | 1 | -1 | -1 | 1 | 1 | -1 | -1 |
| 3 | 1 | -1 | -1 | 1 | 1 | -1 | -1 | 1 | 1 | -1 | -1 | 1 | 1 | -1 | -1 | 1 |
| 4 | 1 | 1 | 1 | 1 | -1 | -1 | -1 | -1 | 1 | 1 | 1 | 1 | -1 | -1 | -1 | -1 |
| 5 | 1 | -1 | 1 | -1 | -1 | 1 | -1 | 1 | 1 | -1 | 1 | -1 | -1 | 1 | -1 | 1 |
| 6 | 1 | 1 | -1 | -1 | -1 | -1 | 1 | 1 | 1 | 1 | -1 | -1 | -1 | -1 | 1 | 1 |
| 7 | 1 | -1 | -1 | 1 | -1 | 1 | 1 | -1 | 1 | -1 | -1 | 1 | -1 | 1 | 1 | -1 |
| 8 | 1 | 1 | 1 | 1 | 1 | 1 | 1 | 1 | -1 | -1 | -1 | -1 | -1 | -1 | -1 | -1 |
| 9 | 1 | -1 | 1 | -1 | 1 | -1 | 1 | -1 | -1 | 1 | -1 | 1 | -1 | 1 | -1 | 1 |
| 10 | 1 | 1 | -1 | -1 | 1 | 1 | -1 | -1 | -1 | -1 | 1 | 1 | -1 | -1 | 1 | 1 |
| 11 | 1 | -1 | -1 | 1 | 1 | -1 | -1 | 1 | -1 | 1 | 1 | -1 | -1 | 1 | 1 | -1 |
| 12 | 1 | 1 | 1 | 1 | -1 | -1 | -1 | -1 | -1 | -1 | -1 | -1 | 1 | 1 | 1 | 1 |
| 13 | 1 | -1 | 1 | -1 | -1 | 1 | -1 | 1 | -1 | 1 | -1 | 1 | 1 | -1 | 1 | -1 |
| 14 | 1 | 1 | -1 | -1 | -1 | -1 | 1 | 1 | -1 | -1 | 1 | 1 | 1 | 1 | -1 | -1 |
| 15 | 1 | -1 | -1 | 1 | -1 | 1 | 1 | -1 | -1 | 1 | 1 | -1 | 1 | -1 | -1 | 1 |

The reference signal sequence for NPUSCH format 1 is given by Equation 8.

$$r_u(n) = \bar{r}_u(n) \qquad \text{[Equation 8]}$$

The reference signal sequence for NPUSCH format 2 is given by Equation 9.

$$r_u(3n+m) = \bar{w}(m)\bar{r}_u(n), \qquad \text{[Equation 9]}$$

where $\bar{w}(m)$ is defined in Table 5.5.2.2.1-2 of 3GPP TS36.211 with the sequence index chosen according to $$\left(\sum_{i=0}^{7} c(8n_s + i)2^i\right) \bmod 3$$

with $c_{init} = N_{ID}^{Ncell}$.

The reference signal sequences $r_u(n)$ for $N_{sc}^{RU} > 1$ is defined by a cyclic shift α of a base sequence according to Equation 10.

$$r_u(n) = e^{j\alpha n}e^{j\phi(n)\pi/4}, 0 \leq n < N_{sc}^{RU} \qquad \text{[Equation 10]}$$

where φ(n) is given by Table 10.1.4.1.2-1 for $N_{sc}^{RU}=3$, Table 21 for $N_{sc}^{RU}=6$ and Table 22 for $N_{sc}^{RU}=12$.

If group hopping is not enabled, the base sequence index u is given by higher layer parameters threeTone-BaseSequence, sixTone-BaseSequence, and twelveTone-BaseSequence for $N_{sc}^{RU}=3$, $N_{sc}^{RU}=6$, and $N_{sc}^{RU}=12$, respectively. If not signalled by higher layers, the base sequence is given by Equation 11.

$$u = \begin{cases} N_{ID}^{Ncell} \bmod 12 & \text{for } N_{sc}^{RU} = 3 \\ N_{ID}^{Ncell} \bmod 14 & \text{for } N_{sc}^{RU} = 6 \\ N_{ID}^{Ncell} \bmod 30 & \text{for } N_{sc}^{RU} = 12 \end{cases} \qquad \text{[Equation 11]}$$

If group hopping is enabled, the base sequence index u is given by clause 10.1.4.1.3 of 3GPP TS36.211.

The cyclic shift α for $N_{sc}^{RU}=3$ and $N_{sc}^{RU}=6$ is derived from higher layer parameters threeTone-CyclicShift and sixTone-CyclicShift, respectively, as defined in Table 23. For $N_{sc}^{RU}=12$, α=0.

Table 21 is a table showing an example of φ(n) for $N_{sc}^{RU}=3$.

TABLE 21

| u | φ(0), φ(1), φ(2) | | |
|---|---|---|---|
| 0 | 1 | -3 | -3 |
| 1 | 1 | -3 | -1 |
| 2 | 1 | -3 | 3 |
| 3 | 1 | -1 | -1 |
| 4 | 1 | -1 | 1 |
| 5 | 1 | -1 | 3 |
| 6 | 1 | 1 | -3 |
| 7 | 1 | 1 | -1 |
| 8 | 1 | 1 | 3 |
| 9 | 1 | 3 | -1 |
| 10 | 1 | 3 | 1 |
| 11 | 1 | 3 | 3 |

Table 22 is a table showing another example of φ(n) for $N_{sc}^{RU}=6$.

TABLE 13

| u | φ(0), . . . , φ(5) | | | | | |
|---|---|---|---|---|---|---|
| 0 | 1 | 1 | 1 | 1 | 3 | -3 |
| 1 | 1 | 1 | 3 | 1 | -3 | 3 |
| 2 | 1 | -1 | -1 | -1 | 1 | -3 |
| 3 | 1 | -1 | 3 | -3 | -1 | -1 |
| 4 | 1 | 3 | 1 | -1 | -1 | 3 |
| 5 | 1 | -3 | -3 | 1 | 3 | 1 |
| 6 | -1 | -1 | 1 | -3 | -3 | -1 |
| 7 | -1 | -1 | -1 | 3 | -3 | -1 |
| 8 | 3 | -1 | 1 | -3 | -3 | 3 |
| 9 | 3 | -1 | 3 | -3 | -1 | 1 |
| 10 | 3 | -3 | 3 | -1 | 3 | 3 |
| 11 | -3 | 1 | 3 | 1 | -3 | -1 |
| 12 | -3 | 1 | -3 | 3 | -3 | -1 |
| 13 | -3 | 3 | -3 | 1 | 1 | -3 |

Table 23 is a table showing an example of α.

TABLE 14

| $N_{sc}^{RU} = 3$ | | $N_{sc}^{RU} = 6$ | |
|---|---|---|---|
| threeTone-CyclicShift | α | sixTone-CyclicShift | α |
| 0 | 0 | 0 | 0 |
| 1 | 2π/3 | 1 | 2π/6 |
| 2 | 4π/3 | 2 | 4π/6 |
|  |  | 3 | 8π/6 |

For the reference signal for NPUSCH format 1, sequence-group hopping can be enabled where the sequence-group number u in slot $n_s$ is defined by a group hopping pattern $f_{gh}(n_s)$ and a sequence-shift pattern $f_{ss}$ according to Equation 12.

$$u = (f_{gh}(n_s) + f_{ss}) \bmod N_{seq}^{RU} \qquad \text{[Equation 12]}$$

where the number of reference signal sequences available for each resource unit size, $N_{seq}^{RU}$ is given by Table 24.

TABLE 24

| $N_{sc}^{RU}$ | $N_{seq}^{RU}$ |
|---|---|
| 1 | 16 |
| 3 | 12 |
| 6 | 14 |
| 12 | 30 |

Sequence-group hopping can be enabled or disabled by means of the cell-specific parameter groupHoppingEnabled provided by higher layers. Sequence-group hopping for NPUSCH can be disabled for a certain UE through the higher-layer parameter groupHoppingDisabled despite being enabled on a cell basis unless the NPUSCH transmission corresponds to a Random Access Response Grant or a retransmission of the same transport block as part of the contention based random access procedure.

The group hopping pattern $f_{gh}(n_s)$ is given by Equation 13.

$$f_{gh}(n_s) = \left(\sum_{i=0}^{7} c(8n'_s + i) \cdot 2^i\right) \bmod N_{seq}^{RU} \qquad \text{[Equation 13]}$$

where $n'_s = n_s$ for $N_{sc}^{RU} > 1$ and $n'_s$ is the slot number of the first slot of the resource unit for $N_{sc}^{RU} = 1$. The pseudo-random sequence c(i) is defined by clause 7.2. The pseudo-random sequence generator shall be initialized with $$c_{init} = \left\lfloor \frac{N_{ID}^{Ncell}}{N_{seq}^{RU}} \right\rfloor$$

at the beginning of the resource unit for $N_{sc}^{RU} = 1$ and in every even slot for $N_{sc}^{RU} > 1$.

The sequence-shift pattern $f_{ss}$ is given by Equation 14.

$$f_{ss} = (N_{ID}^{Ncell} + \Delta_{ss}) \bmod N_{seq}^{RU} \qquad \text{[Equation 14]}$$

where $\Delta_{ss} \in \{0, 1, \ldots, 29\}$ is given by higher-layer parameter groupAssignmentNPUSCH. If no value is signalled, $\Delta_{ss} = 0$.

The sequence r(·) shall be multiplied with the amplitude scaling factor $\beta_{NPUSCH}$ and mapped in sequence starting with r(0) to the sub-carriers.

The set of sub-carriers used in the mapping process shall be identical to the corresponding NPUSCH transmission as defined in clause 10.1.3.6 in 3GPP 36.211.

The mapping to resource elements (k,l) shall be in increasing order of first k, then l, and finally the slot number. The values of the symbol index l in a slot are given in Table 25.

Table 25 shows an example of demodulation reference signal locations for NPUSCH.

TABLE 25

| | Values for l | |
|---|---|---|
| NPUSCH format | $\Delta f = 3.75$ kHz | $\Delta f = 15$ kHz |
| 1 | 4 | 3 |
| 2 | 0, 1, 2 | 2, 3, 4 |

SF-FDMA Baseband Signal Generation

For $N_{sc}^{RU} > 1$, the time-continuous signal $s_l(t)$ in SC-FDMA symbol l in a slot is defined by clause 5.6 with the quantity $N_{RB}^{UL} N_{sc}^{RB}$ replaced by $N_{sc}^{UL}$.

For $N_{sc}^{RU} = 1$, the time-continuous signal $s_{k,l}(t)$ for sub-carrier index k in SC-FDMA symbol l in an uplink slot is defined by Equation 15.

$$s_{k,l}(t) = a_{k^{(-)},l} \cdot e^{j\phi_{k,l}} \cdot e^{j2\pi(k+1/2)\Delta f(t - N_{CP,l}T_s)} k^{(-)} = k + \lfloor N_{sc}^{UL}/2 \rfloor \qquad \text{[Equation 15]}$$

For $0 \leq t < (N_{CP,l} + N)T_s$ where parameters for $\Delta f = 15$ kHz and $\Delta f = 3.75$ kHz are given in Table 26, $a_{k^{(-)},l}$ is the modulation value of symbol l and the phase rotation $\varphi_{k,l}$ is defined by Equation 16.

$$\varphi_{k,l} = \rho (\tilde{l} \bmod 2) + \hat{\varphi}_k(\tilde{l}) \qquad \text{[Equation 16]}$$

$$\rho = \begin{cases} \frac{\pi}{2} & \text{for BPSK} \\ \frac{\pi}{2} & \text{for QPSK} \end{cases}$$

$$\hat{\varphi}_k(\tilde{l}) = \begin{cases} 0 & \tilde{l} = 0 \\ \hat{\varphi}_k(\tilde{l}-1) + 2\pi\Delta f(k+1/2)(N + N_{CP,l})T_s & \tilde{l} > 0 \end{cases}$$

$$\tilde{l} = 0, 1, \ldots, M_{rep}^{NPUSCH} N_{RU} N_{slots}^{UL} N_{symb}^{UL} - 1$$

$$l = \tilde{l} \bmod N_{symb}^{UL}$$

where $\tilde{l}$ is a symbol counter that is reset at the start of a transmission and incremented for each symbol during the transmission.

Table 26 shows an example of SC-FDMA parameters for $N_{sc}^{RU} = 1$.

TABLE 26

| Parameter | $\Delta f = 3.75$ kHz | $\Delta f = 15$ kHz |
|---|---|---|
| N | 8192 | 2048 |
| Cyclic prefix length | 256 | 160 for l = 0 |
| $N_{CP, l}$ | | 144 for l = 1, 2, . . . , 6 |
| Set of values for k | −24, −23, . . . , 23 | −6, −5, . . . , 5 |

The SC-FDMA symbols in a slot shall be transmitted in increasing order of l, starting with l=0, where SC-FDMA symbol l>0 starts at time $\sum_{l'=0}^{l-1} (N_{CP,l'} + N)T_s$ within the slot. For $\Delta f = 3.75$ kHz the remaining $2304T_s$ in $T_{slot}$ are not transmitted and used for guard period.

Narrowband Physical Random Access (NPRACH)

The physical layer random access preamble is based on single-subcarrier frequency-hopping symbol groups. A symbol group is illustrated in FIG. 11, consisting of a cyclic prefix of length $T_{CP}$ and a sequence of 5 identical symbols with total length $T_{SEQ}$. The parameter values are listed in Table 27 Random Access preamble parameters.

FIG. 11 shows an example of a random access symbol group.

Table 27 shows an example of random access preamble parameters.

TABLE 27

| Preamble format | $T_{CP}$ | $T_{SEQ}$ |
| --- | --- | --- |
| 0 | $2048T_s$ | $5 \cdot 8192T_s$ |
| 1 | $8192T_s$ | $5 \cdot 8192T_s$ |

The preamble consisting of 4 symbol groups transmitted without gaps shall be transmitted $N_{rep}^{NPRACH}$ times.

The transmission of a random access preamble, if triggered by the MAC layer, is restricted to certain time and frequency resources.

An NPRACH configuration provided by higher layers contains the following.

NPRACH resource periodicity $N_{period}^{NPRACH}$ (nprach-Periodicity), frequency location of the first subcarrier allocated to NPRACH $N_{scoffset}^{NPRACH}$ (nprach-SubcarrierOffset), number of subcarriers allocated to NPRACH $N_{sc}^{NPRACH}$ (nprach-NumSubcarriers), number of starting sub-carriers allocated to contention based NPRACH random access $N_{sc\_cont}^{NPRACH}$ (nprach-NumCBRA-StartSubcarriers), number of NPRACH repetitions per attempt $N_{rep}^{NPRACH}$ (numRepetitionsPerPreambleAttempt), NPRACH starting time $N_{start}^{NPRACH}$ (nprach-StartTime), Fraction for calculating starting subcarrier index for the range of NPRACH subcarriers reserved for indication of UE support for multi-tone msg3 transmission $N_{MSG3}^{NPRACH}$ (nprach-SubcarrierMSG3-RangeStart).

NPRACH transmission can start only $N_{start}^{NPRACH} \cdot 30720$ $T_s$ time units after the start of a radio frame fulfilling $n_f \bmod (N_{period}^{NPRACH}/10)=0$. After transmissions of $4 \cdot 64$ $(T_{CP} + T_{SEQ})$ time units, a gap of $40 \cdot 30720 T_s$ time units shall be inserted.

NPRACH configurations where $N_{scoffset}^{NPRACH} + N_{sc}^{NPRACH} > N_{sc}^{UL}$ are invalid.

The NPRACH starting subcarriers allocated to contention based random access are split in two sets of subcarriers, $\{0, 1, \ldots, N_{sc\_cont}^{NPRACH} N_{MSG3}^{NPRACH} - 1\}$ and $\{N_{sc\_cont}^{NPRACH} N_{MSG3}^{NPRACH}, \ldots, N_{sc_{cont}}^{NPRACH} - 1\}$, where the second set, if present, indicate UE support for multi-tone msg3 transmission.

The frequency location of the NPRACH transmission is constrained within $N_{sc}^{RA}=12$ sub-carriers. Frequency hopping shall be used within the 12 subcarriers, where the frequency location of the $i^{th}$ symbol group is given by $n_{sc}^{RA}(i)=n_{start}+\tilde{n}_{sc}^{RA}(i)$ where $n_{start}=N_{scoffset}^{NPRACH}+\lfloor n_{init}/N_{sc}^{RA} \rfloor \cdot N_{sc}^{RA}$ and $\tilde{n}_{sc}^{RA}(i)$ is given by Equation 17.

[Equation 17]

$$\tilde{n}_{sc}^{RA}(i) = \begin{cases} (\tilde{n}_{sc}^{RA}(0)+f(i/4))\bmod N_{sc}^{RA} & i \bmod 4 = 0 \text{ and } i > 0 \\ \tilde{n}_{sc}^{RA}(i-1)+1 & i \bmod 4 = 1, 3 \text{ and } \tilde{n}_{sc}^{RA}(i-1) \\ & \bmod 2 = 0 \\ \tilde{n}_{sc}^{RA}(i-1)-1 & i \bmod 4 = 1, 3 \text{ and } \tilde{n}_{sc}^{RA}(i-1) \\ & \bmod 2 = 1 \\ \tilde{n}_{sc}^{RA}(i-1)+6 & i \bmod 4 = 2 \text{ and } \tilde{n}_{sc}^{RA}(i-1) < 6 \\ \tilde{n}_{sc}^{RA}(i-1)-6 & i \bmod 4 = 2 \text{ and } \tilde{n}_{sc}^{RA}(i-1) \geq 6 \end{cases}$$

-continued $$f(t) = \left(f(t-1) + \left(\sum_{n=10t+1}^{10t+9} c(n)2^{n-(10t+1)}\right) \bmod(N_{sc}^{RA}-1)+1\right) \bmod N_{sc}^{RA}$$

$$f(-1) = 0$$

where $\tilde{n}_{SC}^{RA}(0)=n_{init} \bmod N_{sc}^{RA}$ with $n_{init}$ being the subcarrier selected by the MAC layer from $\{0, 1, \ldots, N_{sc}^{NPRACH}-1\}$, and the pseudo random sequence $c(n)$ is given by clause 7.2 of 3GPP TS36.211. The pseudo random sequence generator shall be initialized with $c_{init}=N_{ID}^{Ncell}$.

The time-continuous random access signal $s_i(t)$ for symbol group i is defined by Equation 18:

$$S_i(t) = \beta_{NPRACH} e^{j2\pi(n_{SC}^{RA}(i)+Kk_0+1/2)\Delta f_{RA}(t-T_{CP})}$$ [Equation 18]

where $0 \leq t < T_{SEQ}+T_{CP}$, $\beta_{NPRACH}$ is an amplitude scaling factor in order to conform to the transmit power $P_{NPRACH}$ specified in clause 16.3.1 in 3GPP TS 36.213, $k_0=-N_{sc}^{UL}/2$, $K=\Delta f/\Delta f_{RA}$ accounts for the difference in subcarrier spacing between the random access preamble and uplink data transmission, and the location in the frequency domain controlled by the parameter $n_{sc}^{RA}(i)$ is derived from clause 10.1.6.1 of 3GPP TS36.211. The variable $\Delta f_{RA}$ is given by Table 28.

Table 28 shows an example of random access baseband parameters.

TABLE 28

| Preamble format | $\Delta f_{RA}$ |
| --- | --- |
| 0, 1 | 3.75 kHz |

Downlink

A downlink narrowband physical channel corresponds to a set of resource elements that carry information originating from higher layers, and is the interface defined between 3GPP TS 36.212 and 3GPP TS 36.211.

The following downlink physical channels are defined:
Narrowband physical downlink shared channel (NPDSCH)
Narrowband physical broadcast channel (NPBCH)
Narrowband physical downlink control channel (NPDCCH)

A downlink narrowband physical signal corresponds to a set of resource elements used by the physical layer, but does not carry information originating from higher layers.

A downlink narrowband physical signal corresponds to a set of resource elements used by the physical layer, but does not carry information originating from higher layers. The following downlink physical signals are defined:
Narrowband reference signal (NRS)
Narrowband synchronization signal
Narrowband physical downlink shared channel (NPDSCH)

The scrambling sequence generator shall be initialized with $c_{init}=n_{RNTI} \cdot 2^{14}+n_f \bmod 2 \cdot 2^{13}+\lfloor n_s/2 \rfloor+N_{ID}^{Ncell}$ where $n_s$ is the first slot of the transmission of the codeword. In case of NPDSCH repetitions and the NPDSCH carrying the BCCH, the scrambling sequence generator shall be reinitialized according to the expression above for each repetition. In case of NPDSCH repetitions and the NPDSCH is not carrying the BCCH, the scrambling sequence generator shall be reinitialized according to the expression above after every min ($M_{rep}^{NPDSCH}$, 4) transmission of the codeword with $n_s$ and $n_f$ set to the first slot and the frame, respectively, used for the transmission of the repetition.

Modulation should be done using QPSK modulation scheme.

NPDSCH can be mapped to one or more than one subframes, $N_{SF}$, as given by clause 16.4.1.5 of 3GPP TS 36.213, each of which shall be transmitted NPDSCH $M_{rep}^{NPDSCH}$ times.

For each of the antenna ports used for transmission of the physical channel, the block of complex-valued symbols $y^{(p)}(0), \ldots, y^{(p)}(M_{symb}^{ap}-1)$ shall be mapped to resource elements (k, l) which meet all of the following criteria in the current subframe.

the subframe is not used for transmission of NPBCH, NPSS, or NSSS, and they are assumed by the UE not to be used for NRS, and they are not overlapping with resource elements used for CRS (if any), and the index l in the first slot in a subframe fulfils $l \geq l_{DataStart}$ where $l_{DataStart}$ is given by clause 16.4.1.4 of 3GPP TS 36.213.

The mapping of $y^{(p)}(0), \ldots, y^{(p)}(M_{symb}^{ap}-1)$ in sequence starting with $y^{(p)}(0)$ to resource elements (k, l) on antenna port p meeting the criteria above shall be increasing order of the first the index k and the index l, starting with the first slot and ending with the second slot in a subframe. For NPDSCH not carrying BCCH, after mapping to a subframe, the subframe shall be repeated for $M_{rep}^{NPDSCH}-1$ additional subframes, before continuing the mapping of $y^{(p)}(\cdot)$ to the following subframe. The mapping of $y^{(p)}(0), \ldots, y^{(p)}(M_{symb}^{ap}-1)$ is then repeated until $M_{rep}^{NPDSCH} N_{SF}$ subframes have been transmitted. For NPDSCH carrying BCCH, the $y^{(p)}(0), \ldots, y^{(p)}(M_{symb}^{ap}-1)$ is mapped to $N_{SF}$ subframes in sequence and then repeated until $M_{rep}^{NPDSCH} N_{SF}$ subframes have been transmitted.

The NPDSCH transmission can be configured by higher layers with transmission gaps where the NPSDCH transmission is postponed. There are no gaps in the NPDSCH transmission if $R_{max} < N_{gap,threshold}$ where $N_{gap,threshold}$ is given by the higher layer parameter dl-GapThreshold and $R_{max}$ is given by 3GPP TS 36.213. The gap starting frame and subframe is given by $(10n_f + \lfloor n_s/2 \rfloor) \bmod N_{gap,period} = 0$ where the gap periodicity, $N_{gap,period}$, is given by the higher layer parameter dl-GapPeriodicity. The gap duration in number of subframes is given by $N_{gap,duration} = N_{gap,coeff} N_{gap,period}$, where $N_{gap,coeff}$ is given by the higher layer parameter dl-GapDurationCoeff. For NPDSCH carrying the BCCH there are no gaps in the transmission.

The UE shall not expect NPDSCH in subframe i if it is not a NB-IoT downlink subframe, except for transmissions of NPDSCH carrying SystemInformationBlockType1-NB in subframe 4. In case of NPDSCH transmissions, in subframes that are not NB-IoT downlink subframes, the NPDSCH transmission is postponed until the next NB-IoT downlink subframe.

UE Procedure for Receiving NPDSCH

A NB-IoT UE shall assume a subframe as a NB-IoT DL subframe if the UE determines that the subframe does not contain NPSS/NSSS/NPBCH/NB-SIB1 transmission, and for a NB-IoT carrier that a UE receives higher layer parameter operationModeInfo, the subframe is configured as NB-IoT DL subframe after the UE has obtained SystemInformationBlockType1-NB.

for a NB-IoT carrier that DL-CarrierConfigCommon-NB is present, the subframe is configured as NB-IoT DL subframe by the higher layer parameter downlinkBitmapNonAnchor.

For a NB-IoT UE that supports two HARQ-Processes-r14, there shall be a maximum of 2 downlink HARQ processes.

A UE shall upon detection on a given serving cell of a NPDCCH with DCI format N1, N2 ending in subframe n intended for the UE, decode, starting in n+5 DL subframe, the corresponding NPDSCH transmission in N consecutive NB-IoT DL subframe(s) $n_i$ with $i=0, 1, \ldots, N-1$ according to the NPDCCH information, where subframe n is the last subframe in which the NPDCCH is transmitted and is determined from the starting subframe of NPDCCH transmission and the DCI subframe repetition number field in the corresponding DCI;

subframe(s) ni with $i=0, 1, \ldots, N-1$ are N consecutive NB-IoT DL subframe(s) excluding subframes used for SI messages where, $n0 < n1 < \ldots, nN-1$, $N = N_{Rep} N_{SF}$, where the value of $N_{Rep}$ is determined by the repetition number field in the corresponding DCI, and the value of $N_{SF}$ is determined by the resource assignment field in the corresponding DCI, and $k_0$ is the number of NB-IoT DL subframe(s) starting in DL subframe n+5 until DL subframe $n_0$, where $k_0$ is determined by the scheduling delay field ($I_{Delay}$) for DCI format N1, and $k_0 = 0$ for DCI format N2. For DCI CRC scrambled by G-RNTI, $k_0$ is determined by the scheduling delay field ($I_{Delay}$) according to Table 30, otherwise $k_0$ is determined by the scheduling delay field ($I_{Delay}$) according to Table 29. The value of $R_{m,ax}$ is according to Subclause 16.6 in 3GPP 36.213 for the corresponding DCI format N1.

Table 29 shows an example of $k_0$ for DCI format N1.

TABLE 29

| | $k_0$ | |
|---|---|---|
| $I_{Delay}$ | $R_{max} < 128$ | $R_{max} \geq 128$ |
| 0 | 0 | 0 |
| 1 | 4 | 16 |
| 2 | 8 | 32 |
| 3 | 12 | 64 |
| 4 | 16 | 128 |
| 5 | 32 | 256 |
| 6 | 64 | 512 |
| 7 | 128 | 1024 |

Table 30 shows an example of $k_0$ for DCI format N1 with DCI CRC scrambled by G-RNTI.

TABLE 30

| $I_{Delay}$ | $k_0$ |
|---|---|
| 0 | 0 |
| 1 | 4 |
| 2 | 8 |
| 3 | 12 |
| 4 | 16 |
| 5 | 32 |
| 6 | 64 |
| 7 | 128 |

A UE is not expected to receive transmissions in 3 DL subframes following the end of a NPUSCH transmission by the UE.

The resource allocation information in DCI format N1, N2 (paging) for NPDSCH indicates to a scheduled UE.

The number of subframes ($N_{SF}$) determined by the resource assignment field ($I_{SF}$) in the corresponding DCI according to Table 31.

A repetition number ($N_{Rep}$) determined by the repetition number field ($I_{Rep}$) in the corresponding DCI according to Table 32.

TABLE 31

| $I_{SF}$ | $N_{SF}$ |
|---|---|
| 0 | 1 |
| 1 | 2 |
| 2 | 3 |
| 3 | 4 |
| 4 | 5 |
| 5 | 6 |
| 6 | 8 |
| 7 | 10 |

TABLE 31

| $I_{REP}$ | $N_{REP}$ |
|---|---|
| 0 | 1 |
| 1 | 2 |
| 2 | 4 |
| 3 | 8 |
| 4 | 16 |
| 5 | 32 |
| 6 | 64 |
| 7 | 128 |
| 8 | 192 |
| 9 | 256 |
| 10 | 384 |
| 11 | 512 |
| 12 | 768 |
| 13 | 1024 |
| 14 | 1536 |
| 15 | 2048 |

The number of repetitions for the NPDSCH carrying SystemInformationBlockType1-NB is determined based on the parameter schedulingInfoSIB1 configured by higher-layers and according to Table 33.

Table 33 shows an example of the number of repetitions for SIB1-NB.

TABLE 33

| Value of schedulingInfoSIB1 | Number of NPDSCH repetitions |
|---|---|
| 0 | 4 |
| 1 | 8 |
| 2 | 16 |
| 3 | 4 |
| 4 | 8 |
| 5 | 16 |
| 6 | 4 |
| 7 | 8 |
| 8 | 16 |
| 9 | 4 |
| 10 | 8 |
| 11 | 16 |
| 12-15 | Reserved |

The starting radio frame for the first transmission of the NPDSCH carrying SystemInformationBlockType1-NB is determined according to Table 34.

Table 34 shows an example of the starting radio frame for the first transmission of the NPDSCH carrying SIB1-NB.

TABLE 34

| Number of NPDSCH repetitions | $N_{ID}^{Ncell}$ | Starting radio frame number for NB-SIB1 repetitions (nf mod 256) |
|---|---|---|
| 4 | $N_{ID}^{Ncell}$ mod 4 = 0 | 0 |
|   | $N_{ID}^{Ncell}$ mod 4 = 1 | 16 |
|   | $N_{ID}^{Ncell}$ mod 4 = 2 | 32 |
|   | $N_{ID}^{Ncell}$ mod 4 = 3 | 48 |
| 8 | $N_{ID}^{Ncell}$ mod 2 = 0 | 0 |
|   | $N_{ID}^{Ncell}$ mod 2 = 1 | 16 |
| 16 | $N_{ID}^{Ncell}$ mod 2 = 0 | 0 |
|   | $N_{ID}^{Ncell}$ mod 2 = 1 | 1 |

The starting OFDM symbol for NPDSCH is given by index $l_{DataStrart}$ in the first slot in a subframe k and is determined as follows if subframe k is a subframe used for receiving SIB1-NB $l_{Datastrart}$=3 if the value of the higher layer parameter operationModeInfo is set to '00' or '01'

$l_{DataStrart}$=0 otherwise.

else $l_{DataStrart}$ is given by the higher layer parameter eutra-ControlRegionSize if the value of the higher layer parameter eutraControlRegionSize is present.

$l_{DataStrart}$=0 otherwise.

UE Procedure for Reporting ACK/NACK

The UE shall upon detection of a NPDSCH transmission ending in NB-IoT subframe n intended for the UE and for which an ACK/NACK shall be provided, start, at the end of n+k$_0$-1 DL subframe transmission of the NPUSCH carrying ACK/NACK response using NPUSCH format 2 in N consecutive NB-IoT UL slots, where $N=N_{Rep}^{AN}NUL_{slots}^{UL}$, where the value of $N_{Rep}^{AN}$ is given by the higher layer parameter ack-NACK-NumRepetitions-Msg4 configured for the associated NPRACH resource for Msg4 NPDSCH transmission, and higher layer parameter ack-NACK-Num-Repetitions otherwise, and the value of $N_{slots}^{UL}$ is the number of slots of the resource unit, allocated subcarrier for ACK/NACK and value of k0 is determined by the ACK/NACK resource field in the DCI format of the corresponding NPDCCH according to Table 16.4.2-1, and Table 16.4.2-2 in 3GPP TS36.213.

Narrowband Physical Broadcast Channel (NPBCH)

The processing structure for the BCH transport channel is according to Section 5.3.1 of 3GPP TS 36.212, with the following differences:

The transmission time interval (TTI) is 640 ms.

The size of the BCH transport block is set to 34 bits

The CRC mask for NPBCH is selected according to 1 or 2 transmit antenna ports at eNodeB according to Table 5.3.1.1-1 of 3GPP TS 36.212, where the transmit antenna ports are defined in section 10.2.6 of 3GPP TS 36.211

The number of rate matched bits is defined in section 10.2.4.1 of 3GPP TS 36.211

Scrambling shall be done according to clause 6.6.1 of 3GPP TS 36.211 with $M_{bit}$ denoting the number of bits to be transmitted on the NPBCH. $M_{bit}$ equals 1600 for normal cyclic prefix. The scrambling sequence shall be initialized with $c_{init}=N_{ID}^{Ncell}$ in radio frames fulfilling n$_f$ mod 64=0.

Modulation should be done using QPSK modulation scheme for each antenna port is transmitted in subframe 0 during 64 consecutive radio frames starting in each radio frame fulfilling n$_f$ mod 64=0 and shall Layer mapping and precoding shall be done according to clause 6.6.3 of 3GPP TS 36.211 with P∈{1,2}. The UE shall assume antenna ports $R_{2000}$ and $R_{2001}$ are used for the transmission of the narrowband physical broadcast channel.

The block of complex-valued symbols $y^{(p)}(0), \ldots y^{(p)}(M_{symb}-1)$ for each antenna port is transmitted in subframe 0 during 64 consecutive radio frames starting in each radio frame fulfilling $n_f \bmod 64=0$ and shall be mapped in sequence starting consecutive radio frames starting with y(0) to resource elements (k, l) not reserved for transmission of reference signals shall be in increasing order of the first the index k, then the index l. After mapping to a subframe, the subframe shall be repeated in subframe 0 in the 7 following radio frames, before continuing the mapping of $y^{(p)}(\cdot)$ to subframe 0 in the following radio frame. The first three OFDM symbols in a subframe shall not be used in the mapping process. For the purpose of the mapping, the UE shall assume cell-specific reference signals for antenna ports 0-3 and narrowband reference signals for antenna ports 2000 and 2001 being present irrespective of the actual configuration. The frequency shift of the cell-specific reference signals shall be calculated by replacing cell $N_{ID}^{cell}$ with $N_{ID}^{Ncell}$ in the calculation of $v_{shift}$ in clause 6.10.1.2 of 3GPP TS 36.211.

Narrowband Physical Downlink Control Channel (NPDCCH)

The narrowband physical downlink control channel carries control information. A narrowband physical control channel is transmitted on an aggregation of one or two consecutive narrowband control channel elements (NCCEs), where a narrowband control channel element corresponds to 6 consecutive subcarriers in a subframe where NCCE 0 occupies subcarriers 0 through 5 and NCCE 1 occupies subcarriers 6 through 11. The NPDCCH supports multiple formats as listed in Table 35. For NPDCCH format 1, both NCCEs belong to the same subframe. One or two NPDCCHs can be transmitted in a subframe.

Table 35 shows an example of supported NPDCCH formats.

TABLE 35

| NPDCCH format | Number of NCCEs |
|---|---|
| 0 | 1 |
| 1 | 2 |

Scrambling shall be done according to clause 6.8.2 of TS36.211. The scrambling sequence shall be initialized at the start of subframe $k_0$ according to section 16.6 of TS36.213 after every 4th NPDCCH subframe with $c_{init} = \lfloor n_s/2 \rfloor 2^9 + N_{ID}^{Ncell}$ where $n_s$ is the first slot of the NPDCCH subframe in which scrambling is (re-)initialized.

Modulation shall be done according to clause 6.8.3 of TS36.211 using the QPSK modulation scheme.

Layer mapping and precoding shall be done according to clause 6.6.3 of TS36.211 using the same antenna ports as the NPBCH.

The block of complex-valued symbols $y(0), \ldots y(M_{symb}-1)$ shall be mapped in sequence starting with y(0) to resource elements (k, l) on the associated antenna port which meet all of the following criteria:

they are part of the NCCE(s) assigned for the NPDCCH transmission, and they are not used for transmission of NPBCH, NPSS, or NSSS, and they are assumed by the UE not to be used for NRS, and they are not overlapping with resource elements used for PBCH, PSS, SSS, or CRS as defined in clause 6 of TS36.211 (if any), and the index l in the first slot in a subframe fulfils $l \geq l_{NPDCCHStart}$ where $l_{NPDCCHStart}$ is given by clause 16.6.1 of 3GPP TS 36.213.

The mapping to resource elements (k, l) on antenna port p meeting the criteria above shall be in increasing order of first the index k and then the index l, starting with the first slot and ending with the second slot in a subframe.

The NPDCCH transmission can be configured by higher layers with transmissions gaps where the NPDCCH transmission is postponed. The configuration is the same as described for NPDSCH in clause 10.2.3.4 of TS36.211.

The UE shall not expect NPDCCH in subframe i if it is not a NB-IoT downlink subframe. In case of NPDCCH transmissions, in subframes that are not NB-IoT downlink subframes, the NPDCCH transmission is postponed until the next NB-IoT downlink subframe.

DCI Format

DCI Format N0

DCI format N0 is used for the scheduling of NPUSCH in one UL cell. The following information is transmitted by means of the DCI format N0:

Flag for format N0/format N1 differentiation (1 bit), Subcarrier indication (6 bits), Resource assignment (3 bits), Scheduling delay (2 bits), Modulation and coding scheme (4 bits), Redundancy version (1 bit), Repetition number (3 bits), New data indicator (1 bit), DCI subframe repetition number (2 bits).

DCI Format N1

DCI format N1 is used for the scheduling of one NPDSCH codeword in one cell and random access procedure initiated by a NPDCCH order. The DCI corresponding to a NPDCCH order is carried by NPDCCH. The following information is transmitted by means of the DCI format N1:

Flag for format N0/format N1 differentiation (1 bit), NPDCCH order indicator (1 bit)

Format N1 is used for random access procedure initiated by a NPDCCH order only if NPDCCH order indicator is set to "1", format N1 CRC is scrambled with C-RNTI, and all the remaining fields are set as follows:

Starting number of NPRACH repetitions (2 bits), Subcarrier indication of NPRACH (6 bits), All the remaining bits in format N1 are set to one Otherwise, Scheduling delay (3 bits), Resource assignment (3 bits), Modulation and coding scheme (4 bits), Repetition number (4 bits), New data indicator (1 bit), HARQ-ACK resource (4 bits), DCI subframe repetition number (2 bits)

When the format N1 CRC is scrambled with an RA-RNTI, then the following fields among the fields above are reserved.

New data indicator, HARQ-ACK resource

If the number of information bits in format N1 is less than the number of information bits in format N0, zero shall be appended to format N1 until the payload size equals that of format N0.

DCI Format N2

DCI format N2 is used for paging and direct indication. The following information is transmitted by means of the DCI format N2.

Flag for paging/direct indication differentiation (1 bit)

If Flag=0:

Direct indication information (8 bits), reservation information bits are added until the size is equal to that of format N2 with Flag=1

If Flag=1:

Resource assignment (3 bits), Modulation and coding scheme (4 bits), Repetition number (4 bits), and DCI subframe repetition number (3 bits)

NPDCCH-Related Procedure

A UE shall monitor a set of NPDCCH candidates as configured by higher layer signalling for control information, where monitoring implies attempting to decode each of the NPDCCHs in the set according to all the monitored DCI formats.

An NPDCCH search space $NS_k^{(L',R)}$ at aggregation level $L' \in \{1,2\}$ and repetition level $R \in \{1, 2, 4, 8, 16, 32, 64, 128, 256, 512, 1024, 2048\}$ is defined by a set of NPDCCH candidates where each candidate is repeated in a set of R consecutive NB-IoT downlink subframes excluding subframes used for transmission of SI messages starting with subframe k.

The locations of starting subframe k are given by $k=k_b$ where $k_b$ is the $b^{th}$ consecutive NB-IoT DL subframe from subframe k0, excluding subframes used for transmission of SI messages, and $b=u \cdot R$, and $u=0, 1, \ldots,$ $$\frac{R_{max}}{R} - 1,$$

and where subframe k0 is a subframe satisfying the condition $(10n_f + \lfloor n_s/2 \rfloor) \mod T) = (\alpha_{offset} \cdot T)$, where $T=R_{max} \cdot G$, $T \geq 4$. G and $\alpha_{offset}$ are given by the higher layer parameters.

For Type1-NPDCCH common search space, k=k0 and is determined from locations of NB-IoT paging opportunity subframes.

If the UE is configured by high layers with a NB-IoT carrier for monitoring of NPDCCH UE-specific search space, the UE shall monitor the NPDCCH UE-specific search space on the higher layer configured NB-IoT carrier, the UE is not expected to receive NPSS, NSSS, NPBCH on the higher layer configured NB-IoT carrier.

otherwise, the UE shall monitor the NPDCCH UE-specific search space on the same NB-IoT carrier on which NPSS/NSSS/NPBCH are detected.

The starting OFDM symbol for NPDCCH given by index $l_{NPDCCHStart}$ in the first slot in a subframe k and is determined as follows.

if higher layer parameter eutraControlRegionSize is present, $l_{NPDCCHStart}$ is given by the higher layer parameter eutraControlRegionSize.

otherwise $l_{NPDCCHStart}=0$.

Narrowband Reference Signal (NRS)

Before a UE obtains operationModeInfo, the UE may assume narrowband reference signals are transmitted in subframes #0 and #4 and in subframes #9 not containing NSSS.

When a UE receives higher-layer parameter operationModeInfo indicating guardband or standalone, Before the UE obtains SystemInformationBlockType1-NB, the UE may assume narrowband reference signals are transmitted in subframes #9 not containing NSSS and in subframes #0, #1, #3, and #4.

After the UE obtains SystemInformationBlockType1-NB, the UE may assume narrowband reference signals are transmitted in subframes #9 not containing NSSS, in subframes #0, #1, #3, and #4, and in NB-IoT downlink subframes and shall not expect narrowband reference signals in other downlink subframes.

When a UE receives higher-layer parameter operationModeInfo indicating inband-SamePCI or inband-DifferentPCI, Before the UE obtains SystemInformationBlockType1-NB, the UE may assume narrowband reference signals are transmitted in subframes #9 not containing NSSS and in subframes #0 and #4.

After the UE obtains SystemInformationBlockType1-NB, the UE may assume narrowband reference signals are transmitted in subframes #9 not containing NSSS, in subframes #0 and #4, and in NB-IoT downlink subframes and shall not expect narrowband reference signals in other downlink subframes.

Narrowband Primary Synchronization Signal (NPSS)

The sequence $d_l(n)$ used for the narrowband primary synchronization signal is generated from a frequency-domain Zadoff-Chu sequence according to Equation 19:

$$d_l(n) = S(l) \cdot e^{-j\frac{\pi u n(n+1)}{11}}, n = 0, 1, \ldots, 10 \quad \text{[Equation 19]}$$

where the Zadoff-Chu root sequence index u=5 and S(l) for different symbol indices l is given by Table 36.

Table 36 shows an example of S(l).

TABLE 36

| Cyclic prefix length | S(3), ..., S(13) |           |
|---|---|---|
| Normal | 1  1  1  1  −1  −1  1  1  1  −1  1 | |

The same antenna port shall be used for all symbols of the narrowband primary synchronization signal within a subframe.

UE shall not assume that the narrowband primary synchronization signal is transmitted on the same antenna port as any of the downlink reference signals. The UE shall not assume that the transmissions of the narrowband primary synchronization signal in a given subframe use the same antenna port, or ports, as the narrowband primary synchronization signal in any other subframe.

The sequences $d_l(n)$ shall be mapped to resource elements (k, l) in increasing order of first the index k=0, 1, ..., $N_{sc}^{RB}-2$ and then the index l=3, 4, ..., $2N_{symb}^{DL}-1$ in subframe 5 in every radio frame. For resource elements (k, l) overlapping with resource elements where cell-specific reference signals are transmitted, the corresponding sequence element d(n) is not used for the NPSS but counted in the mapping process.

Narrowband Secondary Synchronization Signal (NSSS)

The sequence d(n) used for the narrowband secondary synchronization signal is generated from a frequency-domain Zadoff-Chu sequence according to Equation 20:

$$d(n) = b_q(n) \cdot e^{-j2\pi\theta_f n} \cdot e^{-j\frac{\pi u n'(n'+1)}{131}} \quad \text{[Equation 20]}$$

-continued where, $n = 0, 1, \ldots, 131$ $n' = n \bmod 131$ $m = n \bmod 128$ $u = N_{ID}^{Ncell} \bmod 126 + 3$ $q = \left\lfloor \dfrac{N_{ID}^{Ncell}}{126} \right\rfloor$ The binary sequence $b_q(n)$ is given by Table 37. The cyclic shift $\theta_f$ in frame number $n_f$ is given by $\theta_f = 33/132(n_f/2) \bmod 4$ Table 37 shows an example of $b_q(n)$.

TABLE 37

| q | $b_q(0), \ldots, b_q(127)$ |
|---|---|
| 0 | [1 1 1 1 1 1 1 1 1 1 1 1 1 1 1 1 1 1 1 1 1 1 1 1 1 1 1 1 1 1 1 1<br>1 1 1 1 1 1 1 1 1 1 1 1 1 1 1 1 1 1 1 1 1 1 1 1 1 1 1 1 1 1 1 1<br>1 1 1 1 1 1 1 1 1 1 1 1 1 1 1 1 1 1 1 1 1 1 1 1 1 1 1 1 1 1 1 1<br>1 1 1 1 1 1 1 1 1 1 1 1 1 1 1 1 1 1 1 1 1 1 1 1 1 1 1 1 1 1 1 1] |
| 1 | [1 −1 −1 1 −1 1 1 −1 −1 1 1 −1 1 −1 −1 1 −1 1 1 −1 1 −1 −1 1<br>1 1 −1 −1 1 −1 1 1 −1 1 −1 −1 1 −1 1 1 −1 −1 1 1 −1 1 −1 −1 1<br>1 −1 1 −1 1 1 −1 1 −1 −1 1 −1 1 1 −1 −1 1 1 −1 1 −1 −1 1 1<br>1 −1 −1 1 1 −1 1 −1 −1 1 −1 1 1 −1 −1 1 1 −1 1 −1 −1 1 −1 1<br>1 1 −1 1 −1 −1 1 −1 1 1 −1 −1 1 1 −1 1 −1 −1 1 1 1 −1 1<br>1 −1 −1 1 1 1 −1 1 1 −1 1 1 −1]|
| 2 | [1 −1 −1 1 −1 1 1 −1 1 −1 −1 1 1 −1 −1 1 −1 1 1 −1 1 −1 −1 1<br>1 1 −1 −1 1 −1 1 1 1 −1 −1 1 −1 1 1 −1 −1 1 1 −1 1 −1 −1 1 1<br>1 −1 1 −1 −1 1 1 1 −1 1 −1 −1 1 −1 1 1 −1 −1 1 1 −1 1 −1 −1 1<br>1 −1 −1 1 1 −1 1 −1 −1 1 −1 1 1 −1 −1 1 1 −1 1 −1 −1 1 −1 1<br>1 1 −1 −1 1 1 1 −1 −1 1 −1 1 1 −1 −1 1 1 1 −1 1 −1 −1 1 −1 1<br>1 1 −1 −1 1 1 −1 1 −1 −1 1 1]|
| 3 | [1 −1 −1 1 −1 1 1 1 −1 −1 1 1 −1 1 −1 −1 1 1 1 −1 1 −1 −1 1<br>1 1 −1 −1 1 −1 1 1 1 −1 −1 1 −1 1 1 −1 1 −1 −1 1 1 −1 1 −1 −1 1 1<br>1 −1 1 −1 −1 1 1 1 −1 −1 1 −1 1 1 −1 1 −1 −1 1 1 −1 1 −1 −1 1 −1<br>1 1 −1 1 −1 −1 1 −1 1 1 −1 −1 1 1 −1 1 −1 −1 1 1 −1 1 −1 −1 1 −1<br>1 1 −1 −1 1 −1 1 1 −1 −1 1 1 −1 1 −1 −1 1 −1 1 1 −1 −1 1 −1 1 1 −1<br>1 −1 −1 1 1 1 −1 1 1 −1 1 1 −1]|

The same antenna port shall be used for all symbols of the narrowband secondary synchronization signal within a subframe.

The UE shall not assume that the narrowband secondary synchronization signal is transmitted on the same antenna port as any of the downlink reference signals. The UE shall not assume that the transmissions of the narrowband secondary synchronization signal in a given subframe use the same antenna port, or ports, as the narrowband secondary synchronization signal in any other subframe.

The sequence d(n) shall be mapped to resource elements (k,l) in sequence starting with d(0) in increasing order of first the index k over the 12 assigned subcarriers and then the index l over the last $N_{symb}^{NSSS}$ symbols allocated in radio frames fulfilling $n_f \bmod 2 = 0$, where $N_{symb}^{NSSS}$ is given by Table 38.

Table 38 shows an example of the number of NSSS symbols.

TABLE 38

| Cyclic prefix length | $N_{symb}^{NSSS}$ |
|---|---|
| Normal | 11 |

OFDM Baseband Signal Generation

If the higher layer parameter operationModeInfo does not indicate 'inband-SamePCI' and samePCI-Indicator does not indicate 'samePCI', then the time-continuous signal $s_l^{(p)}(t)$ on antenna port p in OFDM symbol l in a downlink slot is defined by Equation 21:

$$s_l^{(p)}(t) = \sum_{k=-\lfloor N_{sc}^{RB}/2 \rfloor}^{\lfloor N_{sc}^{RB}/2 \rfloor - 1} a_{k^{(-)},1}^{(p)} \cdot e^{j2\pi(k+\frac{1}{2})\Delta f(t - N_{CP,i}T_s)} \quad \text{[Equation 21]}$$

for $0 \leq t < (N_{CP,i} + N) \times T_s$ where $k^{(-)} = k + \lfloor N_{sc}^{RB}/2 \rfloor$, $N = 2048$, $\Delta f = 15$ kHz and $\alpha_{k,l}^{(p)}$ is the content of resource element (k, l) on antenna port p.

If the higher layer parameter operationModeInfo indicates 'inband-SamePCI' or samePCI-Indicator indicate 'samePCI', then the time-continuous signal $s_{l'}^{(p)}(t)$ on antenna port p in OFDM symbol l', where $l' = l + \text{NDL}_{symb}^{DL}$ ($n_s \bmod 4) \in \{0, \ldots, 27\}$ is the OFDM symbol index from the start of the last even-numbered subframe, is defined by Equation 22.

$$s_{l'}^{(p)}(t) =$$

$$\sum_{k=-\lfloor N_{RB}^{DL}N_{sc}^{RB}/2 \rfloor}^{-1} e^{\theta_k(-)} a_{k^{(-)},1}^{(p)} \cdot e^{j2\pi k \Delta f (t - N_{CP,1'} \bmod N_{symb}^{DL} T_s)} +$$

$$\sum_{k=1}^{\lfloor N_{RB}^{DL}N_{sc}^{RB}/2 \rfloor} e^{\theta_k(+)} a_{k^{(+)},1}^{(p)} \cdot e^{j2\pi k \Delta f (t - N_{CP,1'} \bmod N_{symb}^{DL} T_s)} \quad \text{[Equation 22]}$$

for $0 \leq t < (N_{CP,i} + N) \times T_s$ where $k^{(-)} = k + \lfloor N_{RB}^{DL} N_{sc}^{RB}/2 \rfloor$ and $k^{(+)} = k + \lfloor N_{RB}^{DL} N_{sc}^{RB}/2 \rfloor - 1$, $\theta_{k,l'} = j2\pi f_{NB-IoT} T_s$ $(N + \Sigma_{i=0}^{l'} N_{CP,i \bmod 7})$ if resource element (k, l') is used for Narrowband IoT, and 0 otherwise, and $f_{NB-IoT}$ is the frequency location of the carrier of the Narrowband IoT PRB minus the frequency location of the center of the LTE signal.

In a specific 3GPP spec., only normal CP is supported for narrowband IoT downlink.

Initial Access Procedure for NB-IoT

The procedure in which the NB-IoT UE initially accesses the BS is briefly described in the section "General Signal Transmission and Reception Procedure in NB-IoT". Specifically, the above procedure may be subdivided into a procedure in which the NB-IoT UE searches for an initial cell and a procedure in which the NB-IoT UE obtains system information.

In this regard, FIG. 12 illustrates a particular procedure for signaling between a UE and a BS (e.g., NodeB, eNodeB, eNB, gNB, etc.) for initial access in the NB-IoT. In the following, a normal initial access procedure, an NPSS/NSSS configuration, and acquisition of system information (e.g., MIB, SIB, etc.) in the NB-IoT will be described with reference to FIG. 12.

FIG. 12 is a flowchart for describing an initial access process in relation to a wireless system supporting a narrowband Internet of things system to which the present disclosure is applicable.

FIG. 12 illustrates an example for the initial access procedure of the NB-IoT, and a name(s) of each physical channel and/or physical signal may be set or named differently according to the wireless communication system to which the NB-IoT is applied. As an example, basically, FIG. 12 is described, but the NB-IoT based on the LTE system is considered, but this is only for convenience of description, and contents thereof may be extensively applied even to the NB-IoT based on the NR system, of course.

As shown in FIG. 12, NB-IoT is based on following signals transmitted in the downlink: the primary and secondary narrowband synchronization signals (NPSS & NSSS). The NPSS is transmitted over 11 sub-carriers from the first subcarrier to the eleventh subcarrier in the sixth subframe of each frame (S1210), and the NSSS is transmitted over 12 sub-carriers in the NB-IoT carrier in the tenth subframe for FDD and the first subframe for TDD of every other frame (S1220).

The UE may receive MasterInformationBlock-NB (MIB-NB) on NPBCH (NB Physical Broadcast Channel) (S1230).

The MIB-NB uses a fixed schedule with a periodicity of 640 ms and repetitions made within 640 ms. The first transmission of the MIB-NB is scheduled in subframe #0 of radio frames for which the SFN mod 64=0 and repetitions are scheduled in subframe #0 of all other radio frames. The transmissions are arranged in 8 independently decodable blocks of 80 ms duration.

Then, the UE may receive SystemInformationBlock-Type1-NB (SIB1-NB) on PDSCH (S1240).

The SIB1-NB uses a fixed schedule with a periodicity of 2560 ms. SIB1-NB transmission occurs in subframe #4 of every other frame in 16 continuous frames. The starting frame for the first transmission of the SIB1-NB is derived from the cell PCID and the number of repetitions within the 2560 ms period and repetitions are made, equally spaced, within the 2560 ms period. TBS for SystemInformationBlockType1-NB and the repetitions made within the 2560 ms are indicated by schedulingInfoSIB1 field in the MIB-NB.

The SI messages are transmitted within periodically occurring time domain windows (referred to as SI-windows) using scheduling information provided in SystemInformationBlockType1-NB. Each SI message is associated with a SI-window and the SI-windows of different SI messages do not overlap. That is, within one SI-window only the corresponding SI is transmitted. The length of the SI-window is common for all SI messages, and is configurable.

Within the SI-window, the corresponding SI message can be transmitted a number of times over 2 or 8 consecutive NB-IoT downlink subframes depending on TBS. The UE acquires the detailed time/frequency domain scheduling information and other information, e.g. used transport format for the SI messages from schedulingInfoList field in SystemInformationBlockType1-NB. The UE is not required to accumulate several SI messages in parallel but may need to accumulate a SI message across multiple SI windows, depending on coverage condition.

SystemInformationBlockType1-NB configures the SI-window length and the transmission periodicity for all SI messages.

Further, the NB-IoT UE may receive SystemInformationBlockType2-NB (SIB2-NB) on PDSCH for additional information (S1250).

Meanwhile, as shown in FIG. 12, NRS means a narrowband reference signal.

Random Access Procedure for NB-IoT

The procedure in which the NB-IoT UE performs random access to the base station is briefly described in the section "General Signal Transmission and Reception Procedure in NB-IoT". Specifically, the above procedure may be subdivided into a procedure in which the NB-IoT UE transmits a preamble to the base station and a procedure in which the NB-IoT receives a response for the preamble.

In this regard, FIG. 13 illustrates a particular procedure for signaling between a UE and a base station (e.g., NodeB, eNodeB, eNB, gNB, etc.) for random access in the NB-IoT. In the following, details of a random access procedure based on messages (e.g., msg1, msg2, msg3, msg4) used for a normal random access procedure for NB-IoT will be described with reference to FIG. 13.

FIG. 13 is a flowchart for describing a random access process in relation to a wireless system supporting a narrowband Internet of things system to which the present disclosure is applicable.

FIG. 13 illustrates an example for the random access procedure of the NB-IoT, and a name(s) of each physical channel, physical signal, and/or message may be set or named differently according to the wireless communication system to which the NB-IoT is applied. As an example, basically, FIG. 13 is described, but the NB-IoT based on the LTE system is considered, but this is only for convenience of description, and contents thereof may be extensively applied even to the NB-IoT based on the NR system, of course.

As shown in FIG. 13, for NB-IoT, the RACH procedure has the same message flow as LTE with different parameters.

Hereinafter, the NPRACH transmitted by the NB-IoT terminal to the base station in relation to the random access procedure of the NB-IoT will be described in detail.

FIG. 14 is a diagram for describing a narrowband physical random access channel (NPRACH) region in relation to a random access process in relation to a wireless system supporting a narrowband Internet of things system to which the present disclosure is applicable.

As illustrated in FIG. 14, a random access symbol group is constituted by a cyclic prefix having a length and a sequence of identical symbols having a total length. The total number of symbol groups in units of preamble repetition is represented by P. The number of time-continuous symbol groups is given by G.

Parameter values of frame structures 1 and 2 are shown in Tables 39 and 40, respectively.

TABLE 39

| Preamble format | G | P | N | $T_{CP}$ | $T_{SEQ}$ |
|---|---|---|---|---|---|
| 0 | 4 | 4 | 5 | $2048T_s$ | $5 \cdot 8192\,T_s$ |
| 1 | 4 | 4 | 5 | $8192T_s$ | $5 \cdot 8192\,T_s$ |
| 2 | 6 | 6 | 3 | $24576T_s$ | $3 \cdot 24576T_s$ |

TABLE 40

| Preamble format | Supported uplink-downlink configurations | G | P | N | $T_{CP}$ | $T_{SEQ}$ |
|---|---|---|---|---|---|---|
| 0 | 1, 2, 3, 4, 5 | 2 | 4 | 1 | $4778T_s$ | $1 \cdot 8192T_s$ |
| 1 | 1, 4 | 2 | 4 | 2 | $8192T_s$ | $2 \cdot 8192T_s$ |
| 2 | 3 | 2 | 4 | 4 | $8192T_s$ | $4 \cdot 8192T_s$ |
| 0-a | 1, 2, 3, 4, 5 | 3 | 6 | 1 | $1536T_s$ | $1 \cdot 8192T_s$ |
| 1-a | 1, 4 | 3 | 6 | 2 | $3072T_s$ | $2 \cdot 8192T_s$ |

Due to a specific uplink transmission scheme in the NB-IoT, tone information is further included in the RAR message, and an equation for deriving the Random Access Radio Network Temporary Identifier (RA-RNTI) is newly defined. In order to support transmission repetition, corresponding parameters including an RAR window size and a medium access control (MAC) contention resolution timer are extended.

Referring to FIG. 14, the physical layer random access preamble (i.e., PRACH) is based on single subcarrier/tone transmission with frequency hopping for a single user. The PRACH uses a subcarrier spacing of 3.75 kHz (i.e., a symbol length of 266.7 us), and two cyclic prefix lengths are provided to support different cell sizes. Frequency hopping is performed between random access symbol groups, and here, each symbol group includes 5 symbols and a cyclic prefix with pseudo-random hopping between repetitions of the symbol groups.

NPRACH configuration provided by a higher layer (e.g., RRC) may include the following.

NPRACH resource periodicity, $N_{period}^{NPRACH}$ (nprach-Periodicity)

frequency location of the first subcarrier allocated to NPRACH, $N_{scoffset}^{NPRACH}$ (nprach-SubcarrierOffset)

The number of subcarriers allocated to NPRACH), $N_{sc}^{PRACH}$ (nprach-NumSubcarriers)

The number of starting sub-carriers allocated to contention based NPRACH random access. $N_{sc\_cont}^{NPRACH}$ (nprach-NumCBRA-StartSubcarriers)

The number of NPRACH repetitions per attempt, $N_{rep}^{NPRACH}$ (numRepetitionsPerPreambleAttempt)

NPRACH starting time, $N_{start}^{NPRACH}$ (nprach-StartTime),

Fraction for calculating starting subcarrier index for the range of NPRACH subcarriers reserved for indication of UE support for multi-tone msg3 transmission $N_{MSG3}^{NPRACH}$ (nprach-SubcarrierMSG3-RangeStart) NPRACH NPRACH transmission can start only $N_{start}^{NPRACH} \cdot 30720 T_s$ time units after the start of a radio frame fulfilling $n_f$ mod $(N_{period}^{NPRACH}/10)=0$. After transmissions of $4 \cdot 64$ $(T_{CP}+T_{SEQ})$ time units, a gap of $40 \cdot 30720 T_s$ time units shall be inserted.

NPRACH configurations where $N_{scoffset}^{NPRACH} + N_{sc}^{NPRACH} > N_{sc}^{UL}$ are invalid.

The NPRACH starting subcarriers allocated to contention based random access are split in two sets of subcarriers, {0, 1, . . . , $N_{sc\_cont}^{NPRACH} N_{MSG3}^{NPRACH}-1$} and {$N_{sc\_cont}^{NPRACH} N_{MSG3}^{NPRACH}$, . . . , $N_{sc\_cont}^{NPRACH}-1$}, where the second set, if present, indicate UE support for multi-tone msg3 transmission.

The frequency location of the NPRACH transmission is constrained within $N_{sc}^{RA}=12$ subcarriers. Frequency hopping shall be used within the 12 subcarriers, where the frequency location of the $i^{th}$ symbol group is given by $n_{sc}^{RA}(i)=n_{start}+\tilde{n}_{sc}^{RA}(i)$ where $$n_{start} = N_{scoffset}^{NRPACH} + \lfloor n_{init}/N_{sc}^{RA} \rfloor \cdot N_{sc}^{RA}$$

and $$\tilde{n}_{sc}^{RA}(i) = \begin{cases} (\tilde{n}_{sc}^{RA}(0) + f(i/4)) \bmod N_{sc}^{RA} & i \bmod 4 = 0 \text{ and } i > 0 \\ \tilde{n}_{sc}^{RA}(i-1) + 1 & i \bmod 4 = 1, 3 \text{ and } \tilde{n}_{sc}^{RA}(i-1) \\ & \bmod 2 = 0 \\ \tilde{n}_{sc}^{RA}(i-1) - 1 & i \bmod 4 = 1, 3 \text{ and } \tilde{n}_{sc}^{RA}(i-1) \\ & \bmod 2 = 1 \\ \tilde{n}_{sc}^{RA}(i-1) + 6 & i \bmod 4 = 2 \text{ and } \tilde{n}_{sc}^{RA}(i-1) < 6 \\ \tilde{n}_{sc}^{RA}(i-1) - 6 & i \bmod 4 = 2 \text{ and } \tilde{n}_{sc}^{RA}(i-1) \geq 6 \end{cases}$$

$$f(i) = \left( f(t-1) + \left( \sum_{n=10t+1}^{10t+9} c(n)2^{n-(10t+1)} \right) \bmod(N_{sc}^{RA}-1) + 1 \right) \bmod N_{sc}^{RA}$$

$$f(-1) = 0$$

Here, $\tilde{n}_{sc}^{RA}(0)=n_{init} \bmod N_{sc}^{RA}$ having $n_{init}$ is a subcarrier selected by an MAC layer from $\{0, 1, \ldots, N_{sc}^{NPRACH}-1\}$ and a pseudo random sequence c(n) is given as follows.

$c(n)=(x_1(n+N_C)+x_2(n+N_C)) \bmod 2 x_1(n+31)=(x_1(n+3)+ x_1(n)) \bmod 2 x_2(n+31)=(x_2(n+3)+x_2(n+2)+x_2(n+1)+x_2(n)) \bmod 2$ Here, $N_c=1600$ and a first m-sequence should be initialized to $x_1(0)=1$, $x_1(n)=0$, $n=1, 2, \ldots, 30$. Initialization of a second m-sequence may be expressed as $c_{init}=\Sigma_{i=0}^{30} x_2(i) \cdot 2^i$. In the case of NPRACH, a pseudo random sequence generator should be initialized to $c_{init}=N_{ID}^{Ncell}$.

In each NPRACH occurrence, {12, 24, 36, 48} subcarriers may be supported. Further, the random access preamble transmission (i.e., PRACH) may be repeated up to {1, 2, 4, 8, 16, 32, 64, 128} times to enhance coverage.

Discontinuous Reception (DRX) Procedure of NB-IoT

While performing the general signal transmission and reception procedure of the NB-IoT, the NB-IoT UE may transit to an idle state (e.g., RRC_IDLE state) and/or an inactive state (e.g., RRC_INACTIVE state) to reduce power consumption. The NB-IoT UE may be configured to operate in DRX mode after transiting to the idle state and/or the inactive state. For example, after transiting to the idle state and/or the inactive state, the NB-IoT UE may be configured to monitor an NPDCCH related to paging only in a specific subframe (frame or slot) according to a DRX cycle determined by the BS. Here, the NPDCCH related to paging may refer to an NPDCCH scrambled with a P-RNTI (Paging Access-RNTI).

FIG. 15 illustrates an example of DRX mode in an idle state and/or an inactive state.

As shown in FIG. 15, the NB-IoT UE in the RRC_IDLE state only monitors some of the Subframes (SFs) with respect to paging (i.e., the paging occasions, PO) within a subset of radio frames (i.e., the paging frames, PF). Paging is used to trigger an RRC connection and to indicate a change in system information for UE in RRC_IDLE mode.

If the NB-IoT UE detects a NPDCCH with a Paging Access Radio Network Temporary Identifier (P-RNTI) in the PO, then the NB-IoT UE decodes a corresponding NPDSCH. A paging message is sent over the NPDSCH and may contain a list of NB-IoT UEs to be paged and the information, whether paging is for connection setup or whether system information has changed. Each NB-IoT UE which finds its ID in this list forwards to its upper layer that it is paged, and may receive in turn the command to initialize an RRC connection. If system information has changed, the NB-IoT UE starts to read SIB1-NB and may obtain from there the information, which SIBs have to be read again.

When coverage enhancement repetition is applied, the PO refers to first transmission in repetition. The PF and the PO are determined from the DRX cycle provided from the SIB2-NB and the IMSI provided from the USIM card. DRX is discontinuous reception of a DL control channel used for saving a battery life. 128, 256, 512 and 1024 radio frame cycles corresponding to time periods between 1.28 seconds and 10.24 seconds are supported. Since an algorithm for determining the PF and the PO depends on the IMSI, different UEs have different passing occasions, which are temporally evenly distributed. It is sufficient for the UE to monitor one paging occasion within the DRX cycle and when there are multiple paging occasions, the paging is repeated in each of the paging occasions.

The concept of Extended DRX (eDRX) may be applied even to the NB-IoT. This is performed by using a hyper frame (HFN). When the eDRX is supported, a time period in which the UE does not monitor the paging message may be extended up to a maximum of 3 hours. As a result, the UE should know the HFN and a paging time window (PTW) which is the time period within the corresponding HFN. The PTW is defined as start and stop SFNs. Within the PTW, the PF and the PO are determined in the same scheme as unextended DRX.

FIG. 16 illustrates an example of a DRX cycle.

As shown in FIG. 16, the DRX Cycle specifies the periodic repetition of the On Duration followed by a possible period of inactivity. The MAC entity may be configured by RRC with a DRX functionality that controls the UE's PDCCH monitoring activity for the MAC entity's RNTIs (e.g., C-RNTI). Accordingly, the NB-IoT UE monitors the PDCCH for a short period (e.g., On Duration), and may stop monitoring the PDCCH for a long period (e.g., Opportunity for DRX). When in RRC_CONNECTED, if DRX is configured (i.e., Connected Mode DRX, CDRX), the MAC entity is allowed to monitor the PDCCH discontinuously using the DRX operation specified below; otherwise the MAC entity monitors the PDCCH continuously. For NB-IoT, the PDCCH may refer to the NPDCCH. For NB-IoT, an extended DRX cycle of 10.24 s is supported in RRC Connected.

RRC controls DRX operation by configuring the timers onDurationTimer, drx-InactivityTimer, drx-RetransmissionTimer (for HARQ processes scheduled using 1 ms TTI, one per DL HARQ process except for the broadcast process), drx-RetransmissionTimerShortTTI (for HARQ processes scheduled using short TTI, one per DL HARQ process), drx-ULRetransmissionTimer (for HARQ processes scheduled using 1 ms TT1, one per asynchronous UL HARQ process), drx-ULRetransmissionTimerShortTTI (for HARQ processes scheduled using short TTI, one per asynchronous UL HARQ process), the longDRX-Cycle, the value of the drxStartOffset and optionally the drxShortCycleTimer and shortDRX-Cycle. A HARQ RTT timer per DL HARQ process (except for the broadcast process) and UL HARQ RTT Timer per asynchronous UL HARQ process is also defined.

First, definitions for the terms are provided as follows.

onDurationTimer: Specifies the number of consecutive PDCCH-subframe(s) at the beginning of a DRX Cycle.

drx-InactivityTimer: Except for NB-IoT, it specifies the number of consecutive PDCCH-subframe(s) after the subframe in which a PDCCH indicates an initial UL, DL or SL user data transmission for this MAC entity. For NB-IoT, it specifies the number of consecutive PDCCH-subframe(s) after the subframe in which the HARQ RTT timer or UL HARQ RTT timer expires.

drx-RetransmissionTimer: Specifies the maximum number of consecutive PDCCH-subframe(s) until a DL retransmission is received.

drx-ULRetransmissionTimer: Specifies the maximum number of consecutive PDCCH-subframe(s) until a grant for UL retransmission is received.

drxShortCycleTimer: Specifies the number of consecutive subframe(s) the MAC entity shall follow the Short DRX cycle.

drxStartOffset: Specifies the subframe where the DRX Cycle starts.

HARQ RTT Timer: This parameter specifies the minimum amount of subframe(s) before a DL HARQ retransmission is expected by the MAC entity.

PDCCH-subframe: Refers to a subframe with PDCCH. For a FDD serving cell, this may represent any subframe. For a TDD serving cell, this may represent a downlink subframe or a subframe including DwPTS of the TDD UL/DL configuration.

Active Time: Time related to DRX operation, during which the MAC entity monitors the PDCCH.

When a DRX cycle is configured, the Active Time includes the time while:

onDurationTimer or drx-InactivityTimer or drx-RetransmissionTimer or drx-RetransmissionTimerShortTTI or drx-ULRetransmissionTimer or drx-ULRetransmissionTimerShortTTI or mac-ContentionResolutionTimer is running; or a Scheduling Request is sent on PUCCH/SPUCCH and is pending; or an uplink grant for a pending HARQ retransmission can occur and there is data in the corresponding HARQ buffer for synchronous HARQ process; or a PDCCH indicating a new transmission addressed to the C-RNTI of the MAC entity has not been received after successful reception of a Random Access Response for the preamble not selected by the MAC entity.

When DRX is configured, the MAC entity shall for each subframe:

if a HARQ RTT Timer expires in this subframe:
if the data of the corresponding HARQ process was not successfully decoded:
start the drx-RetransmissionTimer or drx-RetransmissionTimerShortTTI for the corresponding HARQ process;
if NB-IoT, start or restart the drx-InactivityTimer.
if an UL HARQ RTT Timer expires in this subframe:
start the drx-ULRetransmissionTimer or drx-ULRetransmissionTimerShortTTI for the corresponding HARQ process.
if NB-IoT, start or restart the drx-InactivityTimer.
if a DRX Command MAC control element or a Long DRX Command MAC control element is received:
stop onDurationTimer;
stop drx-InactivityTimer.
if drx-InactivityTimer expires or a DRX Command MAC control element is received in this subframe:
if the Short DRX cycle is configured:
start or restart drxShortCycleTimer;
use the Short DRX Cycle.
else:
use the Long DRX cycle.
if drxShortCycleTimer expires in this subframe:
use the Long DRX cycle.
if a Long DRX Command MAC control element is received:
stop drxShortCycleTimer;
use the Long DRX cycle.
If the Short DRX Cycle is used and [(SFN*10)+subframe number] modulo (shortDRX-Cycle)=(drxStartOffset) modulo (shortDRX-Cycle); or
if the Long DRX Cycle is used and [(SFN*10)+subframe number] modulo (longDRX-Cycle)=drxStartOffset:
if NB-IoT:
if there is at least one HARQ process for which neither HARQ RTT Timer nor UL HARQ RTT Timer is running, start onDurationTimer.

else:
start onDurationTimer.
during the Active Time, for a PDCCH-subframe, if the subframe is not required for uplink transmission for half-duplex FDD UE operation, and if the subframe is not a half-duplex guard subframe and if the subframe is not part of a configured measurement gap, and for NB-IoT if the subframe is not required for uplink transmission or downlink reception other than on PDCCH:
monitor the PDCCH;
if the PDCCH indicates a DL transmission or if a DL assignment has been configured for this subframe:
if the UE is an NB-IoT UE:
start the HARQ RTT Timer for the corresponding HARQ process in the subframe containing the last repetition of the corresponding PDSCH reception;
else:
start the HARQ RTT Timer for the corresponding HARQ process;
stop the drx-RetransmissionTimer or drx-RetransmissionTimerShortTTI for the corresponding HARQ process.
if NB-IoT, stop drx-ULRetransmissionTimer for all UL HARQ processes.
if the PDCCH indicates an UL transmission for an asynchronous HARQ process or if an UL grant has been configured for an asynchronous HARQ process for this subframe, or if the PDCCH indicates an UL transmission for an autonomous HARQ process or;
if the uplink grant is a configured grant for the MAC entity's AUL C-RNTI and if the corresponding PUSCH transmission has been performed in this subframe:
stop the drx-ULRetransmissionTimer or drx-ULRetransmissionTimerShortTTI for the corresponding HARQ process;
if NB-IoT, stop drx-RetransmissionTimer for all DL HARQ processes.
if the PDCCH indicates a transmission (DL, UL) for an NB-IoT UE:
if the NB-IoT UE is configured with a single DL and UL HARQ process:
stop drx-InactivityTimer.
stop onDurationTimer.
if the PUSCH transmission is completed:
stop drx-ULRetransmissionTimer for all UL HARQ processes.
if the PDCCH indicates HARQ feedback for one or more HARQ processes for which UL HARQ operation is autonomous:
stop the drx-ULRetransmissionTimer for the corresponding HARQ process(es).

When the NB-IoT UE receives PDCCH, the UE executes the corresponding action specified in the above in the subframe following the subframe containing the last repetition of the PDCCH reception where such subframe is determined by the starting subframe and the DCI subframe repetition number field in the PDCCH, unless explicitly stated otherwise.

The same Active Time applies to all activated serving cell(s). For NB-IoT, except for operation in TDD mode, DL and UL transmissions will not be scheduled in parallel, i.e. if a DL transmission has been scheduled an UL transmission will not be scheduled until HARQ RTT Timer of the DL HARQ process has expired (and vice versa).

Machine Type Communication (MTC)
MTC is mainly designed to use LTE for machine-to-machine (M2M) or Internet-of-things (IoT). Usually these application requires not that much throughput (in most case it needs very low throughput). The key requirements of M2M communications include cost reduction, reduced power consumption, enhanced coverage, etc.

To facilitate MTC, long-term evolution (LTE) Release 12 introduced some initial features, such as new low-cost user equipment (UE) category, power saving mode (PSM) and UE assistance information for evolved NodeB (eNB) parameter tuning. The new low-cost UE category introduced in LTE Release 12 is called as Category 0. In order to reduce the baseband and RF complexity of the UE, the Category 0 defines reduced peak data rate (e.g. 1 Mbps), half duplex operation with relaxed radio frequency (RF) requirements, and a single receive antenna. PSM allows a UE to drastically reduce power consumption for applications with delay-tolerant mobile-originated (MO) traffic in order to achieve years of battery life.

Enhanced MTC (eMTC)
In LTE Release 13, additional improvements were introduced to drive down the cost and power consumption further, i.e. eMTC. eMTC introduces a set of physical layer features aiming to reduce the cost and power consumption of UEs and extending coverage, while at the same time reusing most of the LTE physical layer procedures. An eMTC UE can be deployed in any eNB configured to support eMTC and can be served together with other LTE UEs by the same eNB. The main features introduced by eMTC are as follows.

Narrowband operation: An eMTC UE follows narrowband operation for the transmission and reception of physical channels and signals. An eMTC supporting narrowband operation is called a bandwidth reduced low complexity (BL) UE.

A BL UE can operate in any LTE system bandwidth but with a limited channel bandwidth of 6 PRBs (physical resource blocks), which corresponds to the maximum channel bandwidth available in a 1.4 MHz LTE system, in downlink and uplink.

6 PRBs is selected to allow the eMTC UE to follow the same cell search and random access procedures as legacy UEs, which use the channels and signals that occupy 6 RBs: primary synchronization signal (PSS), secondary synchronization signal (SSS), physical broadcast channel (PBCH), and physical random access channel (PRACH).

The eMTC UE can be served by a cell with much larger bandwidth (e.g. 10 MHz), but the physical channels and signals transmitted or received by the eMTC UE are always contained in 6 PRBs.

Low cost and simplified operation: Many features introduced for Category 0 UEs are maintained for eMTC UEs, such as a single receive antenna, reduced soft buffer size, reduced peak data rate (1 Mbps), and half duplex operation with relaxed switching time. New features are introduced to further reduce the cost of eMTC UEs, such as reduced transmission mode support, reduced number of blind decodings for control channel, no simultaneous reception (a UE is not required to decode unicast and broadcast data simultaneously), and the aforementioned narrowband operation.

Transmission of downlink control information (DCI): Instead of the legacy control channel (i.e. physical downlink control channel (PDCCH)), a new control channel called MTC PDCCH (MPDCCH) is introduced. This new control channel spans up to 6 PRBs in the frequency domain and one subframe in the time domain. The MPDCCH is similar to enhanced PDCCH (EPDCCH), with the additional support of common search space for paging and random access. Furthermore, instead of physical control format indicator channel (PCFICH) to indicate the size of the control region, the size of the control region is semi-statically signaled in the system information block (SIB), so eMTC devices do not need to decode PCFICH. Furthermore, instead of physical hybrid automatic repeat request (HARQ) indicator channel (PHICH) to transmit HARQ feedback for uplink transmissions, there is no support of the PHICH, and retransmissions are adaptive, asynchronous, and based on new scheduling assignment received in an MPDCCH.

Extended coverage: The presence of devices in extreme coverage conditions (e.g. a meter in a basement) requires the UEs to operate with much lower signal-to-noise ratio (SNR). The enhanced coverage is obtained by repeating in time almost every channel beyond one subframe (1 ms) to accumulate enough energy to decode. Repetition is extended up to 2048 subframes for the data channels in Release 13 eMTC. The following channels support repetition in eMTC: physical downlink shared channel (PDSCH), physical uplink shared channel (PUSCH), MPDCCH, PRACH, physical uplink control channel (PUCCH), and PBCH. Two modes of operation are introduced to support coverage enhancement (CE). CE mode A is defined for small coverage enhancements, for which full mobility and channel state information (CSI) feedback are supported. CE mode B is defined for UE in extremely poor coverage conditions, for which no CSI feedback and limited mobility are supported.

Frequency diversity by RF retuning: In order to reduce the effect of fading and outages, frequency hopping is introduced among different narrowbands by RF retuning. This hopping is applied to the different uplink and downlink physical channels when repetition is enabled. For example, if 32 subframes are used for transmission of PDSCH, the 16 first subframes may be transmitted over the first narrowband; then the RF front-end is retuned to a different narrowband, and the remaining 16 subframes are transmitted over the second narrowband.

Cell Search

Cell search is the procedure by which a UE acquires time and frequency synchronization with a cell and detects the cell ID of that cell. E-UTRA cell search supports a scalable overall transmission bandwidth corresponding to 6 RBs and upwards. PSS and SSS are transmitted in the downlink to facilitate cell search. If a resynchronization signal is transmitted in the downlink, it can be used to re-acquire time and frequency synchronization with the cell. Physical layer provides 504 unique cell identities using synchronization signals.

The UE searches for the PSS/SSS in the center 6 PRBs to obtain the cell ID, subframe timing information, duplexing mode (time division duplex (TDD), or frequency division duplex (FDD)), and cyclic prefix (CP) length. The PSS uses Zadoff-Chu (ZC) sequence. For frame structure type 1 (i.e. FDD), the PSS shall be mapped to the last orthogonal frequency division multiplexing (OFDM) symbol in slots 0 and 10. For frame structure type 2 (i.e. TDD), the PSS shall be mapped to the third OFDM symbol in subframes 1 and 6. The SSS uses an interleaved concatenation of two length-31 binary sequences. The concatenated sequence is scrambled with a scrambling sequence given by the PSS. For FDD, the SSS shall be mapped OFDM symbol number $N_{symb}^{DL}-2$ in slots 0 and 10, where $N_{symb}^{DL}$ is the number of OFDM symbols in a downlink slot. For TDD, the SSS shall be mapped OFDM symbol number $N_{symb}^{DL}-1$ in slots 1 and 11, where $N_{symb}^{DL}$ is the number of OFDM symbols in a downlink slot.

System Information Acquisition of MTC

Upon searching the cell by using the PSS/SSS, the UE acquires system information (SI). It will be described below with reference to FIG. 17.

FIG. 17 illustrates a normal system for a system information acquisition procedure.

The UE applies the system information acquisition procedure to acquire the access layer (AS) and non-access (NAS) layer system information that is broadcasted by the E-UTRAN. The procedure applies to UEs in RRC_IDLE and UEs in RRC_CONNECTED.

System information is divided into the MasterInformationBlock (MIB) and a number of SystemInformationBlocks (SIBs). The MIB defines the most essential physical layer information of the cell required to receive further system information. The MIB is transmitted on PBCH. SIBs other than SystemInformationBlockType1 SIB1 are carried in SI messages and mapping of SIBs to SI messages is flexibly configurable by schedulingInfoList included in SystemInformationBlockType1, with restrictions that: each SIB is contained only in a single SI message, and at most once in that message; only SIBs having the same scheduling requirement (periodicity) can be mapped to the same SI message; SystemInformationBlockType2 SIB2 is always mapped to the SI message that corresponds to the first entry in the list of SI messages in schedulingInfoList. There may be multiple SI messages transmitted with the same periodicity. SystemInformationBlockType1 and all SI messages are transmitted on DL-SCH. The BL UEs and UEs in CE apply BR version of the SIB or SI messages.

The MIB uses a fixed schedule with a periodicity of 40 ms and repetitions made within 40 ms. The first transmission of the MIB is scheduled in subframe #0 of radio frames for which the SFN mod 4=0, and repetitions are scheduled in subframe #0 of all other radio frames. For TDD/FDD system with a bandwidth larger than 1.4 MHz that supports BL UEs or UEs in CE, MIB transmission may be additionally repeated in subframe #0 of the same radio frame, and in subframe #9 of the previous radio frame for FDD and subframe #5 of the same radio frame for TDD.

The SystemInformationBlockType1 contain information relevant when evaluating if a UE is allowed to access a cell and defines the scheduling of other system information blocks. The SystemInformationBlockType1 uses a fixed schedule with a periodicity of 80 ms and repetitions made within 80 ms. The first transmission of SystemInformationBlockType1 is scheduled in subframe #5 of radio frames for which the SFN mod 8=0, and repetitions are scheduled in subframe #5 of all other radio frames for which SFN mod 2=0.

For BL UEs or UEs in CE, MIB is applied which may be provided with additional repetitions, while for SIB1 and further SI messages, separate messages are used which are scheduled independently and with content that may differ. The separate instance of SIB1 is named as SystemInformationBlockType1-BR. The SystemInformationBlockType1-BR includes information such as valid downlink and uplink subframes, maximum support of coverage enhancement, and scheduling information for other SIBs. The SystemInformationBlockType1-BR is transmitted over PDSCH directly, without any control channel associated with it. The SystemInformationBlockType1-BR uses a schedule with a periodicity of 80 ms. Transport block size (TBS) for SystemInformationBlockType1-BR and the repetitions made within 80 ms are indicated via schedulingInfoSIB1-BR in MIB or optionally in the RRCConnectionReconfiguration message including the MobilityControlInfo. Specifically, five reserved bits in the MIB are used in eMTC to convey scheduling information about SystemInformationBlock-Type1-BR, including time and frequency location, and transport block size. SIB-BR remains unchanged for 512 radio frames (5120 ms) to allow a large number of subframes to be combined.

The SI messages are transmitted within periodically occurring time domain windows (referred to as SI-windows) using dynamic scheduling. Each SI message is associated with a SI-window and the SI-windows of different SI messages do not overlap. That is, within one SI-window only the corresponding SI is transmitted. The length of the SI-window is common for all SI messages, and is configurable. Within the SI-window, the corresponding SI message can be transmitted a number of times in any subframe other than multimedia broadcast multicast service single frequency network (MBSFN) subframes, uplink subframes in TDD, and subframe #5 of radio frames for which SFN mod 2=0. The UE acquires the detailed time-domain scheduling (and other information, e.g. frequency-domain scheduling, used transport format) from decoding system information radio network temporary identity (SI-RNTI) on PDCCH. For a BL UE or a UE in CE, the detailed time/frequency domain scheduling information for the SI messages is provided in SystemInformationBlockType1-BR.

The SystemInformationBlockType2 contains common and shared channel information. After decoding all necessary SIBs, the UE can access the cell by starting a random access procedure.

Random Access Procedure of MTC

The random access procedure is performed for the following events:

Initial access from RRC_IDLE;
RRC Connection Re-establishment procedure;
Handover;
DL data arrival during RRC_CONNECTED requiring random access procedure;
UL data arrival during RRC_CONNECTED requiring random access procedure;
For positioning purpose during RRC_CONNECTED requiring random access procedure.

The legacy random access procedure and random access procedure for eMTC are same in terms of general big picture and overall protocol sequence. That is, the main purpose of random access procedure is to achieve uplink synchronization and obtain the grant for initial attach. Overall protocol sequence of the random access procedure is made up of four messages, i.e. Msg1, Msg2, Msg3 and Msg4. Basic information about the random access procedure is informed to UE via SIB2.

On the other hand, the random access procedure for eMTC supports the signaling of different PRACH resources and different CE levels. This provides some control of the near-far effect for a PRACH by grouping together UEs that experience similar path loss. Up to four different PRACH resources can be signaled, each one with a reference signal received power (RSRP) threshold. The UE estimates the RSRP using the downlink cell-specific reference signal (CRS), and based on the measurement result selects one of the resources for random access. Each of these four resources has an associated number of repetitions for a PRACH and number of repetitions for the random access response (RAR). Thus, UE in bad coverage would need a larger number of repetitions to be successfully detected by the eNB and need to receive the RAR with the corresponding number of repetitions to meet their CE level. The search spaces for RAR and contention resolution messages are also defined in the system information, separately for each CE level. The UE can be configured to be in either CE mode A or CE mode B with a UE-specific search space to receive uplink grants and downlink assignments.

Random Access Procedure for eMTC is Described in Detail.

The random access procedure is initiated by a PDCCH order, by the media access control (MAC) sublayer itself or by the radio resource control (RRC) sublayer. The random access procedure on a secondary cell (SCell) shall only be initiated by a PDCCH order. If a MAC entity receives a PDCCH transmission consistent with a PDCCH order masked with its cell RNTI (C-RNTI), and for a specific serving cell, the MAC entity shall initiate a random access procedure on this serving cell. For random access on the special cell (SpCell), a PDCCH order or RRC optionally indicate the ra-PreambleIndex and the ra-PRACH-MaskIndex; and for random access on an SCell, the PDCCH order indicates the ra-PreambleIndex with a value different from 000000 and the ra-PRACH-MaskIndex. For the primary timing advance group (pTAG), preamble transmission on PRACH and reception of a PDCCH order are only supported for SpCell.

The following information for related serving cell is assumed to be available before the procedure can be initiated for BL UEs or UEs in CE.

the available set of PRACH resources associated with each enhanced coverage level supported in the serving cell for the transmission of the random access preamble, prach-ConfigIndex.
the groups of random access preambles and the set of available random access preambles in each group (SpCell only):
If sizeOfRA-PreamblesGroupA is not equal to numberOfRA-Preambles:
Random access preambles group A and B exist and are calculated as above;
else:
the preambles that are contained in mdom access preamble groups for each enhanced coverage level, if it exists, are the preambles firstPreamble to lastPreamble.
the criteria to select PRACH resources based on RSRP measurement per CE level supported in the serving cell rsrp-ThresholdsPrachInfoList.
the maximum number of preamble transmission attempts per CE level supported in the serving cell maxNumPreambleAttemptCE.
the number of repetitions required for preamble transmission per attempt for each CE level supported in the serving cell numRepetitionPerPreambleAttempt.
the configured UE transmitted power of the serving cell performing the random access procedure, PCMAX, c.
the RA response window size ra-ResponseWindowSize and the contention resolution timer mac-ContentionResolutionTimer (SpCell only) per CE level supported in the serving cell.
the power-ramping factor powerRampingStep and optionally powerRampingStepCE1.
the maximum number of preamble transmission preambleTransMax-CE.
the initial preamble power preambleInitialReceivedTargetPower and optionally preambleInitialReceivedTargetPowerCE1.
the preamble format based offset DELTA_PREAMBLE.

The random access procedure shall be performed as follows:
1> Flush the Msg3 buffer;
1> set the PREAMBLE_TRANSMISSION_COUNTER to 1;
1> if the UE is a BL UE or a UE in CE:
  2> set the PREAMBLE_TRANSMISSION_COUNTER_CE to 1;
  2> if the starting CE level has been indicated in the PDCCH order which initiated the random access procedure, or if the starting CE level has been provided by upper layers:
    3> the MAC entity considers itself to be in that CE level regardless of the measured RSRP;
  2> else:
    3> if the RSRP threshold of CE level 3 is configured by upper layers in rsrp-ThresholdsPrachInfoList and the measured RSRP is less than the RSRP threshold of CE level 3 and the UE is capable of CE level 3 then:
      4> the MAC entity considers to be in CE level 3;
    3> else if the RSRP threshold of CE level 2 configured by upper layers in rsrp-ThresholdsPrachInfoList and the measured RSRP is less than the RSRP threshold of CE level 2 and the UE is capable of CE level 2 then:
      4> the MAC entity considers to be in CE level 2;
    3> else if the measured RSRP is less than the RSRP threshold of CE level 1 as configured by upper layers in rsrp-ThresholdsPrachInfoList then:
      4> the MAC entity considers to be in CE level 1;
    3> else:
      4> the MAC entity considers to be in CE level 0;
1> set the backoff parameter value to 0 ms;
1> proceed to the selection of the random access resource.

A random access preamble (may be referred to as "Msg1") is transmitted over PRACH. A UE randomly selects one random access preamble from a set of random access preambles indicated by system information or a handover command, selects a PRACH resource able to transmit the random access preamble, and transmits the same.

The physical layer random access preamble consists of a cyclic prefix of length TCP and a sequence part of length $T_{SEQ}$. The parameter values are listed in Table 41 below and depend on the frame structure and the random access configuration. Higher layers control the preamble format.

TABLE 41

| Preamble format | $T_{CP}$ | $T_{SEQ}$ |
|---|---|---|
| 0 | 3168 · $T_s$ | 24576 · $T_s$ |
| 1 | 21024 · $T_s$ | 24576 · $T_s$ |
| 2 | 6240 · $T_s$ | 2 · 24576 · $T_s$ |
| 3 | 21024 · $T_s$ | 2 · 24576 · $T_s$ |
| 4 | 448 · $T_s$ | 4096 · $T_s$ |

The transmission of a random access preamble, if triggered by the MAC layer, is restricted to certain time and frequency resources. These resources are enumerated in increasing order of the subframe number within the radio frame and the PRBs in the frequency domain such that index 0 correspond to the lowest numbered PRB and subframe within the radio frame. PRACH resources within the radio frame are indicated by a PRACH configuration index.

For BL/CE UEs, for each PRACH CE level, there is a PRACH configuration configured by higher layers with a PRACH configuration index (prach-ConfigurationIndex), a PRACH frequency offset $\bar{n}_{PRBoffset}^{RA}$ (prach-FrequencyOffset), a number of PRACH repetitions per attempt $N_{rep}^{PRACH}$ (numRepetitionPerPreambleAttempt) and optionally a PRACH starting subframe periodicity $N_{start}^{PRACH}$ (prach-StartingSubframe). PRACH of preamble format 0-3 is transmitted $N_{rep}^{PRACH} \geq 1$ times, whereas PRACH of preamble format 4 is transmitted one time only.

For BL/CE UEs and for each PRACH CE level, if frequency hopping is enabled for a PRACH configuration by the higher-layer parameter prach-HoppingConfig, the value of the parameter $n_{PRBoffset}^{RA}$ depends on the system frame number (SFN) and the PRACH configuration index and is given by In case the PRACH configuration index is such that a PRACH resource occurs in every radio frame, $$n_{PRBoffset}^{RA} = \begin{cases} \bar{n}_{PRBoffset}^{RA} & \text{if } n_f \bmod 2 = 0 \\ (\bar{n}_{PRBoffset}^{RA} + f_{PRB,hop}^{PRACH}) \bmod N_{RB}^{UL} & \text{if } n_f \bmod 2 = 1 \end{cases}$$

– otherwise $$n_{PRBoffset}^{RA} = \begin{cases} \bar{n}_{PRBoffset}^{RA} & \text{if } \left\lfloor \frac{n_f \bmod 4}{2} \right\rfloor = 0 \\ (\bar{n}_{PRBoffset}^{RA} + f_{PRB,hop}^{PRACH}) \bmod N_{RB}^{UL} & \text{if } \left\lfloor \frac{n_f \bmod 4}{2} \right\rfloor = 1 \end{cases}$$

where $n^f$ is the system frame number corresponding to the first subframe for each PRACH repetition, $f_{PRB,hop}^{PRACH}$ corresponds to a cell-specific higher-layer parameter prach-HoppingOffset. If frequency hopping is not enabled for the PRACH configuration then $n_{PRBoffset}^{RA} = \bar{n}_{PRBoffset}^{RA}$.

For BL/CE UEs, only a subset of the subframes allowed for preamble transmission are N PRACH allowed as starting subframes for the $N_{rep}^{PRACH}$ repetitions. The allowed starting subframes for a PRACH configuration are determined as follows:

Enumerate the subframes that are allowed for preamble transmission for the PRACH configuration as $n_{sf}^{RA}=0, \ldots N_{sf}^{RA}$ 1 where $n_{sf}^{RA}=0$ and $n_{sf}^{RA}=N_{sf}^{RA}$ 1 correspond to the two subframes allowed for preamble transmission with the smallest and the largest absolute subframe number $n_{sf}^{abs}$, respectively.

If a PRACH starting subframe periodicity $N_{start}^{PRACH}$ is not provided by higher layers, the periodicity of the allowed starting subframes in terms of subframes allowed for preamble transmission is $N_{rep}^{PRACH}$. The allowed starting subframes defined over $n_{sf}^{RA}=0, \ldots N_{sf}^{RA}-1$ are given by $jN_{rep}^{PRACH}$ where j=0, 1, 2, ....

If a PRACH starting subframe periodicity $N_{start}^{PRACH}$ is provided by higher layers, it indicates the periodicity of the allowed starting subframes in terms of subframes allowed for preamble transmission. The allowed starting subframes defined over $n_{sf}^{RA}=0, \ldots N_{sf}^{RA}-1$ are given by $JN_{start}^{PRACH}+N_{rep}^{PRACH}$ where j=0, 1, 2, ....

No starting subframe defined over $n_{sf}^{RA}=0, \ldots N_{sf}^{RA}-1$ such that $n_{sf}^{RA} > N_{sf}^{RA}-N_{rep}^{PRACH}$ is allowed.

The random access preambles are generated from Zadoff-Chu (ZC) sequences with zero correlation zone, generated from one or several root Zadoff-Chu sequences. The network configures the set of preamble sequences the UE is allowed to use.

There are up to two sets of 64 preambles available in a cell where Set 1 corresponds to higher layer PRACH configuration using prach-ConfigurationIndex and prach-FrequencyOffset and Set 2, if configured, corresponds to higher layer PRACH configuration using prach-ConfigurationIndex-HighSpeed and prach-FrequencyOffsetHighSpeed.

The set of 64 preamble sequences in a cell is found by including first, in the order of increasing cyclic shift, all the available cyclic shifts of a root Zadoff-Chu sequence with the logical index rootSequenceIndexHighSpeed (for Set 2, if configured) or with the logical index RACH_ROOT_SE-QUENCE (for Set 1), where both rootSequenceIndexHigh-Speed (if configured) and RACH_ROOT_SEQUENCE are broadcasted as part of the system information. Additional preamble sequences, in case 64 preambles cannot be generated from a single root Zadoff-Chu sequence, are obtained from the root sequences with the consecutive logical indexes until all the 64 sequences are found.

2. After the random access preamble is transmitted, the UE attempts to receive a random access response (may be referred to as "Msg2") hereof generated by MAC on DL-SCH within a random access response reception window indicated by the system information or the handover command. In detail, the random access response information is transmitted in the form of a MAC PDU, and the MAC PDU is transferred on a physical downlink shared channel (PDSCH).

In order to allow the UE to properly receive the information transmitted on the PDSCH, a PDCCH is also transferred together. For eMTC, The MPDCCH is newly introduced. MPDCCH carries downlink control information and is transmitted across $N_{rep}^{MPDCCH} \geq 1$ consecutive BL/CE DL subframes. Within each of the $N_{rep}^{MPDCCH}$, BL/CE DL subframes an MPDCCH is transmitted using an aggregation of one or several consecutive enhanced control channel elements (ECCEs) where each ECCE consists of multiple enhanced resource element groups (EREGs). Furthermore, the narrowband for MPDCCH is determined by SIB2 parameter mpdcch-NarrowbandsToMonitor.

The MPDCCH includes information regarding a UE which is to receive the PDSCH, frequency and time information of radio resource of the PDSCH, a transmission format of the PDSCH, and the like. When the UE successfully receives the MPDCCH destined therefor, the UE appropriately receives the random access response transmitted on the PDSCH according to the information items of the MPDCCH. The random access response includes a random access preamble identifier (ID), a UL grant (uplink radio resource), C-RNTI, and a time alignment command (TAC). In the above, the reason why the random access preamble identifier is required is because, since a single random access response may include random access response information for one or more UEs, so the random access preamble identifier informs for which UE the UL grant, temporary C-RNTI, and TAC are valid. The random access preamble identifier is identical to a random access preamble selected by the UE in step 1. UL grant included in the random access response depends on CE mode.

3. When the UE receives the random access response valid therefor, the UE processes the information items included in the random access response. Namely, the UE applies the TAC and stores the temporary C-RNTI. Also, the UE transmits scheduled data (may be referred to as "Msg3") stored in a buffer thereof or newly generated data to the BS by using the UL grant on UL-SCH. In this case, an identifier of the UE should be included in the data included in the UL grant. The reason is because, in the contention based random access procedure, the BS cannot determine which UEs perform the random access procedure, so in order to resolve collision later, the BS should identify UEs. Also, there are two types of methods for including an identifier of the UE.

A first method is that when the UE has a valid cell identifier already allocated in the corresponding cell before the random access procedure, the UE transmits its cell identifier through the UL grant. Meanwhile, when the UE has not been allocated a valid cell identifier before the random access procedure, the UE includes its unique identifier (e.g. a SAE-temporary mobile subscriber identity (S-TMSI) or a random ID) in data and transmits the same. In general, the unique identifier is longer than a cell identifier. When the UE transmits the data through the UL grant, the UE starts a contention resolution timer.

4. After the UE transmits the data including its identifier through the UL grant included in the random access response, the UE waits for an instruction from the BS for a contention resolution (may be referred to as "Msg4"). Namely, in order to receive a particular message, the UE attempts to receive the MPDCCH. There are two methods for receiving the MPDCCH. As mentioned above, when the identifier of the UE transmitted through the UL grant is a cell identifier, the UE attempts to receive the MPDCCH by using its cell identifier, and when the identifier is a unique identifier, the UE attempts to receive the MPDCCH by using the temporary C-RNTI included in the random access response. Hereafter, in the former case, when the MPDCCH is received through its cell identifier before the contention resolution timer expires, the UE determines that the random access procedure has been normally performed, and terminates the random access procedure. In the latter case, when the UE receives the MPDCCH through the temporary cell identifier before the contention resolution time expires, the UE checks data transferred by the PDSCH indicated by the MPDCCH. When the data content includes its unique identifier, the UE determines that the random access procedure has been normally performed, and terminates the random access procedure.

At completion of the random access procedure, the MAC entity shall:

discard explicitly signalled ra-PreambleIndex and ra-PRACH-MaskIndex, if any;

flush the HARQ buffer used for transmission of the MAC PDU in the Msg3 buffer.

Extended Discontinuous Reception (eDRX)

Extended DRX cycles are introduced in LTE Release 13 for both idle and connected modes, thus enabling further UE power savings when the UE is not required to be reachable as frequently. For idle mode, the maximum possible DRX cycle length is extended to 43.69 min, while for connected mode the maximum DRX cycle is extended up to 10.24 s. Since the SFN wraps around every 1024 radio frames (i.e. 10.24 s), eDRX introduces hyper-SFN (H-SFN) cycles to enable an extended common time reference to be used for paging coordination between the UE and the network. The H-SFN is broadcast by the cell and increments by one when the SFN wraps around (i.e. every 10.24 s). The maximum eDRX cycle corresponds to 256 hyper-frames.

A UE configured with an eDRX cycle in idle mode monitors the control channel for paging during a paging transmission window (PTW). The PTW is periodic with starting time defined by a paging hyper-frame (PH), which is based on a formula that is known by the mobility managing entity (MME), UE, and eNB as a function of the eDRX cycle and UE identity. During the PTW, the UE monitors paging according to the legacy DRX cycle (TDRX) for the duration of the PTW or until a paging message is received for the UE, whichever is earlier. During the idle time outside of the PTW, the UE power (Pdeep-_sleep) will typically be much lower than the sleep power within the PTW (Psleep). The transition to the deep-sleep state is not instantaneous and requires some preparation time for the UE to load or save the context into non-volatile memory. Hence, in order to take full advantage of power savings in deep-sleep state, the eDRX cycle (TeDRX) should be sufficiently long and the PTW as small as possible.

The matters reviewed in FIGS. 1 to 7 may be applied to clarify or specify the present disclosure. Hereinafter, a method of transmitting and receiving, by a relay terminal, data in a wireless communication system and a device thereof according to an embodiment of the present disclosure will be described in detail.

Hereinafter, a UIoT relay will be described in detail.

In wireless cellular systems, low-complexity wireless communication devices such as NB-IoT, (e)MTC, or other IoT devices of the 3GPP LTE system are also installed in areas with severe attenuation of radio signals such as underground, or communication via a relay is required instead of direct communication with the base station in order to operate wide coverage with a small number of base stations.

In this case, a large number of low-complexity wireless communication devices (e.g., IoT devices) are unintentionally distributed at random locations, and installed and removed at random times for configuration of sensor networks, etc. It may be inefficient that such a network uses a relay having a type of complexity and performance similar to the base station.

Accordingly, the present disclosure proposes a scheme of configuring the relay with the IoT device or a low-complexity device equivalent thereto. For convenience, in the present disclosure, the device having a relay function is named as a UE-type IoT relay device, a UIoT relay device, a relay terminal, or a relay device. However, the names are only for classification and do not limit the scope of the present disclosure and the same and similar technical spirit is included in the scope of the present disclosure regardless of the name.

The UIoT relay device may mean 1) a device that performs only the relay function or a device itself having both the relay function and a terminal function. In the case of 2) above, the UIoT relay device may receive a relay service from the relay device or provide the relay service to another UE.

Furthermore, the UIoT relay device may be a device according to an NR scenario (e.g., NR light) aiming at low complexity and small battery consumption.

In the present disclosure, naming "relay" may mean a state in which the UIoT relay device is connected to provide the relay service to another UE or UIoT relay device unless otherwise limited. Furthermore, the naming "UE" may be a device that receives the relay service from a specific relay unless otherwise mentioned and the UIoT relay device may mean performing a function as the UE.

When configuring a multi-hop relay network (two or more relay devices), the relay device may perform a relay operation providing the relay service to another UE while the relay device itself receives the relay service from another relay device.

The relay service means transferring data received from an upper node (e.g., the base station or an upper relay device) to a lower node (e.g., the UE, a lower relay device, or an NR UE), and transferring data received from the lower node to the upper node.

The UIoT relay device may serve to transfer the data received from the upper node (e.g., the base station or the upper relay device) to a UE to which the UIoT relay device provides the service and transfer the data received from the UE to the upper node. In this case, in the present disclosure, the following terms are used for convenience.

Backhaul (BH) link: Link for signal transmission and reception between the relay device and the upper node Backhaul downlink (BH DL): Link of transmitting the signal from the upper node to the relay device Backhaul uplink (BH UL): Link of transmitting the signal from the relay device to the upper node Access (AC) link: Link for signal transmission and reception between the relay device and the UE Access downlink (AC DL): Link of transmitting the signal from the relay device to the UE Access uplink (AC UL): Link of transmitting the signal from the UE to the relay device In the above-described multi-hop network, the UIoT relay device as the UE may receive the relay service by accessing the upper relay device. In the present disclosure, when the relay device receives the relay service from the upper relay device, the upper relay device may be named as a parent relay device or a parent node. The lower relay device may be named as a child relay device or a child node.

The relay device in the present disclosure may be an IAB-node (relay node) in Integrated Access and backhaul (IAB) links. IAB supports wireless backhaul and relay links according to extension of massive MIMO, multi-beam system and/or available frequency bandwidth (e.g., mmWave spectrum). Terms related to the IAB may be defined as follows.

IAB-node: RAN node supporting wireless access links for UEs and wireless backhaul links for parent nodes and child nodes Parent node: A next hop neighbor node or parent node of IAB-node-Mobile Termination (MT) may be next generation Node B (gNB), or IAB-node or IAB-donor-DU.

Child node: A next hop neighbor node or child node of IAB-node-Distributed Unit (DU) may also correspond to the UE or the IAB-node.

Mobile terminal (MT): Virtual module which is in charge of an operation with the upper node (e.g., upper relay, gNB, or parent node) in the relay Distributed unit (DU): Virtual module which is in charge of an operation with the lower node (e.g., lower relay, UE, or child node) in the relay A backhaul link operation between the base station and the relay device proposed by the present disclosure may be applied even to the BH operation between the parent node and the child node, and the access link operation between the relay device and the UE may be applied even to an operation between UEs receiving the service from the child node and the child node. That is, the upper node of the relay device may be the base station or another relay device.

Hereinafter, matters related to the access link using the side link will be described.

In the 3GPP LTE/NR system, the side link (SL) is defined for direct signal transmission and reception between the UEs (D2D).

In the case of a system in which Frequency Division Duplex (FDD) communication is performed, a downlink (DL) carrier and an uplink (UL) carrier are distinguished between the base station and the UE. In this case, the side link (SL) is defined to be included in the uplink (UL) carrier. Side link communication between the UEs is achieved by partially borrowing some of time/frequency resources of the uplink (UL) carrier.

In the case of a system in which Time Division Duplex (TDD) communication is performed, a downlink time period and an uplink time period are distinguished for the same carrier between the base station and the UE. In this case, the side link (SL) is defined to be included in the uplink time period. The side link communication between the UEs is achieved by partially borrowing some of time/frequency resources of the uplink time period.

In the present disclosure, it is assumed that the access link of the UIoT relay operation is configured by using side link resources. In this case, the communication of the access link using the side link may be basically performed by using the following signals.

Synchronization channel (SCH): The SCH is a signal which the relay device transmits in downlink in order to match time/frequency synchronization between the relay device and the UE. The SCH may have the same or similar structure as PSS/SSS/SSB of LTE/NR, NPSS/NSSS of NB-IoT, PSSS/SSSS of D2D, etc.

Random access channel (RACH): The RACH is a signal which the UE transmits in uplink in order to match the time/frequency synchronization between the relay device and the UE. The RACH may have the same structure as the SCH or have the same or similar structure as the random access preamble of the LTE/NR/NB-IoT.

Scheduling assignment channel (SACH): The RACH is a signal for transmitting scheduling information (MCS, TBS, data transmission resource/timing HARQ related information, etc) for subsequent data. The relay device may transmit the SACH to the UE in order to transmit AC DL data and the relay device may transmit the SACH to the UE in order to transmit AC UL data. The UE may transmit the SACH to the relay in order to transmit the AC UL data. The RACH may have the same or similar structure as (E)PDCCH of the LTE/NR, MPDCCH of the MTC, NPDCCH of the NB-IoT, PSCCH of the D2D, etc.

Scheduled data channel (DCH): The DCH is a signal for transmitting data scheduled by scheduling assignment (SA). The RACH may have the same or similar structure as PDSCH/PUSCH of the LTE/NR, NPDSCH/NPUSCH of the NB-IoT, PSSCH of the D2D, etc.

Broadcast data channel (BCH): The BCH is a signal for the relay device to transmit data to all UEs or a plurality of UEs which belong thereto directly without SA. The BCH may mainly include basic system information which all UEs should know in order to receive the relay service. The BCH may have the same or similar structure as PBCH of the LTE/NR, NPBCH of the NB-IoT, SIB transmitted through the PDSCH without (M/N)PDCCH in the MTC and the NB-IoT, PSBCH of the D2D, etc.

Direct data channel (dDCH): The dDCH is a signal for the relay device to transmit data to the UE or for the UE to transmit data to the relay device without SA. The dDCH may have the same or similar structure as the PDSCH of the D2D.

In the present disclosure, it is assumed that the backhaul link communication between the base station and the relay device or between the relay device and the relay device is basically performed by signals similar to the above-described signal. In the present disclosure, when the signals transmitted in the backhaul link and the signals transmitted in the access link need to be particularly distinguished, the backhaul link signals are attached with a prefix 'BH-', which are called BH-SCH, BH-RACH, BH-SACH, BH-DCH, BH-BCH, and BH-dDCH and the access link signals is attached with a prefix 'AC-', which are called AC-SCH, AC-RACH, AC-SACH, AC-DCH, AC-BCH, and AC-dDCH.

If there is no other limitation, the operation proposed by the present disclosure may be applied to both the backhaul link signal and the access link signal.

Expressions such as a link, a channel, etc., newly defined in relation to the backhaul link and the access link as examples may be replaced with expressions such as the link, the channel, etc., described for the same purpose in a future standard, of course.

Hereinafter, the basic operation of the UIoT relay will be described in detail.

In the present disclosure, it is assumed that the UIoT relay performs the relay operation between the base station and the UE, the backhaul link is performed through the same link resource as communication between the base station and the general UE. That is, when the UIoT relay accesses an FDD base station, the UIoT relay performs BH DL and BH UL operations through the downlink carrier and the uplink carrier of the corresponding base station, respectively and when the UIoT relay accesses a TDD base station, the UIoT relay performs the BH DL and BH UL operations through the downlink time period and the uplink time period of the corresponding base station, respectively. At the same time, it is assumed that the access link with the UE operates through the side link (SL) as described above.

Meanwhile, when the UIoT relay performs the relay operation between the relay device and the relay device (multi-hop relaying), it is assumed that both the backhaul link and the access link operate through the side link SL. In the present disclosure, when the BH operation through the side link (SL) and the BH operation with the base station need to be distinguished, the BH operations are called SL-BH and base station BH, respectively. If not particularly mentioned, the BH operation proposed by the present disclosure may be applied to both the SL-BH and the base station BH.

FIG. 18 illustrates a relay network configuration to which the present disclosure is applied.

Referring to FIG. 18, UE 1 that operates by directly accessing the base station (eNB) performs data transmission and reception through narrowband uplink/downlink (NB DL/UL). On the contrary, UE 2 that serve both as the relay or to perform the relay function performs the data transmission and reception to and from the eNB through a narrowband backhaul link (NB-BH) and performs the data transmission and reception to and from UE 3 itself providing the relay service through the side link (SL). Meanwhile, UE 5 that provides the multi-hop relay service from the eNB to UE 6 performs backhaul link data transmission and reception to and from UE 4 through the SL-BH and provides the relay service to UE 6 through the SL.

Hereinafter, the IoT relay device will be described in detail.

It is assumed that the relay has the following capacity in order to implement a low-complexity relay as described above. However, the following assumption need not particularly be applied in order to implement the present disclosure. That is, the performance of the relay device required may vary depending on contents of each embodiment.

1) Narrowband

A bandwidth which the relay device may use for the backhaul link or the access link is smaller than the bandwidth of the base station. For example, in the LTE system, the relay device may use 6 RB or 25 RB (1 RB=12 subcarriers=approximately 180 kHz) when following the eMTC operation, and a bandwidth of 1 RB when following the NB-IoT operation.

2) Full-Duplex

In the present disclosure, a full duplex relay device capable of performing both a reception operation and a transmission operation is assumed unless specifically specified as a half-duplex relay device.

3) Single Component Carrier

In the case of an FDD backhaul link, the relay device operates only in one downlink carrier and one uplink carrier. In the case of a TDD backhaul link, the relay device may operate only in one identical carrier with respect to the downlink and the uplink.

4) Single TX/RX Chain

When the backhaul link and the access link use different frequency bands (e.g., a downlink band of the backhaul link+an uplink band of the access link), the relay device may perform transmission or reception simultaneously in the backhaul link and the access link.

Hereinafter, assignment of the backhaul link resource and the access link resource to a basic signal will be described in detail.

The UIoT relay device may not perform the transmission operation while performing the reception operation in the backhaul downlink and may not perform the reception operation in the access downlink while performing the transmission operation in the backhaul uplink.

When the operation characteristics are considered, distinguishing timings for the transmission and reception operations for each link is required. Specifically, in relation to dynamic data transmission and reception, a scheme of avoiding transmission and reception collisions in the backhaul link and the access link according to transmission and reception situations may be considered.

However, even if the timings of the transmission and reception operations are distinguished, transmission and reception of a basic signal for maintaining synchronization for each link needs to be guaranteed. The basic signal may include a signal required to maintain backhaul link synchronization between the base station and the relay device or a signal required to maintain access link synchronization between the relay device and the UE.

Thereafter, semi-statically assigning a time period for a specific purpose to the backhaul link or the access link in the present disclosure may mean that the corresponding time period is assigned through a cycle and an offset indicated by a specific time unit (e.g., one or a plurality of slots or subframes) or assigned through a cycle and an offset indicated by a bitmap indicating whether to use a plurality of specific time units.

The assignment of the time period may be predefined in the standard. As another example, the assignment of the time period may be achieved through broadcasting to the relay device by the base station in the case of the backhaul link (broadcasting to the UE by the relay device in the case of the access link) or through the signaling such as the RRC configuration.

The base station transmits resource assignment information for acquiring the backhaul link synchronization, and the relay device monitors a related channel based on the resource assignment information and acquires BH DL and/or BH UL synchronization with the base station. A specific method will be described below in Method A.

The expression of 'A and/or B' used in the present disclosure may be construed as the same meaning as 'including at least one of A and B'. Furthermore, methods to be described are just distinguished for convenience and it is needless to say that some components of any one method may be substituted with some components of another method or may be applied in combination with each other.

(Method A)

A method may be considered, in which the relay device (semi-)statically assigns a time period to monitor the SACH in the backhaul downlink (BH DL).

The relay device may semi-statically assign a time period (slot, subframe, etc.) to monitor the SACH transmitted by the upper node. The time period may be a period in which a specific SACH may be transmitted from the base station. The specific SACH may be any one of SACH for scheduling DL DCH, SACH monitored together by a plurality of relays, SACH for scheduling the paging, or SACH for triggering the random access operation for the base station of the relay device. In the present disclosure, the time period is named as BH-DL-tw1. The name is just for convenience of description and does not limit the scope of the present disclosure.

The relay device may configure BH-DL-tw1 with respect to a UE receiving the service from the relay device itself as follows.

1) In Case of Base Station BH:

Since the relay device may not receive a signal from the UE in BH-DL-tw1, the corresponding period may be configured as a period (AC invalid UL period) in which the UE does not transmit the signal in the access uplink (AC UL). As another example, the BH-DL-tw1 may be excluded from the AC valid UL period configuration.

Since the half duplex relay device may not transmit a signal to the UE in BH-DL-tw1, the corresponding period may be configured as a period (AC invalid DL period) in which the UE does not expect to receive the signal in the access downlink (AC DL). As another example, the BH-DL-tw1 may be excluded from the AC valid DL period configuration.

2) In Case of SL-BH:

The basic operation is the same as the basic operation of the base station BH. Exceptionally, when a frequency resource assigned to the SL-BH DL operation and a frequency resource assigned to the AC-UL operation overlap, the relay device may monitor both the signal transmitted by the parent relay device and the signal transmitted by the UE in the corresponding resource.

The relay device transmits, to the UE, resource assignment information for acquiring synchronization of the access link. The UE monitors the related channel based on the resource assignment information to acquire AC DL and/or AC UL synchronization with the relay device. A specific method will be described below in Methods B and C.

(Method B)

A method may be considered, in which the relay device (semi-)statically assigns a time period to transmit the SCH/BCH in the access link downlink (AC DL).

The relay device should transmit the SCH/BCH at a predetermined time so as for the UE receiving the service from the relay device to match the AC DL synchronization and acquire main system information. Therefore, the relay device may semi-statically assign the time period to transmit the SCH/BCH in advance. In particular, the relay device may request, to the upper node, assignment of the time period to be used for this purpose. In the present disclosure, the corresponding time period is named as AC-DL-tw1. The name is just for convenience of description and does not limit the scope of the present disclosure.

In this case, the relay device may operate as follows for the upper node in AC-DL-tw1.

1) In Case of Base Station BH:

The relay device need not transmit any signal in the base station backhaul uplink (BH UL) in AC-DL-tw1. That is, the corresponding time period may be configured as the BH invalid UL period to the relay device or excluded from the BH valid UL period configuration.

2) In Case of SL-BH:

The SL-BH UL is the same as that of the base station BH. The relay device need not receive any signal from the upper relay device in AC-DL-tw1. That is, the corresponding time period may be configured as the BH invalid DL period to the relay device or excluded from the BH valid DL period configuration.

(Method C)

A method may be considered in which the relay device (semi-)statically assigns a time period to monitor the RACH in the access uplink (AC UL).

The relay device may semi-statically assign a time period to monitor the RACH transmitted by the UE in advance. In the present disclosure, the time period is named as AC-UL-tw1. The name is just for convenience of description and does not limit the scope of the present disclosure.

The relay device may operate as follows for the upper node in AC-UL-tw1.

1) In Case of Base Station BH:

The relay device need not receive any signal from the base station in AC-DL-tw1. That is, the corresponding time period may be configured as the BH invalid DL period to the relay device or excluded from the BH valid DL period configuration.

The relay device need not transmit any signal to the base station in AC-DL-tw1. That is, the corresponding time period may be configured as the BH invalid UL period to the relay device or excluded from the BH valid UL period configuration.

2) In Case of SL-BH:

The case of the SL-BH is the same as the case of the base station BH.

Hereinafter, the matters related to the transmission and reception collision avoidance in the BH link and the AC link will be reviewed.

Specifically, proposed is a scheme of avoiding signal transmission and reception between the upper node (the base station or another relay device) through the backhaul link and signal transmission and reception between the relay device and the lower node (UE) through the access link.

The schemes may be applied in combination with each or at least one of schemes proposed in Methods A to C (i.e., Method A, Method B, and Method C) for basic BH/AC signal transmission and reception. For example, in time periods for transmission of the basic signal proposed in Methods A to C, the base station/relay/UE may follow not operations of schemes to be described below but operations proposed in Methods A to C.

In the present disclosure, for convenience of description, terms active mode and inactive mode are used as follows. However, the terms are examples and may be replaced with terms defined for the same purpose in the standard afterwards, of course.

Active mode: The active mode is a mode in which the relay device (or UE) performs general data transmission and reception by using the SACH, the DCH, etc., to and from the base station (or relay device). As one example, the active mode may be the same as or similar to an RRC-connected state.

Inactive mode: The inactive mode is a mode in which the relay device (or UE) may perform only limited transmission and reception to and from the base station (or relay device) as compared with the active mode. For example, the relay device (or UE) may receive only the paging signal using the SACH/DCH in downlink or transmit only data transmission using the RACH in uplink. Alternatively, a time period in which data may be transmitted and received through the SACH/DCH in DL/UL may be limited as compared with the active mode. As one example, the inactive mode may be the same as or similar to an RRC-idle state.

The mode for each link may be classified as follows.

BH-active mode: When the relay is in an active state with respect to the base station to which the relay belongs, the relay is in the BH-active mode.

BH-inactive mode: When the relay is in an inactive state with respect to the base station to which the relay belongs, the relay is in the BH-inactive mode.

AC-active mode: When even one of the UEs which belong to the relay is in the active mode, the corresponding relay is in the AC-active mode.

AC-inactive mode: When all UEs which belong to the relay are in the inactive mode or when there is no UE which belongs to the relay, the corresponding relay is in the AC-inactive mode.

The operation of the relay device for transmitting and receiving data (or signals) through the backhaul link may be performed as follows. Operations in parentheses may be included or omitted.

First, when the backhaul link is in the inactive mode, the relay device requests, to the upper node, switching the backhaul link to the active mode. (When receiving a response to the request), the relay device performs an operation of switching the backhaul link from the inactive mode to the active mode and switching the access link from the active mode to the inactive mode.

Here, the operation of switching the access link to the inactive mode may be performed together with the operation of switching the backhaul link to the active mode or performed earlier or later there than.

Second, when the backhaul link is in the active mode, the relay device checks the (active or inactive) mode for the access link. When the access link is in the active mode, the relay device switches the mode for the access link to the inactive mode.

Here, the backhaul link active mode means a mode to transmit and receive data (or signals) in the corresponding link and the backhaul link inactive mode means a mode not to transmit and receive data (or signals) in the corresponding link.

Next, the operation of the relay device for transmitting and receiving data (or signals) through the access link may be performed as follows. Operations in parentheses may be included or omitted.

First, when the access link is in the inactive mode, the relay device requests, to the UE, switching the access link to the active mode. (When receiving the response to the request), the relay device performs an operation of switching the access link from the inactive mode to the active mode and switching the backhaul link from the active mode to the inactive mode.

Here, the operation of switching the backhaul link to the inactive mode may be performed together with the operation of switching the access link to the active mode. However, the operation is not limited thereto, but the mode switching operation for the backhaul link may be performed earlier or later than the mode switching operation for the access link.

Second, when the access link is in the active mode, the relay device checks the (active or inactive) mode for the backhaul link. When the backhaul link is in the active mode, the relay device switches the mode for the backhaul link to the inactive mode.

Here, the access link active mode means a mode to transmit and receive data (or signals) in the corresponding link and the access link inactive mode means a mode not to transmit and receive data (or signals) in the corresponding link.

More specific matters will be described in Methods 1 to 5. Methods to be described below are just distinguished for convenience and it is needless to say that some components of any one method may be substituted with some components of another method or may be applied in combination with each other.

(Method 1)

The relay device may be in the active mode only for one link of the backhaul link and the access link. The relay device which is in the BH-active mode may enter the BH-inactive mode in order to perform data transmission and reception to and from the UE in the access link. The relay device which is in the AC-active mode may enter the AC-inactive mode in order to perform data transmission and reception to and from the upper node in the backhaul link.

In this scheme, the relay device which is in the BH-active and AC-inactive modes may be switched to the BH-inactive and AC-inactive modes for data transmission and reception to and from the UE in the access link in the following case. That is, the relay device may request, to the upper node, switching to the backhaul inactive mode and request, to the UE, switching to the access active mode.

Case of completing a reception operation of data to be transmitted from the upper node to the UE (in order to transfer data to the corresponding UE)

Case of detecting a UE that requests the access in order to receive the relay service to the UE For the switching of the mode, the relay device may monitor the random access preamble of the UE so as to detect the UE that requests the service through the access link even in the BH-active (or AC-inactive) mode. The relay device may monitor the RACH transmitted by the UE through AC-UL-tw1.

The relay device which is in the BH-active and AC-active modes may be switched to the BH-active and AC-inactive modes for data transmission and reception to and from the upper node in the backhaul link in the following case. That is, the relay device may request, to UE in the active mode, which access the relay device, switching to the inactive mode and request, to the upper node, switching to the backhaul active mode.

Case of completing the reception operation of data to be transmitted from the UE to the upper node (the base station or another relay device)

Case of detecting the access request of the upper node

For the switching of the mode, the relay may monitor the access request of the upper node through the backhaul link even in the access link active mode (or backhaul inactive mode). Specifically, the relay device may monitor the paging (e.g., SACH for scheduling the paging) transmitted by the upper node through BH-DL-tw1.

The switching of the mode (i.e., switching of a period for data transmission and reception) is illustrated in FIG. 19.

FIG. 19 is a diagram for describing a period for data transmission and reception by a relay terminal is switched according to an embodiment of the present disclosure. Referring to FIG. 19, a period marked in gray means a period in which data transmission and reception between upper and lower nodes are not performed.

The data transmission and reception operations of the relay device may be distinguished by switching of the time period rather than mode switching. For example, in a first period P1, the relay device may be in the active mode for the backhaul link and in the inactive mode for the access link. In a second period P2, the relay device may be in the active mode for the access link and in the inactive mode for the backhaul link.

In FIG. 19, since a period in which the relay device is in the BH active mode is the AC inactive mode, the corresponding period may be the first period P1. Since a period in which the relay device is in the AC active mode is the BH inactive mode, the corresponding period may be the second period P2.

In the first period P1, the relay device may transmit and receive data through the backhaul link, and transmit and receive only a first specific signal for the access link. The first specific signal may be a signal related to switching of the period or synchronization of the access link. Specifically, the first specific signal may be RACH or SCH transmitted through a specific area P1a (e.g., AC-UL-tw1 or AC-DL-tw1) of the first period.

In the second period P1, the relay device may transmit and receive data through the access link, and transmit and receive only a second specific signal for the backhaul link. The second specific signal may be the signal related to the switching of the period or the synchronization of the backhaul link. Specifically, the second specific signal may be SACH transmitted through a specific area P2a (e.g., BH-DL-tw1) of the second period.

(Method 2)

A method may be considered, in which transmission and reception periods of the SACH and the DCH of the relay device are semi-statically configured in the backhaul link and in this period, the relay device is configured not to perform transmission and reception in the access link.

A period in which the relay device receives SACH for DL scheduling for data reception from the upper node and a period in which the resulting DCH may be received, or a period in which the relay device receives SACH for UL scheduling in order to transmit data to the upper node and a period in which the resulting UL DCH may be transmitted may be semi-statically assigned. In relation to the UL DCH, in the case of the SL-BH, when the child node first transmits SACH for scheduling the corresponding DCH in order to transmit UL DCH to the parent node, a period of transmitting the corresponding SACH may be semi-statically assigned.

The semi-statically configured time period is named as BH-tw2. The name is just distinguished for convenience of description and does not limit the scope of the present disclosure.

In a time period other than BH-tw2, the relay device may not perform data transmission and reception to and from the upper node, and the corresponding time period may be utilized for data transmission and reception to and from the UE in the access link.

In this case, the relay device may configure BH-DL-tw2 with respect to a UE receiving the service from the relay device itself as follows.

1) Since the relay device may not receive data from the UE in BH-tw2, BH-tw2 may be configured as a period (AC invalid UL period) in which the UE does not transmit the signal in the AC UL. Alternatively, BH-tw2 may be excluded from the AC valid UL period configuration.

2) Since the relay device may not transmit data to the UE in BH-tw2, BH-tw2 may be configured as a period (AC invalid DL period) in which the UE does not expect to receive the signal in the AC UL. Alternatively, BH-tw2 may be excluded from the AC valid DL period configuration.

(Method 3)

A method may be considered, in which transmission and reception periods of the SACH and the DCH of the relay device may be semi-statically configured in the access link and in this period, the relay device is configured not to perform transmission and reception in the BH link.

A period in which the relay device transmits SACH for UL scheduling for data reception from the UE and a period in which the resulting UL DCH is received, or a period in which the relay device receives SACH for DL scheduling in order to transmit data to the UE and a period in which the resulting DL DCH may be may be transmitted may be semi-statically assigned. The semi-statically configured time period is named as AC-tw2. The name is just distinguished for convenience of description and does not limit the scope of the present disclosure.

In a time period other than AC-tw2, the relay device may not perform data transmission and reception to and from the UE, and the corresponding time period may be utilized for data transmission and reception to and from the upper node in the backhaul link.

The relay device may operate as follows for the upper node in AC-tw2.

1) The relay device need not receive any signal from the upper node in AC-tw2. That is, AC-tw2 may be configured as the BH invalid DL period to the relay or excluded from the BH valid DL period configuration.

2) The relay device need not transmit any signal to the upper node in AC-tw2. That is, AC-tw2 may be configured as the BH invalid UL period to the relay device or excluded from the BH valid UL period configuration.

Hereinafter, the operations according to Methods 2 and 3 described above will be described in more detail with reference to FIG. 20.

FIG. 20 is a diagram for describing a period semi-statically configured for a backhaul link or an access link according to an embodiment of the present disclosure. In FIG. 20, a period marked in gray means an interval in which data transmission and reception between upper and lower nodes are not performed.

(a) of FIG. 20 illustrates the operation according to Method 2 above. Referring to (a) of FIG. 20, BH-tw2 may be the first period P1 which is semi-statically configured. In BH-tw2(P1), the relay device may perform data transmission and reception only through the backhaul link and does not perform data transmission and reception through the access link.

In a period (i.e., the second period P2) other than the semi-statically configured first period P1, the relay device may perform data transmission and reception through the access link. Although not illustrated in (a) of FIG. 20, the relay device may transmit and receive the second specific signal through the backhaul link in a specific area P2a of the second period. As one example, the relay device may monitor the paging signal from the base station in the time period BH-DL-tw1 assigned so as to receive the paging from the base station even in a period other than the period BH-tw2.

(b) of FIG. 20 illustrates the operation according to Method 3. Referring to (b) of FIG. 20, AC-tw2 may be the second period P2 which is semi-statically configured. In AC-tw2(P2), the relay device may perform data transmission and reception only through the access link and does not perform data transmission and reception through the backhaul link. In a period (i.e., the first period P1) other than the semi-statically configured second period (P2, AC-tw2), the relay device may perform data transmission and reception through the backhaul link. Although not illustrated in (b) of FIG. 20, the relay device may transmit and receive the first specific signal through the access link in a specific area P1a of the first period.

As one example, the relay device may monitor the RACH signal from the UE in the time period AC-UL-tw1 assigned so as to receive the access request from the UE even in a period other than the period AC-tw2. As another example, the relay may transmit the signal to the UE in the time period AC-DL-tw1 assigned so as to transmit a required DL signal (e.g., SCH) to the UE even in the period other than AC-tw2.

(Method 4)

A method may be considered, in which an SACH transmission period or an SACH reception period between the backhaul link and the relay device is semi-statically configured and in the corresponding period, transmission and reception are configured not to be performed in the AC link.

A period in which the relay device receives the SACH for the DL scheduling from the upper node for data reception and a period in which the relay device receives the SACH for the UL scheduling in order to transmit data to the upper node (or a period in which the relay device transmits the SACH for the UL scheduling to the upper node when the relay device informs the upper node of the UL scheduling information) are semi-statically assigned. The time period is named as BH-SA-tw2 for convenience. The name is just distinguished for convenience of description and does not limit the scope of the present disclosure.

When the relay device does not detect the SACH transmitted by the upper node in BH-SA-tw2 (or when the relay device does not transmit the SACH to the upper node), the relay device may utilize the time period other than BH-SA-tw2 for data transmission and reception to and from the UE in the access link.

When the relay device detects the SACH transmitted by the upper node in BH-SA-tw2 (or when the relay device transmits the SACH to the base station), the relay device may perform the following operation in relation to transmission and reception of DCH scheduled by the SACH. A 'scheduled DCH period' means a time period in which the DCH scheduled by the SACH should be transmitted and received or a time period defined in association with the DCH scheduled by the SACH.

1) The relay device may operate with the priority to the upper node in transmitting and receiving the BH-DCH scheduled by the BH-SACH. Specifically, the relay device may operate as follows.

The relay device may stop the transmission and reception operations to and from the UE during the scheduled DCH period.

The relay device may transmit information for the corresponding period to the UE so as for the UE not to transmit the signal for the scheduled DCH period.

The relay device may transmit the information for the corresponding period to the UE so as for the UE not to expect signal reception from the relay for the scheduled DCH period.

2) The relay device may operate with the priority to the access link in transmitting and receiving the BH-DCH scheduled by the BH-SACH. Specifically, the relay device may operate as follows.

When receiving the signal from the UE through the access link in a period which overlaps with the scheduled DCH period, the relay device does not receive the BH-DCH from the upper node in the corresponding period or the entire scheduled DCH period.

The relay device may inform the upper node of a fact that the relay device may not receive the BH-DCH or a period in which the relay device may not receive the BH-DCH before or after transmission of the BH-DCH by the upper node. In this case, the relay device may transmit NACK as an HARQ feedback for the corresponding DCH or not transmit the HARQ feedback.

When transmitting the signal to the UE through the access link in the period which overlaps with the scheduled DCH period, the relay device may not transmit the BH-DCH to the upper node in the corresponding period or the entire scheduled DCH period.

The relay device may inform the upper node of a fact that the relay device may not transmit the BH-DCH or a period in which the relay device may not transmit the BH-DCH before or after transmission period of the BH-DCH.

The relay device may configure BH-DL-tw2 with respect to a UE receiving the service from the relay device itself.

The relay device may configure BH-SA-tw2 as a period (AC invalid UL period) in which the UE does not transmit the signal in the AC UL. Alternatively, the relay device may exclude BH-SA-tw2 from the AC valid UL period configuration.

The relay device may configure BH-SA-tw2 as a period (AC invalid DL period) in which the UE does not expect signal reception in the AC DL. As another example, the relay device may exclude BH-SA-tw2 from the AC valid DL period configuration.

(Method 5)

A method may be considered, in which an SACH transmission period or an SACH reception period is semi-statically configured in the access link and in this period, the relay device is configured not to perform transmission and reception in the backhaul link.

A period in which the relay device transmits the SACH for the DL scheduling in order to transmit data to the UE or a period in which the relay device receives the SACH for the UL scheduling in order to receive data from the UE (or a period in which the relay device transmits the SACH for the UL scheduling when the relay device schedules UL data of the UE) may be semi-statically assigned. The time period is named as AC-SA-tw2 for convenience. The name is just distinguished for convenience of description and does not limit the scope of the present disclosure.

When the relay device does not detect the SACH transmitted by the UE in AC-SA-tw2 (or when the relay device does not transmit the SACH to the UE), the relay device may utilize the time period other than AC-SA-tw2 for data transmission and reception to and from the upper node.

When the relay device detects the SACH transmitted by the UE in AC-SA-tw2 (or when the relay device transmits the SACH to the UE), the relay device may perform the following operation in relation to transmission and reception of AC-DCH scheduled by the AC-SACH. The 'scheduled DCH period' means a time period in which the AC-DCH scheduled by the AC-SACH should be transmitted and received or a time period defined in association with the AC-DCH scheduled by the AC-SACH.

1) The relay device may operate with the priority to UE scheduling in transmitting and receiving the AC-DCH scheduled by the AC-SACH. Specifically, the relay device may operate as follows.

The relay device may stop the transmission and reception operations to and from the upper node UE during the scheduled DCH period. In this case, the relay device may transmit NACK as an HARQ feedback for the BH-DCH or not transmit the HARQ feedback.

The relay device may transmit information for the corresponding period to the upper node so as for the upper node not to transmit the signal for the scheduled DCH period.

The relay device may transmit information for the corresponding period to the upper node so as for the upper node not to expect signal reception from the relay for the scheduled DCH period.

2) The relay device may operate with the priority to the backhaul link in transmitting and receiving the AC-DCH scheduled by the AC-SACH. Specifically, the relay device may operate as follows.

When receiving the signal to the upper node through the backhaul link in the period which overlaps with the scheduled DCH period, the relay device may not receive the AC-DCH from the UE in the corresponding period or the entire scheduled DCH period.

The relay device may inform the UE of a fact that the relay device may not receive the AC-DCH or a period in which the relay device may not receive the AC-DCH before or after transmission of the AC-DCH by the UE.

When transmitting the signal from the upper node through the backhaul link in the period which overlaps with the scheduled DCH period, the relay device does not transmit the AC-DCH to the UE in the corresponding period or the entire scheduled DCH period.

The relay device may inform the UE of a fact that the relay device may not transmit the AC-DCH or a period in which the relay device may not transmit the AC-DCH before or after transmission period of the AC-DCH.

In this case, the upper node may configure AC-SA-tw2 with respect to the relay device which belongs to the upper node itself as follows.

AC-SA-tw2 may be configured as a period (BH invalid UL period) in which the signal is not transmitted to the upper node in the BH UL. As another example, AC-SA-tw2 may be excluded from the BH valid UL period configuration.

AC-SA-tw2 may be configured as a period (BH invalid DL period) in which the relay does not expect signal reception in the BH DL. As another example, AC-SA-tw2 may be excluded from the BH valid DL period configuration.

FIG. 21 illustrates periods according to Methods 4 and 5. In FIG. 21, a period marked in gray means an interval in which data transmission and reception between upper and lower nodes are not performed.

(a) of FIG. 21 illustrates the operation according to Method 4. Referring to (a) of FIG. 21, BH-SA-tw2 may be the first period P1 which is semi-persistently configured. The relay device may transmit and receive only the BH-SACH through the backhaul link in the semi-persistently configured first period P1 and not perform data transmission and reception through the access link.

In a period (i.e., the second period P2) other than the semi-persistently configured first period P1, the relay device may perform data transmission and reception through the access link. Since transmission and reception of the BH-DCH scheduled by the BH-SACH are performed in the second period P2, the transmission and reception of the BH-DCH may collide with the data transmission and reception through the access link. The relay device may operate with the priority to any one of the BH-DCH transmission and reception or the access link.

When giving the priority to the BH-DCH transmission and reception, the relay device may transmit information for a period for the BH-DCH transmission and reception to the lower node (e.g., UE).

When giving the priority to the data transmission and reception through the access link, the relay device may transmit, to the upper node, information for a period (i.e., a data transmission and reception period through the access link) in which the BH-DCH transmission to and reception from the upper node may not be performed.

(b) of FIG. 21 illustrates the operation according to Method 5. Referring to (b) of FIG. 21, AC-SA-tw2 may be the second period P2 which is semi-persistently configured. The relay device may transmit and receive only the AC-SACH through the access link in the semi-persistently configured second period P2 and not perform data transmission and reception through the backhaul link.

In a period (i.e., the first period P1) other than the semi-persistently configured second period P2, the relay device may perform data transmission and reception through the backhaul link. Since transmission and reception of the AC-DCH scheduled by the AC-SACH are performed in the first period P1, the transmission and reception of the AC-DCH may collide with the data transmission and reception through the backhaul link. The relay device may operate with the priority to any one of the AC-DCH transmission and reception or the backhaul link.

When giving the priority to the AC-DCH transmission and reception, the relay device may transmit information for a period for the AC-DCH transmission and reception to the upper node.

When giving the priority to the data transmission and reception through the backhaul link, the relay device may transmit, to the lower node, information for a period (i.e., a data transmission and reception period through the backhaul link) in which the AC-DCH transmission to and reception from the lower node may not be performed.

Hereinafter, a transmission and reception period connection in the backhaul link and the access link will be described in detail.

When the transmission and reception period in the backhaul link or the access link is limited as in the scheme, the full duplex relay device capable of simultaneous transmission and reception may configure a reception period for one link (e.g., the backhaul link) as a transmission period for the other link (e.g., the access link) and vice versa. The full duplex relay device may simultaneously perform transmission and reception if frequencies are different.

Specifically, the transmission period in the backhaul link may be configured as the reception period in the access link and the reception period in the backhaul link may be configured as the transmission period in the access link. The transmission period in the access link may be configured as the reception period in the backhaul link and the reception period in the access link may be configured as the transmission period in the backhaul link.

The contents may be applied to the above-described methods as follows.

The BH-DL-tw1 period may be configured as AC-DL-tw1 or other transmission periods for the access link.

The AC-DL-tw1 period may be configured as BH-DL-tw1 or other reception periods for the backhaul link.

The AC-UL-tw1 period may be configured as the transmission period for the backhaul link.

A period for receiving the BH-SACH in the BH-SA-tw2 period may be configured as the transmission period for the access link.

A period for transmitting the AC-SACH in the AC-SA-tw2 period may be configured as the reception period for the backhaul link.

The operations of the upper node/relay device/lower node according to the above-described embodiment (e.g., signaling and operations related to at least any one of Methods A to C and Methods 1 to 5) may be processed by one or more processors 102 and 202 in FIGS. 1 to 4.

Further, the operations of the upper node/relay device/lower node according to the above-described embodiment (e.g., signaling and operations related to at least any one of Methods A to C and Methods 1 to 5) may be stored in a memory (e.g., one or more memories 104 and 204 in FIG. 1) in the form of a command/program (e.g., instruction or executable code) for driving at least one processor (e.g., 102 or 202).

FIGS. 22 and 23 illustrate a relay scenario which may occur in an LTE network in a situation in which the present disclosure is applied.

Specifically, FIGS. 22 and 23 illustrate an example of a relay scenario which may occur in the LTE network in a situation in which the relay is implemented. The contents of the present disclosure may be implemented by the scenarios of FIGS. 22 and 23, but are not limited thereto, and some components may be differently applied so as to be implemented in a network structure optimized to the IoT UE or a new wireless network system such as New Rat.

Hereinafter, the method in which the relay terminal transmits and receives signals in the wireless communication system based on the above-described methods (or embodiments) will be described in detail with reference to FIG. 24.

FIG. 24 is a flowchart for describing a method of transmitting and receiving, by a relay terminal, signals in a wireless communication system according to an embodiment of the present disclosure.

Referring to FIG. 24, the method of transmitting and receiving, by the relay terminal, signals in the wireless communication system according to an embodiment of the present disclosure may include performing signal transmission and reception through a backhaul link in a first period (S2410) and performing signal transmission and reception through an access link in a second period (S2420).

In S2410, the relay terminal (100/200 in FIGS. 1 to 4) may transmit and receive signals to and from an upper node (100/200 in FIGS. 1 to 4) through the backhaul link in the first period.

The upper node may be the base station or another relay terminal. Specifically, in the case of a multi-hop relay network, the upper node may be another relay terminal.

According to an embodiment, the first period may be a period in which signals may be transmitted to and received from the upper node and only a first specific signal may be transmitted to and received from the at least one lower node.

According to an embodiment, the first period may be determined according resource assignment information. The resource assignment information may include information related to resource assignment of the backhaul link. The relay terminal may determine the first period for transmitting and receiving the signals through the backhaul link by using the resource assignment information.

The resource assignment information may be transmitted through RRC signaling or the backhaul link.

According to an embodiment, the relay terminal may operate in different modes for each period of the first period and the second period. The mode may be an active mode or an inactive mode. The active mode may be a mode in which signals may be transmitted and received, and the inactive mode may be a mode in which signals may not be transmitted and received.

Specifically, in the first period, the relay terminal may operate in the active mode for the backhaul link and operate in the inactive mode for the access link. In the active mode, the relay terminal may transmit and receive the signals through the backhaul link. In the inactive mode, the relay terminal may transmit and receive only a specific signal through the access link. In the second period, the relay terminal may operate in a different mode from the first period. That is, the relay terminal may operate in the inactive mode for the backhaul link and operate in the active mode for the access link.

According to an embodiment, the relay terminal may transmit and receive a first specific signal through the access link in a specific area of the first period. Specifically, the specific area of the first period may be a period corresponding to AC-tw1. The first specific signal may be a signal related to a random access channel (RACH) or a synchronization channel (SCH). As one example, the first specific signal may be a random access preamble.

According to an embodiment, at least one of the backhaul link or the access link may be a side link (SL). Specifically, the backhaul link or the access link may be configured to borrow some of time/frequency resources for the side link SL. In this case, the corresponding backhaul link is SL-BH and the corresponding access link is SL-AC.

According to an embodiment, the specific area of the first period may be semi-statically assigned.

According to an embodiment, the first period may be switched to the second period when the relay terminal completes reception of data to be transmitted from the upper node to at least one lower node or receives the first specific signal from the at least one lower node.

For the switching to the second period, the relay terminal may request the lower node to operate in the inactive mode through the backhaul link and request the lower node to operate in the active mode through the access link.

According to an embodiment, the first specific signal related to the switching to the second period may be the random access preamble.

According to an embodiment, the first period may be semi-statically assigned. When the first period is semi-statically assigned, the relay terminal may transmit and receive the signal only through the backhaul link in the corresponding period and not transmit and receive the signal through the access link.

According to an embodiment, when the first period is semi-statically assigned, the relay terminal may receive a Backhaul Scheduling Assignment Channel (BH-SACH) in the first period. The relay terminal may receive a Backhaul Scheduled Data Channel (DCH) scheduled by the BH-SACH in the second period.

According to an embodiment, in the second period, any one of reception of the BH-DCH, and transmission and reception of the signals through the access link has a priority. Specifically, when the reception of the BH-DCH has the priority in the second period, the relay terminal may transmit, to the at least one lower node, information for a period for receiving the BH-DCH. In the second period, when the transmission and reception of the signals through the access link have the priority, the relay terminal may transmit, to the upper node, information for a period in which the BH-DCH may not be received.

As one example, the period in which the BH-DCH may not be received may be a period in which the period for transmitting and receiving the signals through the access link and the period for receiving the BH-DCH overlap with each other. As another example, the period in which the BH-DCH may not be received, may be the entire second period.

Additionally, a third period in which both the backhaul link and the access link are in the inactive mode may be defined in addition to the above-described first and second periods.

That is, the third period may mean a period in which the relay terminal does not transmit and receive the signals to and from the upper node and/or the lower node. However, as mentioned above, the relay terminal may be defined to transmit and receive a specific signal (RACH, SCH, etc.) to and from the upper node and/or the lower node in the third period.

In the third period, the relay terminal may be in an idle mode state. For example, in the third period, (1) when communication is required through the backhaul link, the relay terminal which is in the idle mode may wake up as backhaul active and (2) when communication is required through the access link, the relay terminal which is in the idle mode may wake up as access active.

The above description of the third period may be applied to each or at least one of the schemes proposed in the present disclosure.

In terms of implementation, according to S2410 described above, an operation in which the relay terminal (100/200 in FIGS. 1 to 4) transmits and receives the signal to and from the upper node (100/200 in FIGS. 1 to 4) through the backhaul link in the first period may be implemented by the devices in FIGS. 1 to 4.

For example, referring to FIG. 2, one or more processors 102 may control one or more transceivers 106 and/or one or more memories 104 so as to transmit and receive the signals to and from the upper node (100/200 in FIGS. 1 to 4) through the backhaul link in the first period.

In S2420, the relay terminal (100/200 in FIGS. 1 to 4) may transmit and receive signals to and from at least one lower node (100/200 in FIGS. 1 to 4) through the access link in the second period.

The lower node may be a UE that receives the relay service from the relay terminal.

According to an embodiment, the second period may be a period in which signals may be transmitted to and received from the at least one lower node and only a second specific signal may be transmitted to and received from the upper node in a specific area According to an embodiment, the relay terminal may determine the second period for transmitting and receiving the signals through the access link by using the resource assignment information.

According to an embodiment, in the second period, the relay terminal may operate in the active mode for the access link and operate in the inactive mode for the backhaul link. In the active mode, the relay terminal may transmit and receive the signals through the access link. In the inactive mode, the relay terminal may transmit and receive only a specific signal through the backhaul link.

According to an embodiment, the relay terminal may transmit and receive a second specific signal through the backhaul link in the specific area of the second period. Specifically, the specific area of the second period may be a period corresponding to BH-tw1. The second specific signal may be a signal related to a scheduling assignment channel (SACH). Specifically, the second specific signal may be specific BH-SACH. As one example, the specific BH-SACH may be BH-SACH for scheduling the paging.

According to an embodiment, the specific area of the second period may be semi-statically assigned.

According to an embodiment, the second period may be switched to the first period when the relay terminal completes reception of data to be transmitted from the lower node to the upper node or receives the second specific signal from the upper node.

For the switching to the first period, the relay terminal may request the lower node to operate in the inactive mode through the access link and request the upper node to operate in the active mode through the backhaul link.

According to an embodiment, the second specific signal related to the switching to the first period may be the backhaul scheduling channel (BH-SACH) for scheduling the paging.

According to an embodiment, the second period may be semi-statically assigned. When the second period is semi-statically assigned, the relay terminal may transmit and receive the signal only through the access link in the corresponding period and not transmit and receive the signal through the backhaul link.

According to an embodiment, when the second period is semi-statically assigned, the relay terminal may receive an Access Scheduling Assignment Channel (AC-SACH) in the second period. The relay terminal may receive an Access Scheduled Data Channel (AC-DCH) scheduled by the AC-SACH in the first period.

According to an embodiment, in the first period, any one of reception of the AC-DCH, and transmission and reception of the signals through the backhaul link has a priority. Specifically, when the reception of the AC-DCH has the priority in the first period, the relay terminal may transmit, to the upper node, information for a period for receiving the AC-DCH. In the first period, when the transmission and reception of the signals through the backhaul link have the priority, the relay terminal may transmit, to the at least one lower node, information for a period in which the AC-DCH may not be received.

As one example, the period in which the AC-DCH may not be received may be a period in which the period for transmitting and receiving the signals through the backhaul link and the period for receiving the AC-DCH overlap with each other. As another example, the period in which the transmission and reception of the AC-DCH may not be performed may be the entire first period.

In terms of implementation, according to S2420 described above, an operation in which the relay terminal (100/200 in FIGS. 1 to 4) transmits and receives the signal to and from at least one lower node (100/200 in FIGS. 1 to 4) through the access link in the second period may be implemented by the devices in FIGS. 1 to 4.

For example, referring to FIG. 2, one or more processors 102 may control one or more transceivers 106 and/or one or more memories 104 so as to transmit and receive the signals to and from the at least one lower node (100/200 in FIGS. 1 to 4) through the access link in the second period.

Effects of the method of transmitting and receiving, by the relay terminal, signals in the wireless communication system and the device thereof according to an embodiment of the present disclosure are as follows.

In a wireless communication system according to an embodiment of the present disclosure, a method of transmitting and receiving, by a relay terminal, signals, and a device thereof separates periods (first and second periods) for signal transmission and reception for each link (a backhaul link or an access link). According to the present disclosure, since transmission and reception of a specific signal related to synchronization maintenance of each link (the backhaul link or the access link) is performed in specific areas of different periods (second and first periods), a relay service can be stably provided while preventing a collision between signal transmission and reception operations of each link.

Furthermore, according to the present disclosure, when reception of data to be transmitted from an upper node to a lower node is completed or the second specific signal is received, the first period is switched to the second period. Furthermore, when reception of data to be transmitted from the lower node to the upper node is completed or the first specific signal is received, the second period is switched to the first period. Therefore, in the present disclosure, since the period is adaptively switched the first or second period according to a signal transmission and reception situation for each link, the quality of a relay service is improved.

Furthermore, any one interval of the first period or the second period is assigned semi-statically. Since signals are transmitted and received only through the backhaul link or the access link in the corresponding period, an operation of the relay terminal is simplified. Accordingly, according to the present disclosure, complexity of relay terminal implementation can be reduced.

Furthermore, in the present disclosure, since only transmission and reception of SACH (BH-SACH or AC-SACH) is configured to be performed the semi-statically assigned period (the first period or the second period), resource utilization can be increased by minimizing the semi-statically period.

Furthermore, in the present disclosure, transmission and reception of DCH (BH-DCH or AC-DCH) scheduled by the SACH are performed according to a priority in different periods (the second period or the first period). Accordingly, in the present disclosure, a collision which may occur as transmission and reception of DCH scheduled in the semi-statically assigned period (the first or second period) are performed in different periods (the second or first period) can be prevented and ambiguity of the relay terminal operation can be removed.

In the embodiments described above, the components and the features of the present invention are combined in a predetermined form. Each component or feature should be considered as an option unless otherwise expressly stated. Each component or feature may be implemented not to be associated with other components or features. Further, the embodiment of the present invention may be configured by associating some components and/or features. The order of the operations described in the embodiments of the present invention may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present invention may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment of the present invention may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that the present invention may be embodied in other specific forms without departing from essential characteristics of the present invention. Accordingly, the aforementioned detailed description should not be construed as restrictive in all terms and should be exemplarily considered. The scope of the present invention should be determined by rational construing of the appended claims and all modifications within an equivalent scope of the present invention are included in the scope of the present invention.

What is claimed is:

1. A method performed by a relay terminal, in a wireless communication system, the method comprising:
    transmitting signals to an upper node or receiving signals from the upper node, through a backhaul link in a first period
    wherein, based on the relay terminal being a first Integrated Access and Backhaul (IAB) node, the backhaul link is based on a link between the first IAB node and the upper node, and the upper node is based on a second IAB node that operates as a parent node for the first IAB node; and
    transmitting signals to at least one lower node or receiving signals from the at least one lower node, through an access link in a second period,
    wherein, based on the relay terminal being the first IAB node, the access link is based on a link between the first IAB node and the at least one lower node, and the at least one lower node is based on at least one user equipment (UE),
    wherein the first period includes a period in which only a first signal may be transmitted to and received from the at least one lower node,
    wherein the second period includes a period in which only a second signal may be transmitted to and received from the upper node,
    wherein the first period is switched to the second period based on a reception of the first signal from the at least one lower node and
    wherein the second period is switched to the first period based on a reception of the second signal from the upper node.

2. The method of claim 1, wherein the relay terminal operates in different modes in the first period and the second period, respectively, and
    wherein the mode is an active mode or an inactive mode.

3. The method of claim 2, wherein the active mode is a mode in which signals may be transmitted and received, and the inactive mode is a mode in which signals may not be transmitted and received.

4. The method of claim 1, wherein at least one of the backhaul link or the access link is a side link (SL).

5. The method of claim 1, wherein the first signal is a signal related to a random access channel (RACH) or a synchronization channel (SCH), and
    wherein the second signal is a signal related to a scheduling assignment channel (SACH).

6. The method of claim 5, wherein at least one of a predefined region of the first period or a predefined region of the second period is assigned semi-statically.

7. The method of claim 6, wherein the upper node is a base station or another relay terminal.

8. The method of claim 1, wherein the first period is switched to the second period based on a completion of receiving, from the upper node, data to be transmitted to the at least one lower node, and
    wherein the second period is switched to the first period based on a completion of receiving data, from the at least one lower node, to be transmitted to the upper node.

9. The method of claim 1, wherein the first signal related to the switching which is from the first period to the second period is a random access preamble, and
    wherein the second signal related to the switching which is from the second period to the first period is a backhaul scheduling channel (BH-SACH) for scheduling a paging.

10. The method of claim 9, wherein one of the first period or the second period is assigned semi-statically,
    wherein, based on the first period being assigned semi-statically, the signals are transmitted and received only through the backhaul link in the corresponding period, and
    wherein, based on the second period being assigned semi-statically, the signals are transmitted and received only through the access link in the corresponding period.

11. The method of claim 10, wherein, based on the first period being assigned semi-statically, the BH-SACH is received from the upper node in the first period and a backhaul scheduled data channel (BH-DCH) scheduled by the BH-SACH is received from the upper node in the second period.

12. The method of claim 11, wherein in the second period, one of i) the reception of the BH-DCH, and ii) transmission or reception of the signals through the access link has a priority.

13. The method of claim 12, wherein in the second period, based on the reception of the BH-DCH having the priority, information for a period for receiving the BH-DCH is transmitted to the at least one lower node, and
    based on the transmission or reception of the signals through the access link having the priority, information for a period in which the BH-DCH may not be received is transmitted to the upper node.

14. The method of claim 10, wherein, based on the second period being assigned semi-statically, an access scheduling assignment channel (AC-SACH) is received from the at least one lower node in the second period and an access scheduled data channel (AC-DCH) scheduled by the AC-SACH is received from the at least one lower node in the first period.

15. The method of claim 14, wherein in the first period, one of i) the reception of the AC-DCH, and ii) the transmission or reception of the signals through the backhaul link has a priority.

16. The method of claim 15, wherein in the first period, based on the reception of the AC-DCH having the priority, information for a period for receiving the AC-DCH is transmitted to the upper node, and
    based on the transmission or reception of the signals through the backhaul link having the priority, information for a period in which the AC-DCH may not be received is transmitted to the at least one lower node.

17. A relay terminal operating in a wireless communication system, the relay terminal comprising:
a transceiver transmitting and receiving a radio signal;
a memory; and
a processor connected to the transceiver and the memory, wherein the processor is configured to
transmit signals to an upper node or receive signals from the upper node, through a backhaul link in a first period,
wherein, based on the relay terminal being a first Integrated Access and Backhaul (IAB) node, the backhaul link is based on a link between the first IAB node and the upper node, and the upper node is based on a second IAB node that operates as a parent node for the first IAB node,
transmit signals to at least one lower node or receive signals from the at least one lower node, through an access link in a second period,
wherein, based on the relay terminal being the first IAB node, the access link is based on a link between the first IAB node and the at least one lower node, and the at least one lower node is based on at least one user equipment (UE),
wherein the first period includes a period in which only a first signal may be transmitted to and received from the at least one lower node,
wherein the second period includes a period in which signals only a second signal may be transmitted to and received from the upper node,
wherein the first period is switched to the second period based on a reception of the first signal from the at least one lower node and
wherein the second period is switched to the first period based on a reception of the second signal from the upper node.

18. The relay terminal of claim 17, wherein at least one of the backhaul link or the access link is a side link (SL).

19. The relay terminal of claim 18, wherein the first specific signal is a signal related to a random access channel (RACH) or a synchronization channel (SCH), and
wherein the second signal is a signal related to a scheduling assignment channel (SACH).

* * * * *